US007305105B2

(12) United States Patent
Chosson et al.

(10) Patent No.: US 7,305,105 B2
(45) Date of Patent: Dec. 4, 2007

(54) AUTHENTICATION OF SECURE ITEMS BY SHAPE LEVEL LINES

(75) Inventors: Sylvain Chosson, Ecublens (CH); Roger D. Hersch, Epalinges (CH)

(73) Assignee: Ecole polytechnique fédérale de Lausanne (EPFL), Lausanne (CH)

( * ) Notice: Subject to any disclaimer, the term of this patent is extended or adjusted under 35 U.S.C. 154(b) by 400 days.

(21) Appl. No.: 11/149,017

(22) Filed: Jun. 10, 2005

(65) Prior Publication Data

US 2006/0280331 A1 Dec. 14, 2006

(51) Int. Cl.
*G06K 9/00* (2006.01)

(52) U.S. Cl. ...................... 382/100; 713/155; 713/176; 380/258

(58) Field of Classification Search ................ 382/100, 382/232; 380/51, 54, 229, 232, 247, 258; 713/152, 161, 164, 166, 168, 169, 170, 176; 705/47, 67

See application file for complete search history.

(56) References Cited

U.S. PATENT DOCUMENTS 4,761,253 A 8/1988 Antes
4,984,824 A 1/1991 Antes et al.
5,018,767 A 5/1991 Wicker
5,032,003 A 7/1991 Antes
5,396,559 A * 3/1995 McGrew ...................... 380/54
5,694,229 A 12/1997 Drinkwater
5,708,717 A 1/1998 Alasia
5,712,731 A 1/1998 Drinkwater et al.
5,790,703 A * 8/1998 Wang ........................ 358/3.28
5,995,638 A * 11/1999 Amidror et al. ............ 382/100
5,999,280 A 12/1999 Huang
6,249,588 B1 6/2001 Amidror
6,273,473 B1 8/2001 Taylor et al.
6,494,491 B1 12/2002 Zeiter et al.
6,819,775 B2 11/2004 Amidror

OTHER PUBLICATIONS

U.S. Appl. No. 09/477,544 (Ostromoukhov, Hersch), Method and apparatus for generating digital halftone images by multi color dithering, filed Jan. 4, 2000.

U.S. Appl. No. 10/270,546, (Hersch, Chosson), "Authentication of documents and articles by moireé patterns", filed Oct. 16, 2002.

(Continued)

*Primary Examiner*—Samir Ahmed
*Assistant Examiner*—Abolfazl Tabatabai

(57) ABSTRACT

The disclosed method and system may be used for creating advanced protection means for secure items (e.g. bank notes, identity documents, certificates, checks, diploma, travel documents, tickets) and valuable products (e.g CD-ROMs, DVD's, prescription drugs, products with affixed labels, watches). Secure items are authenticated by shape level lines. The shape level lines become apparent when superposing a base layer comprising sets of lines and a revealing layer comprising a line grating. One of the two layers is a modified layer which embeds a shape elevation profile generated from an initial, preferably bilevel, motif shape image. By modifying the relative superposition phase of the revealing layer on top of the base layer or vice-versa (e.g. by translation or rotation), shape level lines grow and shrink dynamically. In the case that these shape level lines are present, the secure item is accepted as authentic. Otherwise the item is rejected as suspect.

51 Claims, 35 Drawing Sheets

OTHER PUBLICATIONS

U.S. Appl. No. 10/879,218, (Hersch, Chosson), "Model-based synthesis of band moire images for authenticating security documents and valuable articles", filed Jun. 30, 2004.

U.S. Appl. No. 10/440,355, (Hersch, Emmel, Collaud), Reproduction of security documents and color images with metallic inks, filed May 19, 2003.

U.S. Appl. No. 10/284,551, (Z. Fan, S Wang), Anti-counterfeiting see-through security feature using line patterns, filed Oct. 30, 2002.

I. Amidror, The Theory of the Moiré Phenomenon, Kluwer Academic Publishers, 2000, Chapter 10, Moiré between repetitive non-periodic layer, pp. 249-352 and Chapter 11, Other possible approaches for moiré analysis, pp. 353-374.

J. Huck, Mastering Moirés. Investigating Some of the Fascinating Properties of Interference Patterns, 2003, paper available by contacting the author, see http://pages.sbcglobal.net/joehuck/Pages/kit.html.

A.K. Jain, Fundamentals of Digital Image Processing, Prentice Hall, 1989, sections "Skeleton algorithms" and "thinning algorithms", pp. 382-383 and section "Morphological Processing", pp. 384-389.

J.S. Marsh, Contour Plots using a Moiré Technique, American Journal of Physics, vol. 48, Jan. 1980, 39-40.

J.F. Moser, Document Protection by Optically Variable Graphics in Optical Document Security, Ed. R.L. Van Renesse, Artech House, London, 1998, pp. 247-266.

V. Ostromoukhov and R. D. Hersch, Multi-color and artistic dithering, SIGGRAPH Annual Conference, 1999, pp. 425-432.

K. Patorski, The moiré Fringe Technique, Elsevier 1993, pp. 14-16.

A. Rosenfeld and J. Pfaltz, "Sequential operations in digital picture processing," Journal of the Association for Computing Machinery, vol. 13, No. 4, 1966, pp. 471-494.

B. Saleh, M.C. Teich, Fundamentals of Photonics, John Wiley, 1991, p. 116.

R.L. van Renesse, in Optical Document Security, 2nd ed., 1998, Artech House, Sections 9.3.1 Parallax Images and 9.3.2 Embossed Lens Patterns, pp. 207-210 (part of Chapter 9: Noniridescent Optically Variable Devices).

* cited by examiner

AUTHENTICATION OF SECURE ITEMS BY SHAPE LEVEL LINES

BACKGROUND OF THE INVENTION

The present invention relates generally to the field of anti-counterfeiting and authentication methods and devices and, more particularly, to methods and security devices for authenticating security documents and valuable products by revealing the shape level lines of a spatial elevation profile.

Counterfeiting of security documents such as bank notes, checks, certification documents, identification cards, passports, travel documents, tickets, etc. has become a serious problem, due to the availability of high-quality and low-priced color photocopiers and desktop publishing systems. The same is also true for valuable products such as CDs, DVDs, software packages, prescription drugs, watches, beverages, foodstuff, cosmetics, clothes, fashion articles etc. that are often counterfeited. The present invention discloses a novel security element and authentication means offering enhanced security for security documents and valuable products which need to be protected against counterfeits.

Various means have been introduced in the prior art for counterfeit prevention. Existing anticounterfeit and authentication means include the use of special paper, special inks, watermarks, micro-letters, security threads, holograms etc. Nevertheless, there is still a need to introduce further security elements, which do not considerably increase the cost of the produced documents or valuable products.

Prior art "phase shift" based methods reveal a latent binary image whose existence, and whose presence is used as a means of authenticating a document. One known method in which a latent binary image is made visible consists in encoding that latent image within a document (see background of U.S. Pat. No. 5,396,559 to McGrew, background of U.S. Pat. No. 5,901,484 to Seder, U.S. Pat. No. 5,999,280 to P. P. Huang, U.S. Pat. No. 6,104,812 to Koltai et. al., and U.S. patent application Ser. No. 09/810, 971 Assignee Trustcopy). In "phase shift" based methods, a base layer made of a line grating, or respectively a periodic dot screen is printed on the document, but within the predefined borders of the binary latent image, i.e. on the latent image foreground, the same line grating (respectively, the same dot screen) is printed at a different phase, generally shifted by half a period. Close to the borders of the latent image, the line screen, respectively the dot screen, may be printed at intermediate phases (see U.S. Pat. No. 6,252,971 B1 to Shen-ge Wang). For a layman, the foreground of the latent image printed on the document is difficult to distinguish from its background; but when a revealing layer comprising an identical, but non-shifted line grating or grating of lenticular lenses, respectively a dot screen, is superposed on the document, the latent image pre-designed on the document becomes recognizable, since, within its pre-defined borders, the revealed binary latent image (foreground) appears at a different phase, i.e. at a different intensity compared with the background intensity.

Such phase shift techniques are characterized by the fact that the boundaries of the revealed latent image don't move when displacing the revealing layer on top of the base layer. One limitation of these phase shift techniques resides in the fact that photocopying does generally not destroy the line grating, respectively the dot screen, printed at different phases on the latent image background and foreground. A second limitation resides in the fact that it is relatively easy to recover a binary latent image by revealing it with a revealing line grating of a period close to the line screen, respectively dot screen period. With standard desktop publishing software, counterfeiters may then recreate a similar latent binary image by combining a periodic line grating, respectively dot screen, with the same periodic line grating, respectively dot screen, shifted by half a period, inserted within the borders of the binary latent image.

A variation of the phase shift technique relying on a phase sampling technique is described in U.S. Pat. No. 5,708,717 to Alasia. A further variation of the phase shift technique using conjugate halftone screens is described in U.S. Pat. No. 5,790,703 to Shen-ge Wang. Additional variations of the phase sampling techniques comprising screen element density, form, angle position, size and frequency variations are described in U.S. Pat. No. 6,104,812 to Koltai et. al. A further variation of the phase shift technique consists in having similar line segments printed in registration on two sides of a thick transparent layer: thanks to the parallax effect, the superposition of both layers can be viewed either in phase or out of phase depending on the observation angle, see U.S. Pat. No. 6,494,491 B1 to P. Zeiter et al. A further variation of the phase shift technique consists in printing line segments at different pseudo-random phases in the foreground and the background of a latent image. In the background of the latent image, the identical line segments are printed in registration on the two sides of a security document. In the foreground of the latent image, the identical line segments are printed in registration, but one side of the document is printed at complementary intensities (black instead of transparent and transparent instead of black). In case of misregistration between the line segments printed on both sides of the document, the latent image is not apparent any more (patent application Ser. No. 10/284,551 to Z. Fan et. al.).

The present invention distinguishes itself from prior art phase shift techniques by the fact that it does not embed a hidden latent image within an image and therefore also does not reveal such a latent image. In the present invention, an elevation profile is embedded within one of the layers and the elevation profile's level lines are revealed thanks to the superposition of the two layers.

Prior art "moiré based" methods rely on the superposition of a dot screen (U.S. Pat. Nos. 6,249,588, 5,995,638, and 6,819,775, to Amidror and Hersch), respectively a band grating (U.S. patent application Ser. No. 10/270,546 and U.S. patent application Ser. No. 10/879,218 to Hersch and Chosson) incorporating within the replicated dots, respectively within the replicated bands, variable intensity shapes, and a revealing layer made of a dot screen, respectively a line grating. The revealed moiré shapes are enlarged and transformed instances of the replicated variable intensity shapes. In contrast to these moiré based methods, in the present invention, the shapes of the revealed level lines are not enlarged instances of replicated base layer shapes, but look like offset lines of the shape boundaries from which the elevation profile is derived that is embedded into one of the layers (see section "Detailed description of the invention").

Chapter 10 of the book by I. Amidror, The Theory of the Moiré Phenomenon, Kluwer, 2000, entitled "Moiré between repetitive non-periodic layers" describes the theory of the superposition of curvilinear line gratings by relying on Fourier series decomposition and spectral domain analysis. Chapter 11 of the same book gives an overview over the indicial method enabling obtaining the geometric layout of the superposition of curved line gratings. In problems 11.4 and 11.5 of Chapter 11 and in the paper by J. S. Marsh, Contour Plots using a Moiré Technique, American Journal of Physics, Vol. 48, Jan. 1980, 39-40, a moiré technique is described for drawing the contour plot of a function g(x,y) which relies on the superposition of a straight line grating and of a curved line grating whose lines have been laterally shifted by an amount equal to g(x,y). These book chapters, together with problems 11.4, 11.5 and the paper by J. S, Marsh however (a) do not consider generating a shape elevation profile from a preferably bilevel motif shape image, (b) do not mention the possibility of having level lines moving between shape borders and the shape centers and (c) do not consider contour plots of a function as a means of authenticating a security document or a valuable product.

The geometric properties of the moiré produced by the superposition of two rectilinear or curvilinear line gratings are described by K. Patorski, The moiré Fringe Technique, Elsevier 1993, pp. 14-16. Moiré fringes (moiré lines) produced by the superposition of two line gratings (i.e. set of lines) are exploited for example for the authentication of bank notes as disclosed in U.S. Pat. No. 6,273,473, Self-verifying security documents, inventors Taylor et al. Neither Patorski's book, nor U.S. Pat. No. 6,273,473 consider modifying a line grating according to a shape elevation profile nor do they consider generating a shape elevation profile from an initial, preferably bilevel, motif shape image. They also don't mention the possibility of having, by superposing base and revealing layers, level lines moving between motif shape boundaries and motif shape centers.

SUMMARY

The present invention relates to the protection of security documents and valuable articles which may be subject to counterfeiting attempts. The items to be protected comprise security documents such as bank notes, checks, trust papers, securities, certification documents, customs documents, identification cards, passports, travel documents, tickets, valuable business documents and valuable products such as optical disks, CDs, DVDs, software packages, medical products, prescription drugs, beverages, foodstuff, cosmetics, clothes, fashion articles, and watches. A secure item is a security document or a valuable product in which a security element has been incorporated (e.g. by printing) or to which a security element has been associated (e.g. attached, affixed, printed). Depending on the context, a secure item may also refer to a security element (e.g. piece of plastics, plastic sheet, printed label, metallic foil, diffractive element or combination thereof) attached to a security document or to a valuable product.

The invention also relates to a computing and delivery system operable for synthesizing and delivering secure items or security elements as well as corresponding authentication means. The present invention proposes new methods for authenticating a secure item by shape level lines. The shape level lines become apparent when superposing a base layer comprising sets of lines and a revealing layer comprising a line grating. One of the two layers is a modified layer which embeds a shape elevation profile generated from an initial, preferably bilevel, motif shape image (e.g. typographic characters, words of text, symbols, logo, ornament). In the case of an authentic document, the outline of the revealed shape level lines are visual offset lines of the boundaries of the initial motif shape image. In addition, the intensities, respectively colors of the revealed shape level lines are substantially the same as the intensities, respectively colors of the lines forming the base layer sets of lines. By modifying the relative superposition phase of the revealing layer on top of the base layer or vice-versa (e.g. by a translation, a rotation or another relative superposition phase transformation, according to the geometric transformation applied to the base and revealing layers), one may observe shape level lines moving dynamically between the initial motif shape boundaries (shape borders) and shape foreground centers, respectively shape background centers, thereby growing and shrinking. If these characteristic features are present, the item is accepted as authentic. Otherwise the item is rejected as suspect of being a counterfeit.

Secure items may have an individualized protection or a protection varying in time by applying the same transformation with substantially the same transformation parameters to both the base the revealing layers and by embedding the shape elevation profile into one of the transformed layers, preferably the base layer, yielding a modified transformed base layer. Since many geometric transformations having a large range of transformation parameters exist, many different instances of pairs of base and revealing layers having the same elevation profile can be generated. Additional security is provided by using, for different classes of secure items or at different intervals in time, different shape elevation profiles generated from different initial motif shape images. Different shape elevation profiles generate, in the superposition of base and revealing layer, level lines having different outlines, each outline being a visual offset line of its corresponding motif shape boundaries. The initial motif shape image may represent secure item content information, e.g. on a train ticket, the motif shape image may be formed by the text specifying the names of the departure and arrival towns, on a wine bottle the motif shape image may be formed by the words of text representing its brand, on a prescription drug, the motif shape image may represent its commercial name (or logo) and on a certificate, the motif shape image may represent the certificate's serial number and the logo of the institution or company issuing that certificate.

Further protection is provided by having one of the layers, preferably the base layer, embedding a halftone image generated by dithering an input image with a dither matrix made of sets of lines embedding the shape elevation profile, and where without superposition of the revealing layer, the halftone image appears and with superposition of the revealing layer, the shape level lines appear.

Further protection is provided by having a composed base layer with at least two base layer elements having different angular orientations, each base layer element embedding its own shape elevation profile. By superposing the composed base layer and the revealing layer at the angular orientation of one of the base layer elements, the shape level lines of that base layer element's embedded shape elevation profile appear.

Further security is provided by having the lines of the base layer sets of lines printed side by side on front and back faces of a substantially transparent security document and by verifying that the colors of the shape level lines are the expected ones, i.e. the colors of the lines of the base layer sets of lines printed side by side on front and back faces of that security document.

Further security is provided with base layer sets of lines comprising lines printed with a special ink such as inks visible under ultraviolet light (UV inks), inks visible under infrared light (IR inks), metallic inks, and iridescent inks. The corresponding shape level lines appear only under a certain viewing and illumination conditions which depend on the type special ink, i.e. for UV inks, ultraviolet illumination, for IR inks, infrared illumination and for metallic or iridescent inks specific observation angles.

In a certain embodiment, the layers may comprise combinations of special lines such as continuous lines, dotted lines, interrupted lines and partially perforated lines. In a further embodiment, the base layer and the revealing layer are incorporated on two sides of a secure item (e.g a plastic card), with the base layer and revealing layer being separated by a substantially transparent layer. When moving the eyes across the revealing layer line grating, due to the parallax effect, shape level lines appear which move between shape borders and shape foreground and background centers. In further embodiments, the base layer is created by a process for transferring an image onto a support, said process being selected from the set comprising lithographic, photolithographic, photographic, electrophotographic, engraving, etching, perforating, embossing, ink jet and dye sublimation processes. The base layer may be embodied by transmissive devices, opaque devices, diffusely reflecting devices, paper, plastic, optically variable devices and diffractive devices. The revealing layer may be embodied by a set of transparent lines within a light absorbing surface, a set of transparent lines within a light absorbing transmissive support, a set of transparent lines imaged on a film, a set of transparent lines within an opaque support, lenticular lenses and Fresnel zone lenses emulating the behavior of lenticular lenses. The revealing layer may also be embodied by an electronic display working in transmissive mode, driven by a revealing layer display software module.

The present invention also includes a secure item computing and delivery system comprising a server system and client systems. The server system comprises a repository module operable for registering secure items and creating associations between secure item content information and corresponding base and revealing layer synthesizing information. It further comprises a base layer and revealing layer synthesizing module operable for synthesizing transformed base and revealing layers according to corresponding base and revealing layer synthesizing information. It further comprises an interface module operable for receiving requests from client systems, operable for interacting with the base layer and revealing layer synthesizing module and further operable for delivering to clients systems secure items, security elements, base layers as well as revealing layers. The base layer and revealing layer synthesizing module is operable for synthesizing base and revealing layers by computing an elevation profile from an initial, preferably bilevel, motif shape image, by transforming original base and revealing layers according to a geometric transformation and by creating a modified transformed base or revealing layer embedding that elevation profile.

BRIEF DESCRIPTION OF THE DRAWINGS

For a better understanding of the present invention, one may refer by way of example to the accompanying drawings, in which.

DETAILED DESCRIPTION OF THE INVENTION

The term "secure item" refers, depending on its context, to a security document or to a valuable product to which a security element is associated (e.g. attached, affixed, printed, imaged, incorporated), It may also refer to a security element which is associated to a security document or to a valuable product. Security documents are for example bank notes, checks, trust papers, securities, certification documents, customs documents, identification cards, passports, travel documents, tickets, business documents and contracts. Valuable products are for example optical disks, CDs, DVDs, software modules, electronic products, medical products, prescription drugs, beverages, foodstuff, cosmetics, clothes, fashion articles, watches and vehicles as well as their corresponding packages.

Figures showing examples of base and revealing layers conceived according to the present invention are enlarged for the purpose of making the invention's particularities and properties understandable. On a real security item, the corresponding base and revealing layers are laid out according to the available resolution and registration accuracy.

Figure 1:
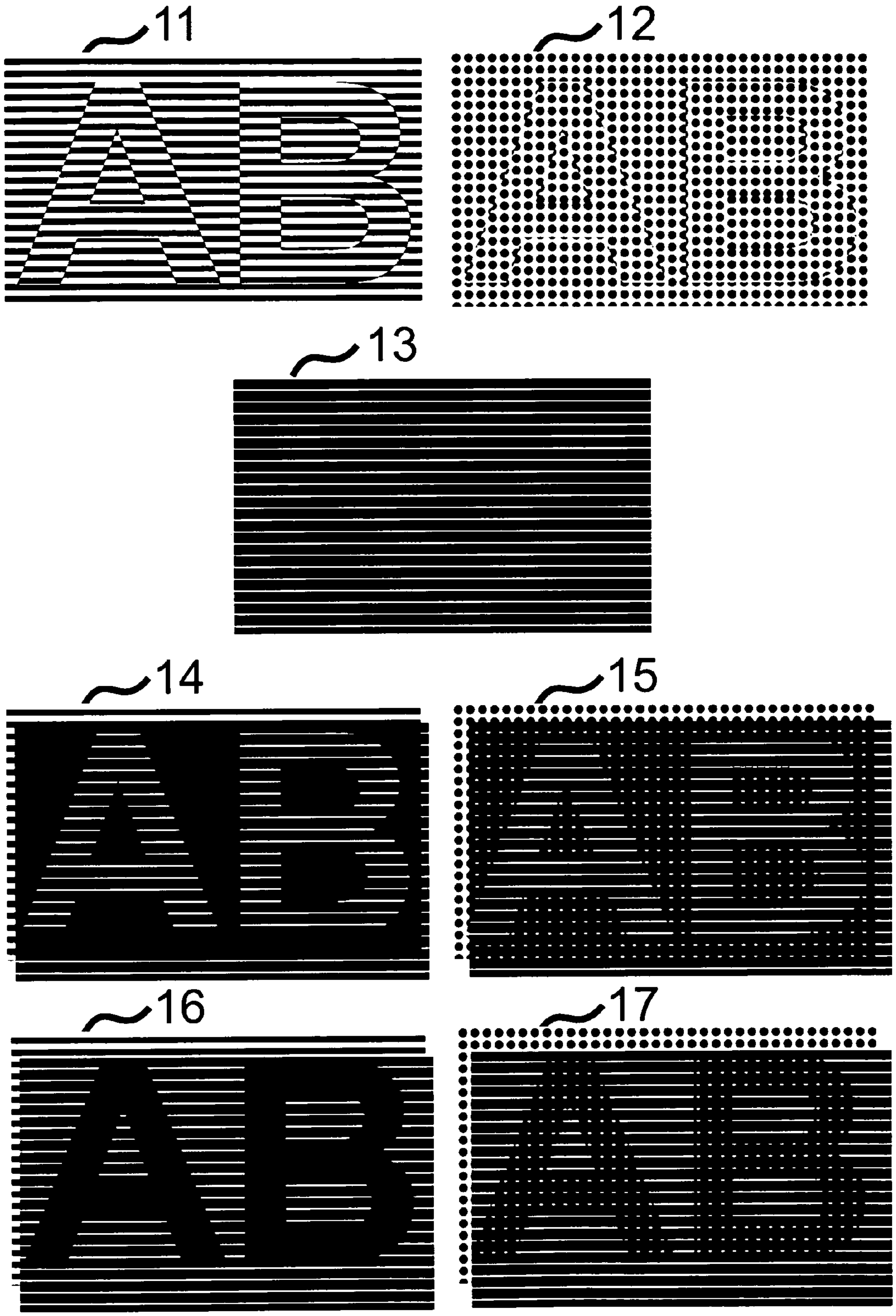
FIG. 1 (prior art)
FIG. 1 shows prior art "phase shift" based methods of hiding a latent binary image.

FIG. 1 shows an example of the prior art method of hiding a latent binary image within a line grating (see background of U.S. Pat. No. 5,396,559 to McGrew) or within a dot screen (similar to U.S. patent application Ser. No. 09/810,971 Assignee Trustcopy). The line grating 11, respectively dot screen 12, is, within the borders of the latent binary image shifted by a fraction of a period, e.g. half a period. In FIG. 1, the foreground of the latent image, formed by the alphanumeric characters is shifted by half a period in respect to the latent image background. The transparent parts of the revealing layer 13 sample (14, respectively 15) the white surface parts located in the foreground of the characters and the black surface parts located in the background of the characters. When the revealing layer is moved, its transparent lines sample (16 and respectively 17) the white surface parts of the background and the black surface parts of the foreground of the characters. In both cases, the phase shift between background and foreground shape creates a contrast which reveals the shape of the latent image.

In the present invention, instead of hiding a latent binary image into the base layer, we hide within one of the layers a spatial elevation profile and reveal, by superposing the other layer on top of it, the corresponding elevation profile level lines.

A spatial elevation profile is a function of the type $z=f(x,y)$, where z is the elevation and x and y are the spatial coordinates. The spatial elevation profile may be continuous or non-continuous. It associates to each spatial coordinate (x,y) a single elevation z. The spatial coordinates (x,y) may represent a discrete grid, e.g. the spatial locations of pixels within a pixmap image.

Figure 2:
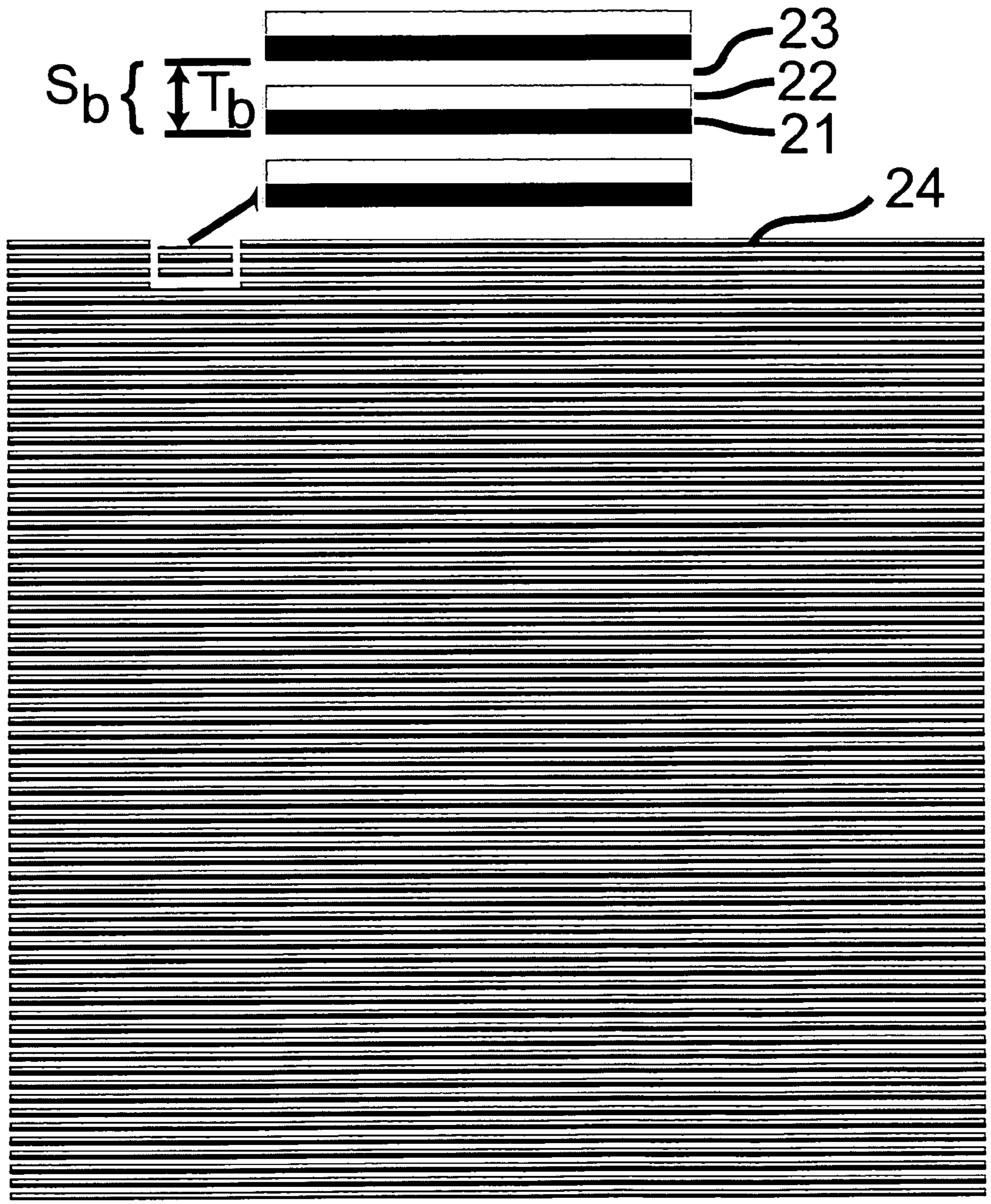
FIG. 2. shows an original unmodified base layer made of repeated sets of lines, each set comprising lines having each one its specific intensity or color.
Figure 3:
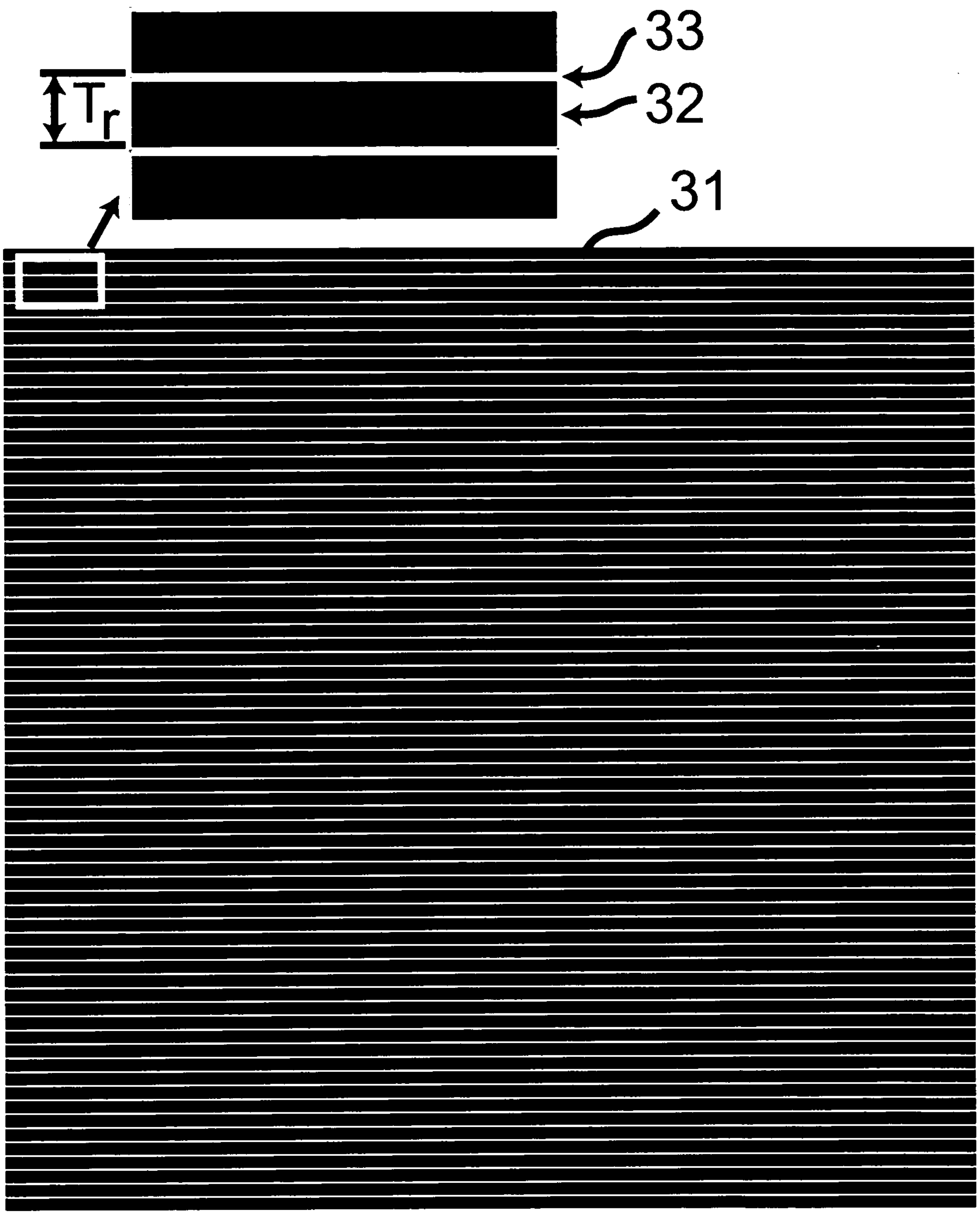
FIG. 3 shows a revealing layer formed by a grating of transparent lines.
Figure 4A:
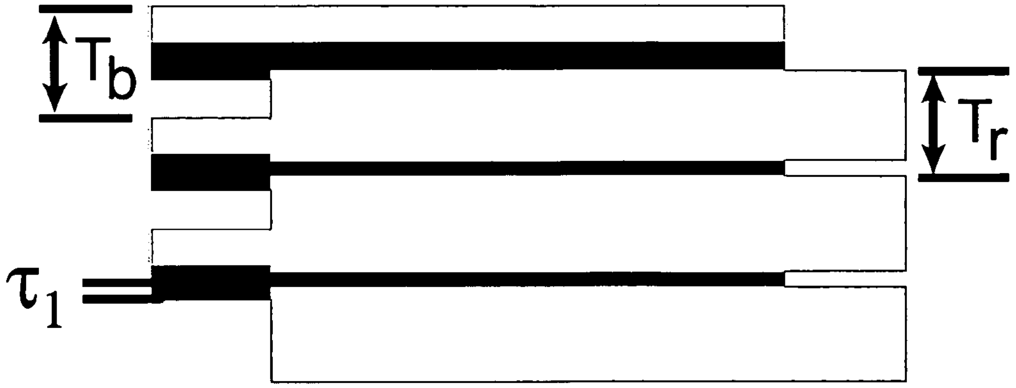
FIGS. 4A, 4B and 4C show the superposition of the base layer and the revealing layer according to different relative superposition phases between base layer and revealing layer.
Figure 4B:
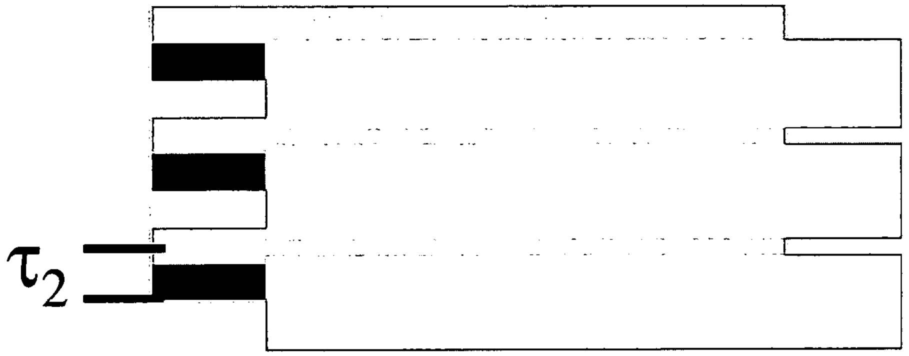
Figure 4C:
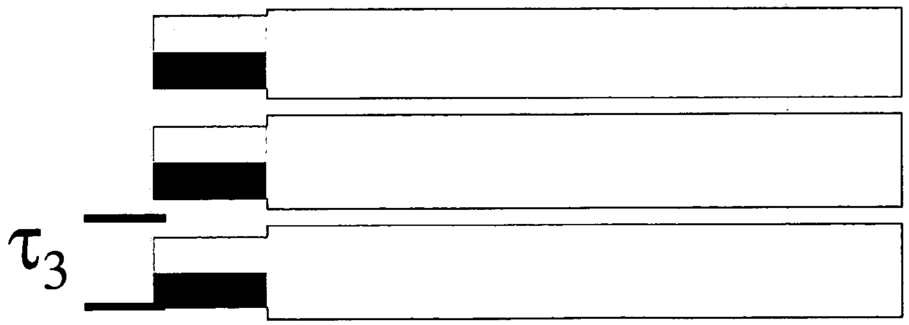

Let us consider an initial base layer is made of repetitive sets $S_b$ of lines (FIG. 2, 24). The individual lines (e.g. in FIG. 2, 21, 22, 23) of the set of lines $S_b$ have each one their specific intensity or color. The revealing layer is a line grating $G_r$ (FIG. 3, 31) embodied by transparent lines (FIG. 3, 33) on a substantially opaque surface 32, for example transparent lines on a black film, imaged on a phototypesetter (or imagesetter). The revealing layer line grating may also be embodied by lenticular lenses where each lenticule (cylindrical lens) corresponds to one transparent line. Both the base layer sets of lines and the revealing line grating may also be embodied by a diffractive device. In a preferred embodiment, the period $T_b$ of the set of lines $S_b$ (FIG. 2) and the period $T_r$ of the revealing line grating $G_r$ (FIG. 3) are identical. When the base layer's periodic set of lines is superposed with the revealing layer's line grating, depending on the relative superposition phase $\tau_r$ between the base layer and the revealing layer, only one line or a subset of lines from each set of lines appears through the transparent lines of the revealing layer. The relative position of the revealing layer transparent line and the boundary of the base layer's set of lines represents the relative superposition phase $\tau_r$ at which base layer and revealing layer are superposed. The superposition of the base layer (FIG. 2) and of the revealing layer (FIG. 3) yields a constant intensity respectively constant color which corresponds to the intensity respectively color of the lines appearing through the transparent revealing layer lines (e.g. black in FIG. 4A, gray in FIG. 4B and white in FIG. 4C). When translating the revealing layer on top of the base layer, the intensity respectively color of the lines situated below the transparent lines changes and the resulting intensity respectively color of the uniform superposition image therefore also changes. At different relative superposition phases $\tau_1, \tau_2, \ldots, \tau_n$ (e.g. FIGS. 4A, 4B, 4C) lines of different intensities, respectively colors are selected. Accordingly, a superposition image of the corresponding intensity, respectively color appears. For example, in FIG. 4A, the relative superposition phase $\tau_1$ yields a "black" superposition image, in FIG. 4B, relative superposition phase $\tau_2$ yields a "gray" superposition image and in FIG. 4C relative superposition phase $\tau_3$ yields a "white" superposition image. The intensity, respectively color of the superposition image refers to the intensity, respectively color located beneath the transparent revealing lines of the revealing line grating.

Spatial Elevation Profile Embedded into the Base Layer Sets of Lines

Without loss of generality, let us assume that both the base layer lines and the revealing layer lines are horizontal, i.e. parallel to the x-axis. We generate a modified base layer sets of lines (also called modified base layer or modified sets of lines) embedding a spatial elevation profile. Embedding the spatial elevation profile into the base layer image consists in traversing all positions (x,y) of the modified base layer, and at each current position (x,y), in obtaining the corresponding elevation value $z=f(x,y)$ of the elevation profile. The elevation value z is used to read the intensity, respectively color, c at the current position (x,y) shifted by an amount proportional to the elevation value, e.g. at position (x,y-z) within the original unmodified base layer sets of lines and to write that intensity, respectively color c at the current position (x,y) within the modified base layer. In the resulting modified base layer, the initial unmodified sets of lines are shifted at each position according to the elevation profile at that position, yielding modified repeated sets of lines. The preferred shift orientation is perpendicular to the orientation of the lines forming the sets of lines of the initial unmodified base layer. However, other shift orientations are possible.

When superposing the revealing layer on top of the base layer, the transparent lines of the revealing layer reveal from the base layer as constant intensity, respectively constant color, the positions (x,y) having a constant relative phase between base layer sets of lines and revealing layer lines. Within the modified base layer, constant relative phase elements are elements which have been shifted by the same amount, i.e. according to the same elevation profile value. Therefore, the modified base layer superposed with the revealing line grating yields the level lines of the spatial elevation profile.

The rule expressed in Eq. (1) governs the relationship between the current elevation value $\epsilon(x,y)$ of the elevation profile, the current phase $\tau_s(x,y)$ sampled by the revealing layer lines within the original sets of lines and the current relative superposition phase $\tau_r$ between revealing layer lines and base layer sets of lines:

$$(\tau_r - \epsilon) \bmod T = \tau_s \qquad (1)$$

where T=1 is the normalized replication period of the base layer sets of lines and also the normalized replication period of the revealing layer line grating and where phases $\tau_s$ and $\tau_r$ as well as the elevation profile $\epsilon$ are expressed as values modulo-1, i.e. between 0 and 1. Clearly, at a specific relative superposition phase $\tau_r$ between the base layer sets of lines and the revealing layer line grating, a line of a given intensity or color located at phase $\tau_s$ within the set of original base layer lines is displayed as a constant elevation line $\epsilon=\epsilon_{const}$. When the revealing line grating moves on top of the base layer, i.e. the relative superposition phase $\tau_r$ increases, or respectively decreases, then the base layer line of constant phase $\tau_s$ is sampled by the revealing lines at an increasing, respectively decreasing elevation $\epsilon$. Therefore, by moving the revealing layer on top of the base layer, a level line animation is created, where level lines move towards increasing or decreasing elevation values, thereby in the general case shrinking or growing, i.e. forming lines which look like offset lines of the initial motif shape boundaries from which the elevation profile is derived (see section "Synthesis of a shape elevation profile"). As an example, superpose the revealing layer of FIG. 3, printed on a transparent sheet on top of the modified base layer shown in FIG. 15, and move the revealing layer vertically. Growing and shrinking level lines appear which displace themselves towards increasing or decreasing elevation values of the elevation profile shown in FIG. 14A. When comparing the moving level lines with the motif shape boundaries from which the elevation profile is derived, the level lines move from the motif shape boundaries towards its foreground and background centers.

Figure 5A:
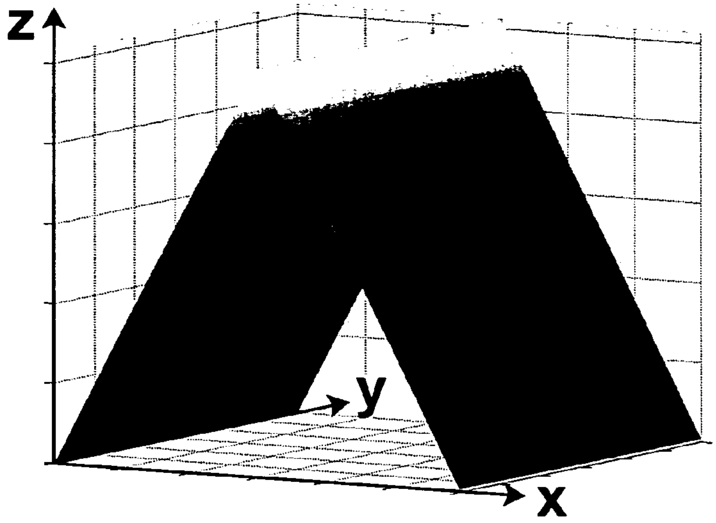
FIG. 5A shows an example of an elevation profile.
Figure 5B:
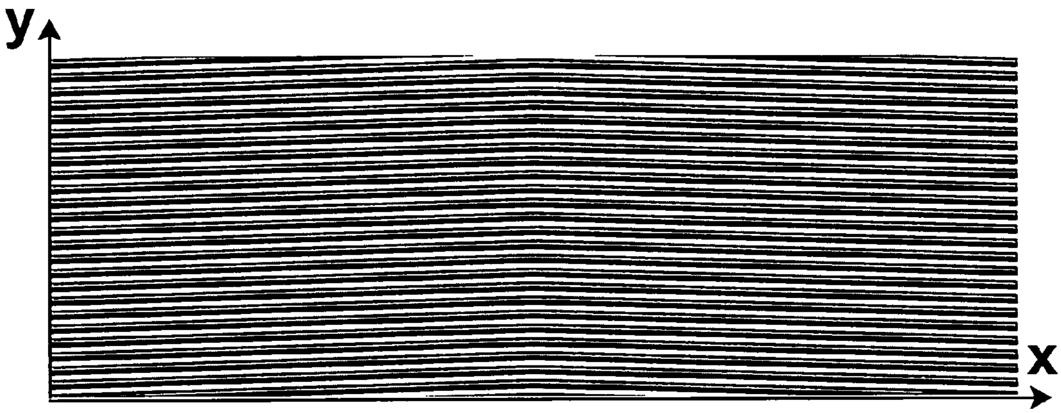
FIG. 5B shows the correspondingly modified base layer.
Figure 5C:
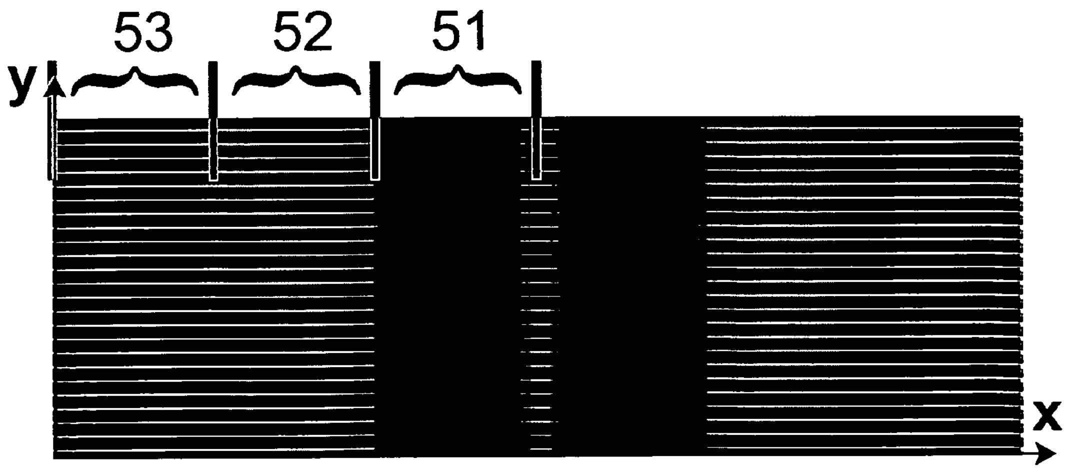
FIG. 5C shows the level lines of the elevation profile obtained by the superposition of the base layer shown in FIG. 5B and of the revealing layer shown in FIG. 3.

As a simple example, FIG. 5B shows a modified base layer embedding the triangular elevation profile shown in FIG. 5A. When superposed with the revealing layer shown in FIG. 3, we obtain the level lines (FIG. 5C) of the triangular elevation profile, in the present case formed by lines perpendicular to the initial unmodified base layer sets of lines (FIG. 2). As shown in FIG. 5B, the base layer black (21 in FIG. 2), gray (22 in FIG. 2) and white (23 in FIG. 2) lines forming one set of the base layer sets of lines appear in the superposition, as shown in FIG. 5C as black 51, gray 52 and white 53 level lines.

Figures 6A, 6B, 6C:
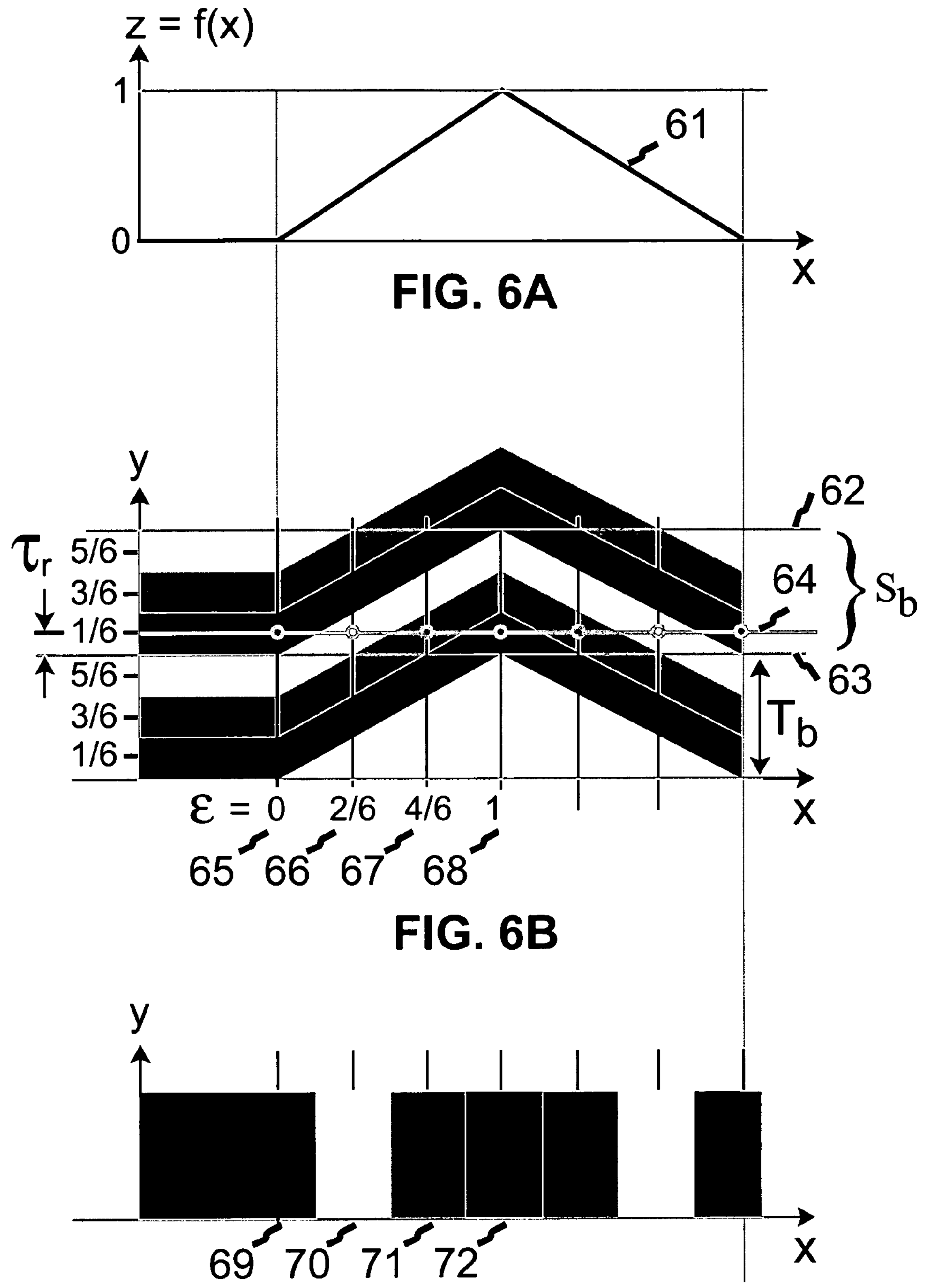
FIG. 6A shows schematically an elevation profile, FIG. 6B a base layer composed of sets of 3 lines each, modified according to the elevation profile and FIG. 6C the level lines obtained by superposing the revealing line grating on top of the base layer at the relative phase $\tau_r=1/6$.

FIG. 6B illustrates the rule stated in Eq. (1). A revealing line 64 is superposed onto the base layer whose sets of lines (repeated with a normalized period T=1) have been modified according to the elevation profile 61 shown in FIG. 6A. The revealing line has a relative phase $\tau_r=1/6$ in respect to the lower boundary 63 of the set of lines $S_b$. At a horizontal position 65 on the base layer, the elevation value is $\epsilon=0$ and the phase of the revealed base layer line within the unmodified base layer sets of lines is $\tau_s=1/6$, which corresponds to the center of the black base layer line. At a horizontal position 66 on the base layer, the elevation value is $\epsilon=2/6$ and the phase of the revealed base layer line is $\tau_s=(1/6-2/6) \bmod 1=5/6$, which corresponds in the unmodified base layer sets of lines to the center of the light gray line. At a horizontal position 67 on the base layer, the elevation value is $\epsilon=4/6$ and the phase of the revealed base layer line is $\tau_s=(1/6-4/6) \bmod 1=3/6$, which corresponds in the unmodified base layer sets of lines to the center of the dark gray line. And at horizontal position 68, the elevation is $\epsilon=1$ and the phase of the revealed base layer line is $\tau_s=(1/6-6/6) \bmod 1=1/6$, which corresponds again to the center of the black line. The superposition of the revealing line grating and of the modified base layer sets of lines yields according to positions 65, 66, 67 and 68 vertically oriented level lines of black (FIG. 6C, 69), light gray 70, dark gray 71 and again black 72 intensities. When moving the revealing layer vertically, i.e. increasing its relative superposition phase to $\bar{\tau}_r=((\tau_r+\Delta\tau_r) \bmod T)$, the same level lines as before are displayed ($\tau_s$ constant), but at first at a higher elevation $$\bar{\epsilon}=(\bar{\tau}_r-\tau_s) \bmod T \qquad (2)$$

and then, due to the modulo-T (since T=1, modulo-1) operation, at the lowest elevation again.

Figure 7A:
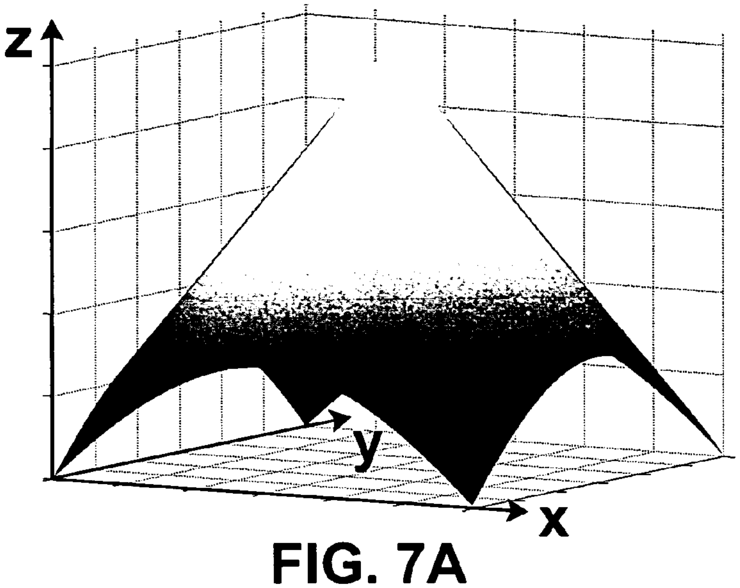
FIG. 7A show an example of an elevation profile (cone) and FIG. 7B shows the correspondingly modified base layer.
Figure 7B:
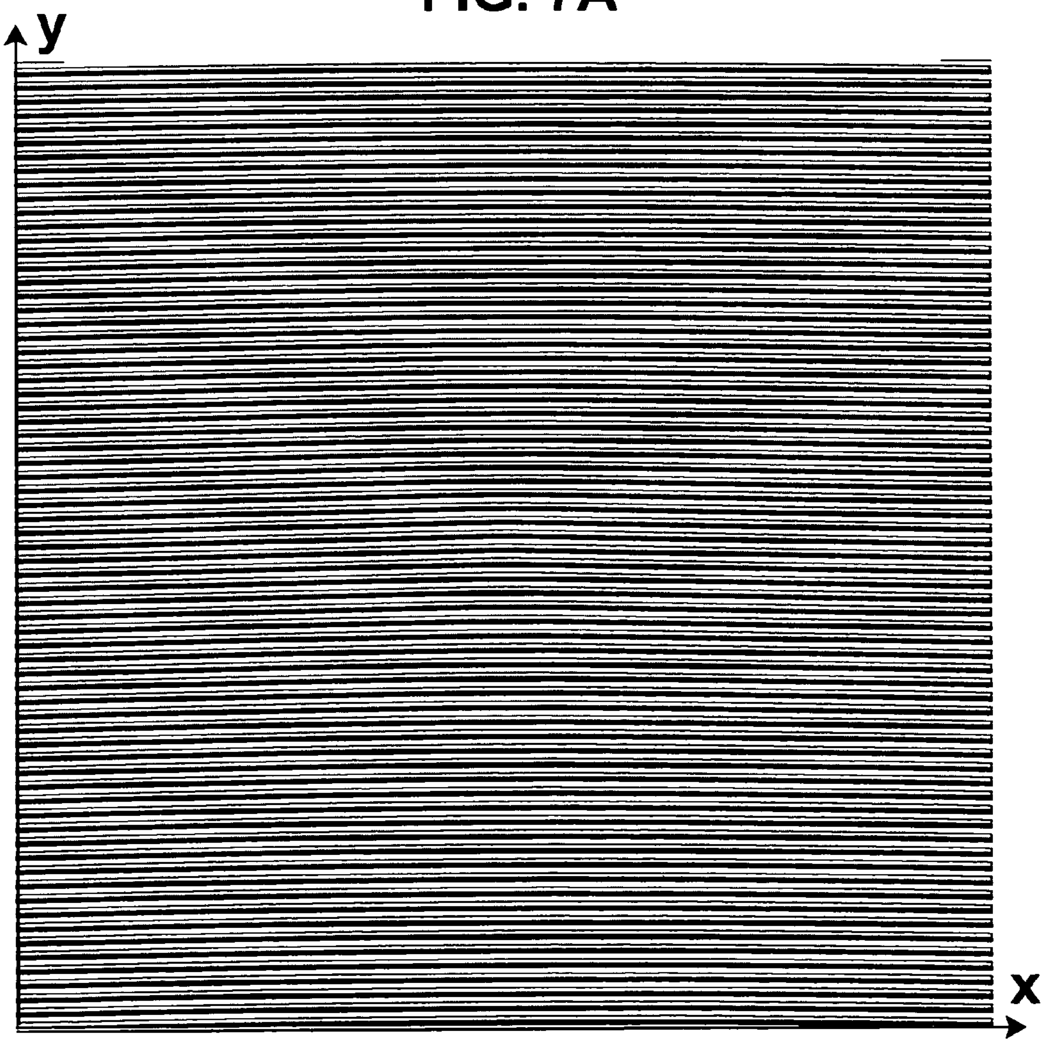
Figure 8:
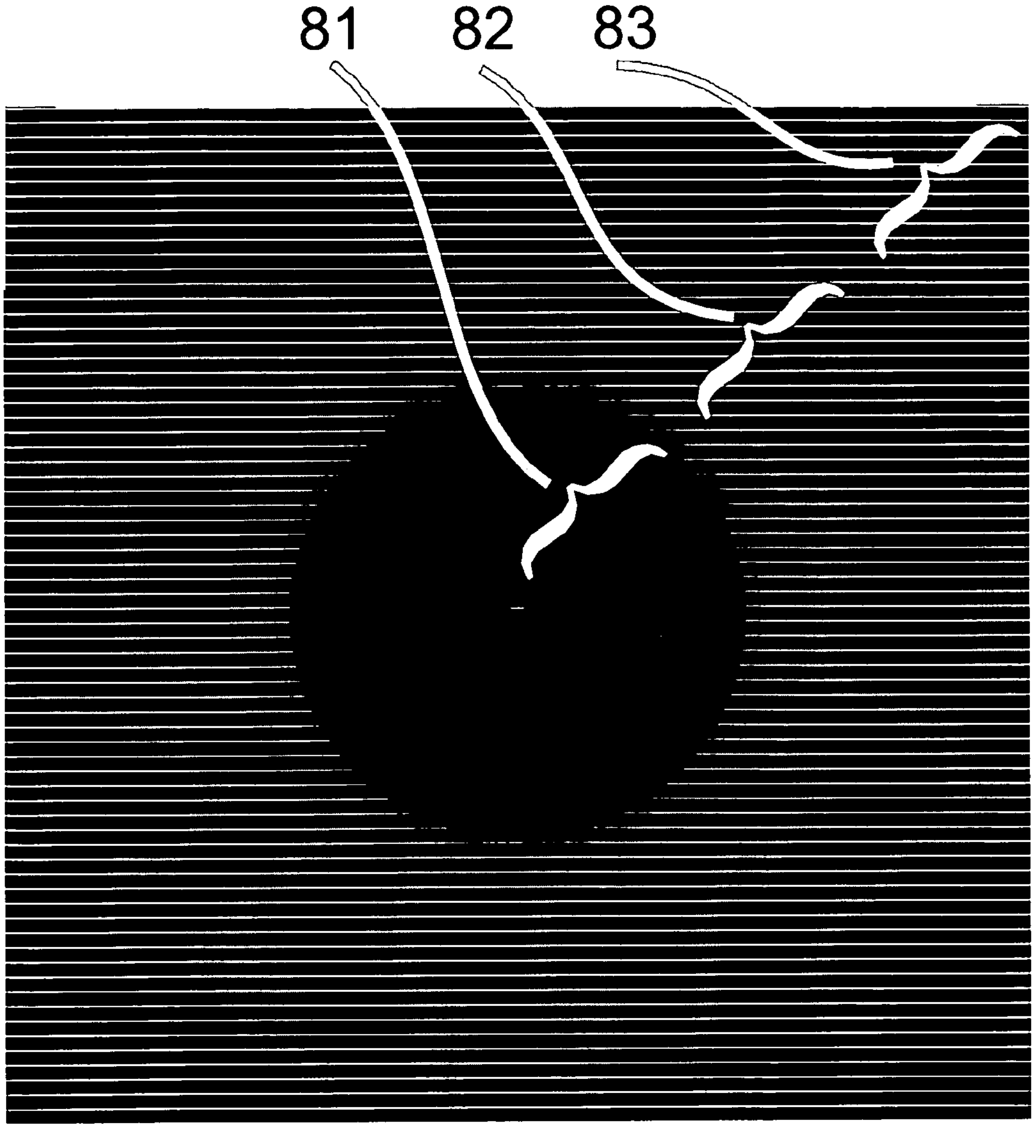
FIG. 8 shows the circular level lines of the elevation profile obtained by the superposition of the base layer shown in FIG. 7B and the revealing layer shown in FIG. 3.

As a further example, FIG. 7B shows a modified base layer embedding the elevation profile of a cone, shown in FIG. 7A. When superposed with the revealing layer shown in FIG. 3, we obtain the level lines of the cone, in the present case formed by concentric circles as shown in FIG. 8. Again, the base layer black (FIG. 2, 21), gray 22 and white 23 lines forming the sets of lines repeated over the base layer appear in the superposition, as shown in FIG. 8 as black 81, gray 82 and white 83 level lines. When translating (moving) the revealing layer on top of the base layer towards increasing y values, the level lines move towards the center of the cone, thereby shrinking. When translating (moving) the revealing layer on top of the base layer towards decreasing y values, the level lines move from the center of the cone outwards, thereby growing.

Spatial Elevation Profile Embedded into the Revealing Line Grating

In a further embodiment, the spatial elevation profile may be embedded into a modified revealing line grating (e.g. FIG. 9) by the same procedure as when generating the modified base layer. Embedding the spatial elevation profile into the revealing layer consists in traversing all positions of the modified revealing layer, and at each position (x,y) of the revealing layer, in obtaining the corresponding elevation profile $z=f(x,y)$. The elevation profile is used to read the value $c_r$ (opaque or transparent) at the current position (x,y) shifted by an amount proportional to the elevation value, e.g. at position (x,y-z) within the initial revealing layer line grating and to write that value $c_r$ at the current position (x,y) within the modified revealing layer. In the resulting modified revealing layer, the original grating of transparent lines is shifted at each position according to the elevation profile at that position.

When superposing the modified revealing layer with the embedded spatial elevation profile on top of the base layer, the transparent lines of the revealing layer are shifted in respect to the base layer according to the elevations of the spatial elevation profile. They therefore reveal constant base layer intensities respectively colors along the elevation profile level lines.

Figure 9:
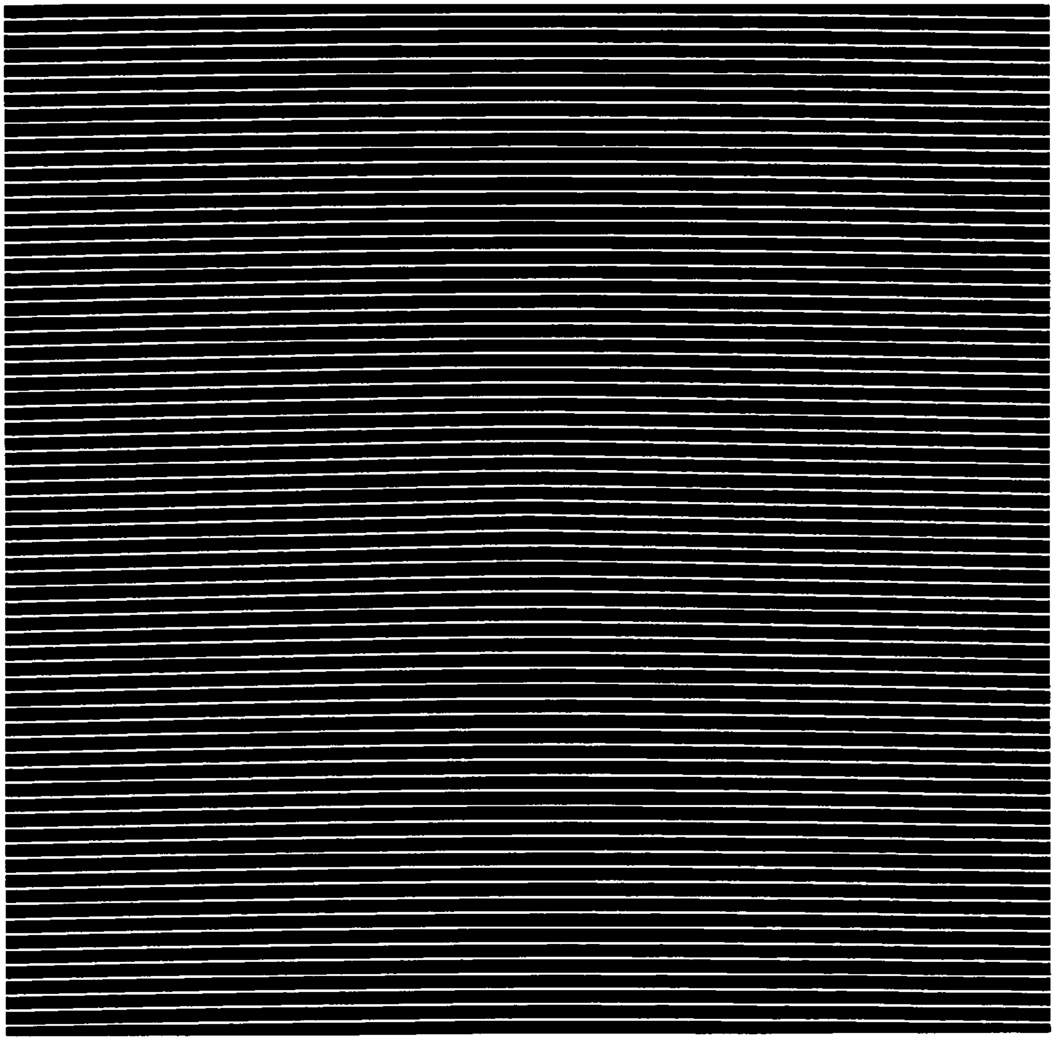
FIG. 9 shows a revealing layer modified according to the elevation profile (cone) shown in FIG. 7A.
Figure 10:
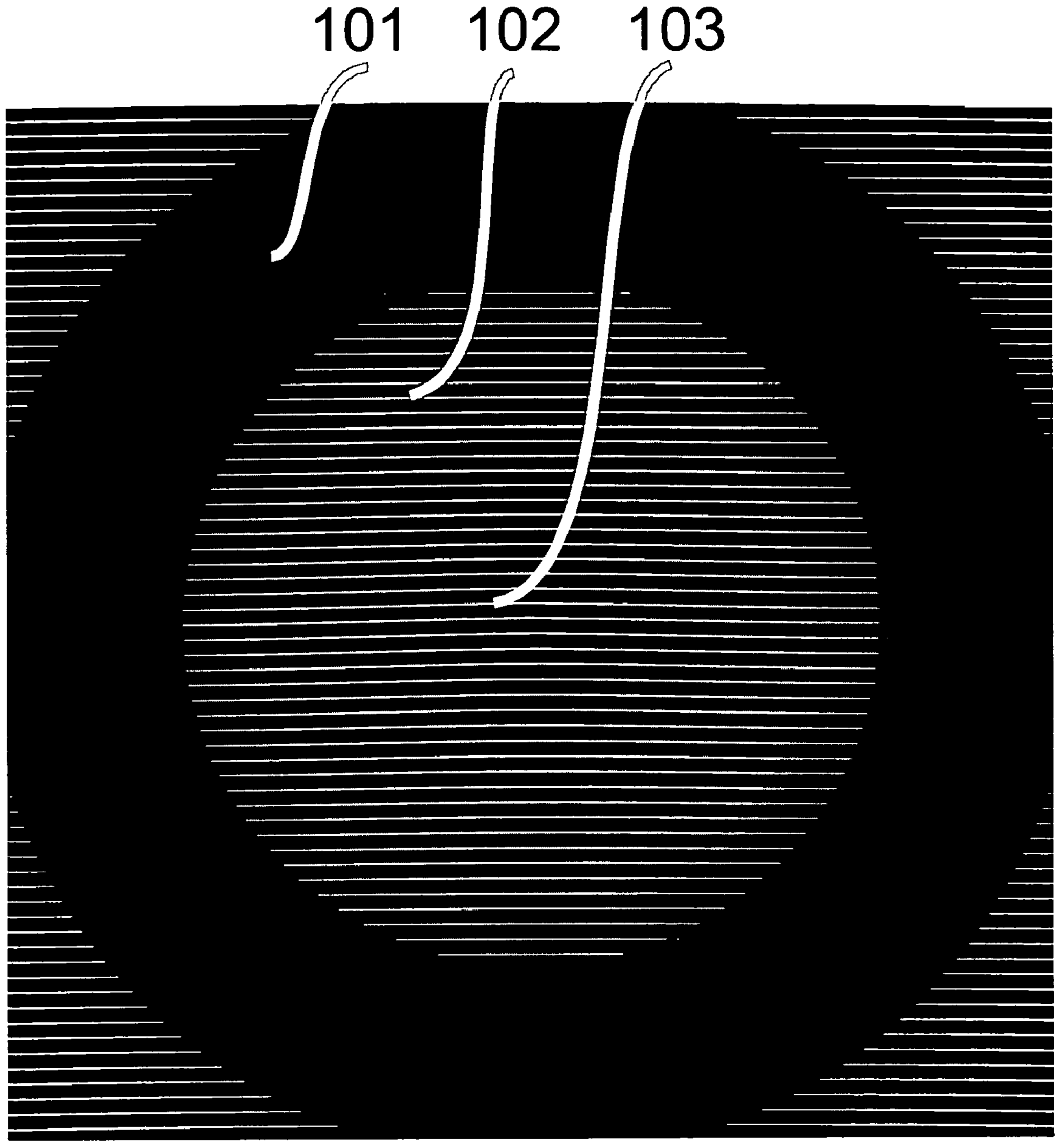
FIG. 10 shows the circular level lines of the elevation profile obtained by the superposition of the base layer shown in FIG. 2 and of the modified revealing layer shown in FIG. 9.

As an example, FIG. 9 shows a modified revealing layer embedding the elevation profile of a cone. When superposed with the base layer shown in FIG. 2, we obtain the level lines of a vertical cone, in the present case formed by concentric circles as shown in FIG. 10. Again, the base layer black (FIG. 2, 21), gray 22 and white 23 lines forming the set of lines repeated over the base layer appear in the superposition, as shown in FIG. 10, as black 101, gray 102 and white 103 level lines. Here also, when translating the revealing layer on top of the base layer the level lines move either towards the center of the cone, thereby shrinking or move from the center of the cone outwards, thereby growing.

Synthesis of a Shape Elevation Profile

Figure 11:
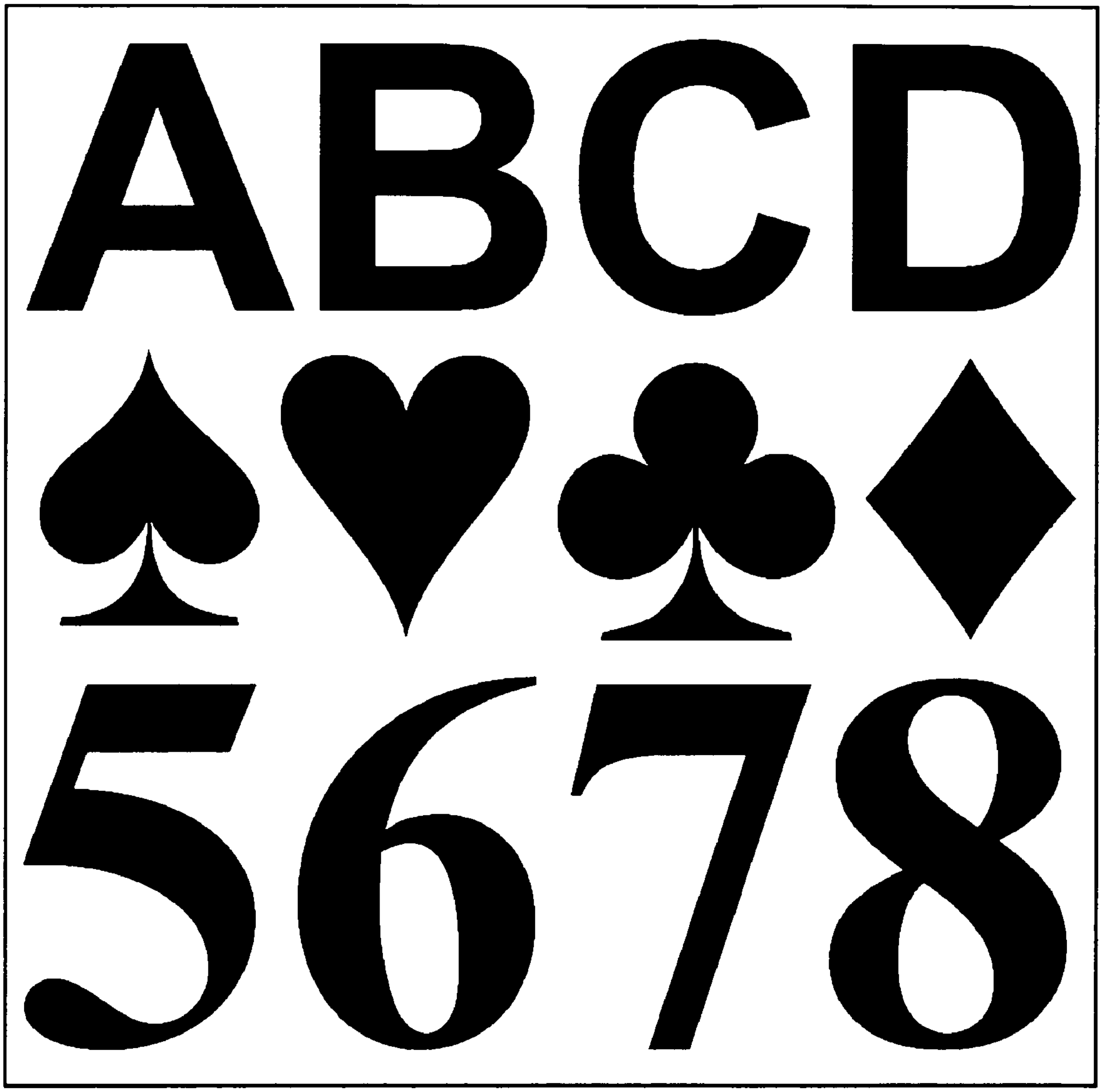
FIG. 11 shows an example of a bilevel motif shape image (bitmap) with typical motif shapes such as typographic characters and symbols.

The elevation profile $z=f(x,y)$ may be as sophisticated as desired. It needs not be continuous nor defined by a mathematical function such a polynomial, an exponential or a trigonometric function. In a preferred embodiment, the elevation profile is derived from an initial clearly recognizable and identifiable motif shape image, possibly composed of several shapes, such as a typographic characters, a word of text, a symbol, a logo, an ornament, a decorative motif, any other graphic shape or a combination thereof. Such an elevation profile is therefore a representation of the initial motif shape image. An elevation profile representing a motif shape image is called "shape elevation profile". One may generate a shape elevation profile by selecting an initial, preferably bilevel, motif shape image (e.g. a bitmap). One may then apply a low pass filter to that initial motif shape image. However, in a preferred embodiment, in order to obtain elevation level lines (called hereinafter "shape elevation level lines" or simply "shape level lines") having outlines resembling offset lines of the initial bilevel motif shape boundaries, it is recommended to proceed as follows:

a) Create the desired initial bilevel motif shape image (e.g. typographic characters, word of text, symbol, logo, ornament, decorative motif, combination thereof, etc.), e.g. FIG. 11. For that purpose one may create and run a computer program generating text and graphics on a bitmap. Or one may use an interactive graphic software package such as PhotoShop to create the initial motif shape image.

b) Compute from the initial bilevel motif shape image the skeleton image incorporating the skeletons of both the foreground shape (FIG. 12, 122) and the background shape (FIG. 12, 123), e.g. according to the method described in A. K. Jain, Fundamentals of Digital Image Processing, Prentice Hall, 1989, sections "Skeleton algorithms" and "thinning algorithms", pp. 382-383. The background shape is the inverse (also sometimes called "complement") of the foreground shape.

c) Compute the shape boundary image, i.e. an image derived from the initial bilevel motif shape image containing only the shape boundaries 121 by performing on the initial bilevel motif shape image one or several erosion passes (see A. K. Jain, Fundamentals of Digital Image Processing, Prentice Hall, 1989, section Morphological Processing, pp. 384-389) and by subtracting from the initial bilevel motif shape image the eroded shape image.

d) By performing a distance transform (e.g. A. Rosenfeld and J. Pfaltz, "Sequential operations in digital picture processing," Journal of the Association for Computing Machinery, vol. 13, No. 4, 1966, pp. 471-494), compute separately for the foreground shapes and for the background shapes of the initial bilevel motif shape image the distance $d_k$ from every point (x,y) to its corresponding skeleton and the distance $d_b$ to its corresponding shape boundary. The relationship $$d_{krel}=d_k/(d_b+d_k) \quad (3)$$

expresses the relative distance of a point (x,y) to its respective skeleton on a scale between 0 and 1. Various types of shape elevation profiles may be created by mapping the relative distance $d_{krel}$ of a point to its respective skeleton onto the range of admissible elevations. In order to create well recognizable shape level lines which look like offset lines of the initial bilevel motif shape boundaries, a preferred shape elevation profile is created by assigning to shape foreground points (x,y) the elevation values $$h_f=1-d_k/(d_b+d_k)\cdot½ \quad (4)$$

and to shape background points the elevation values $$h_b=1/2-d_k/(d_b+d_k)\cdot½ \quad (5)$$

i.e. by assigning the range of elevation values from 1 (max) to 0.5 (half) to foreground shapes and from 0.5 half to 0 (min) to the background shapes, where at the shape boundaries, there is a transition from foreground 0.5 (half) to background 0 (min). The foreground skeleton has elevation values 1 (max) and the background skeleton has the elevation values ½ (half).

e) In order to avoid an abrupt transition at the shape boundaries within the final elevation profile, it is recommended to apply a smoothing filter to the elevation profile computed in step (d).

Figure 12:
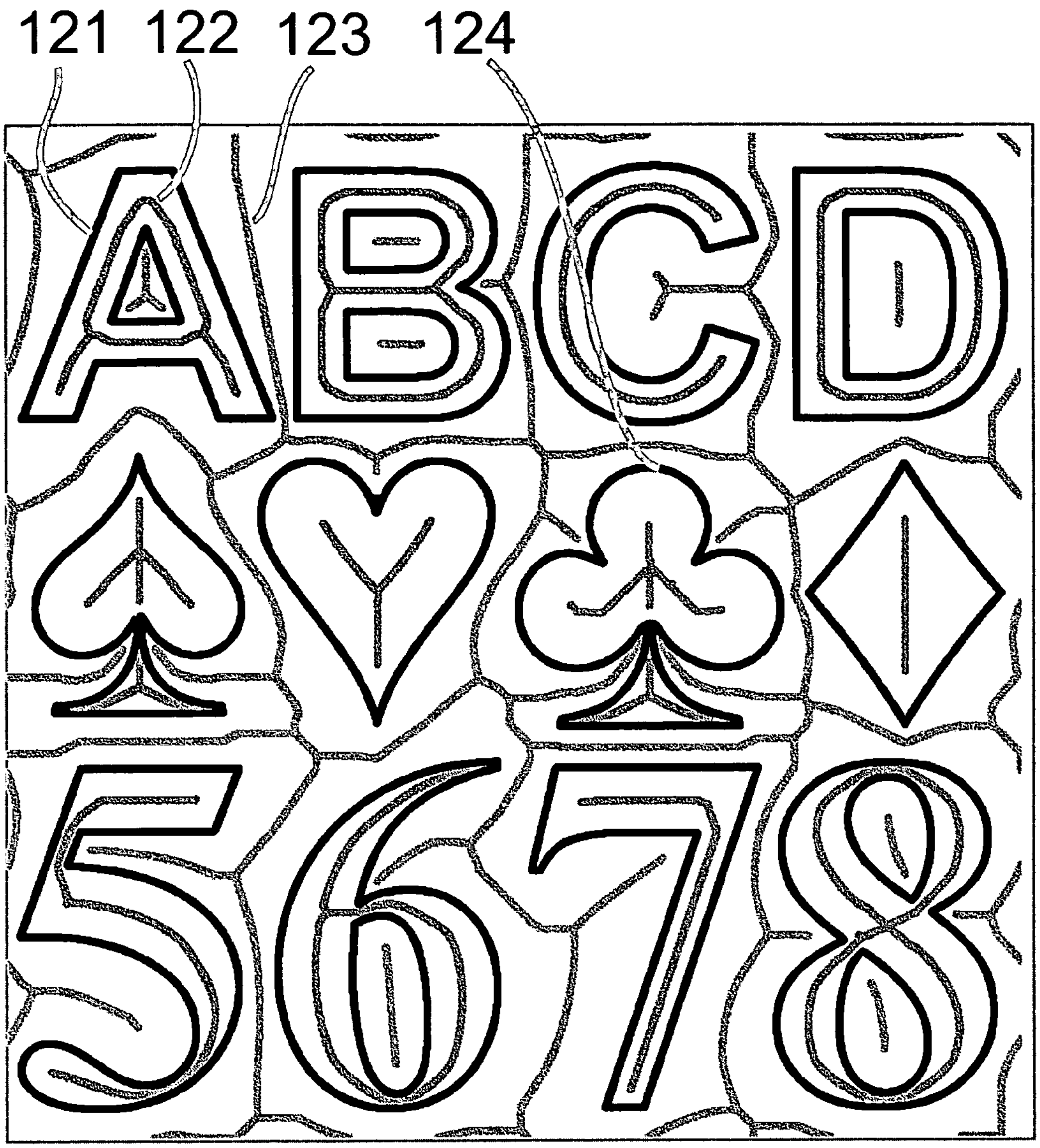
FIG. 12 shows the motif shape boundaries 121, the motif shape foreground skeletons 122 and the motif shape background skeletons 123 of the motif shapes shown in FIG. 11.
Figure 13:
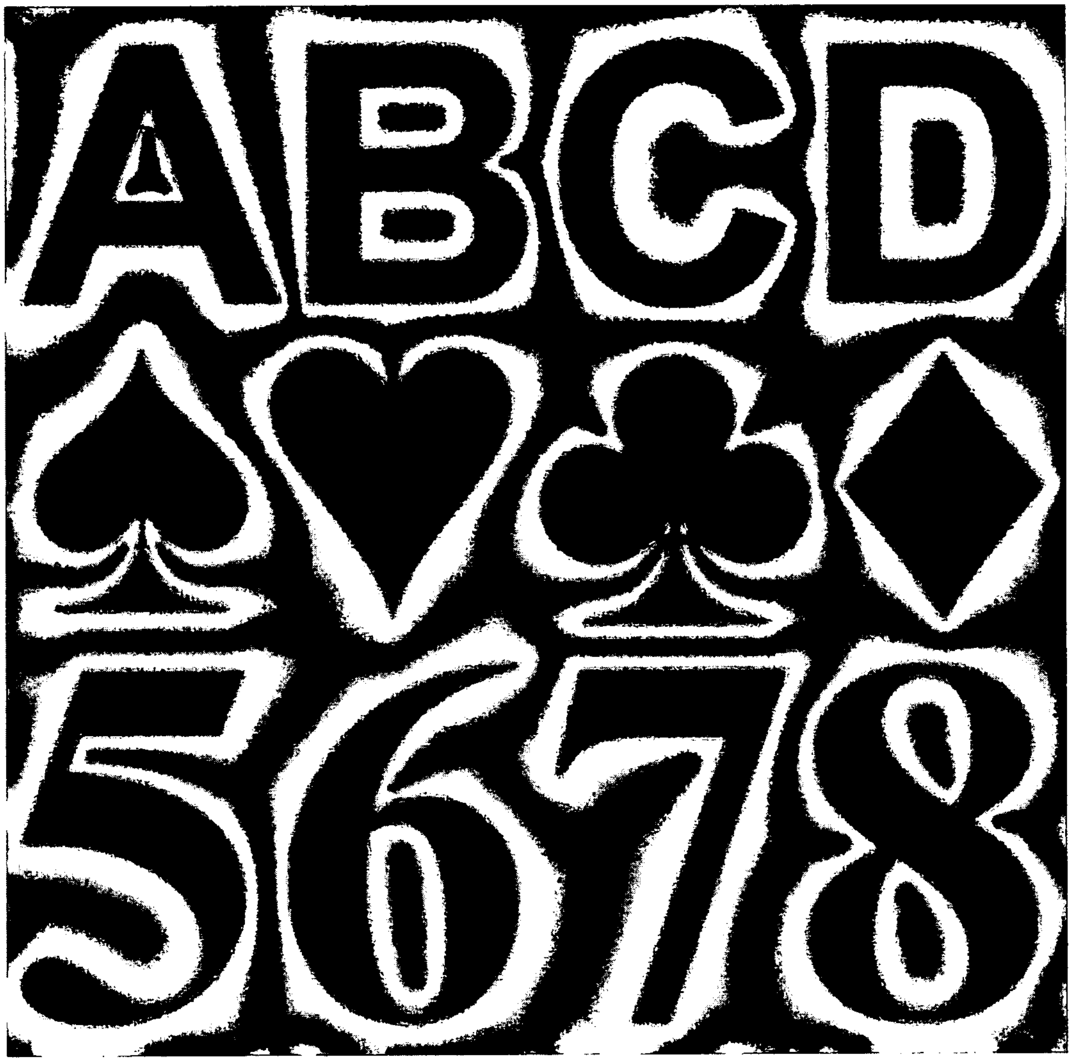
FIG. 13 shows the shape elevation profile computed from the initial bilevel motif shape image of FIG. 11.
Figure 14A:
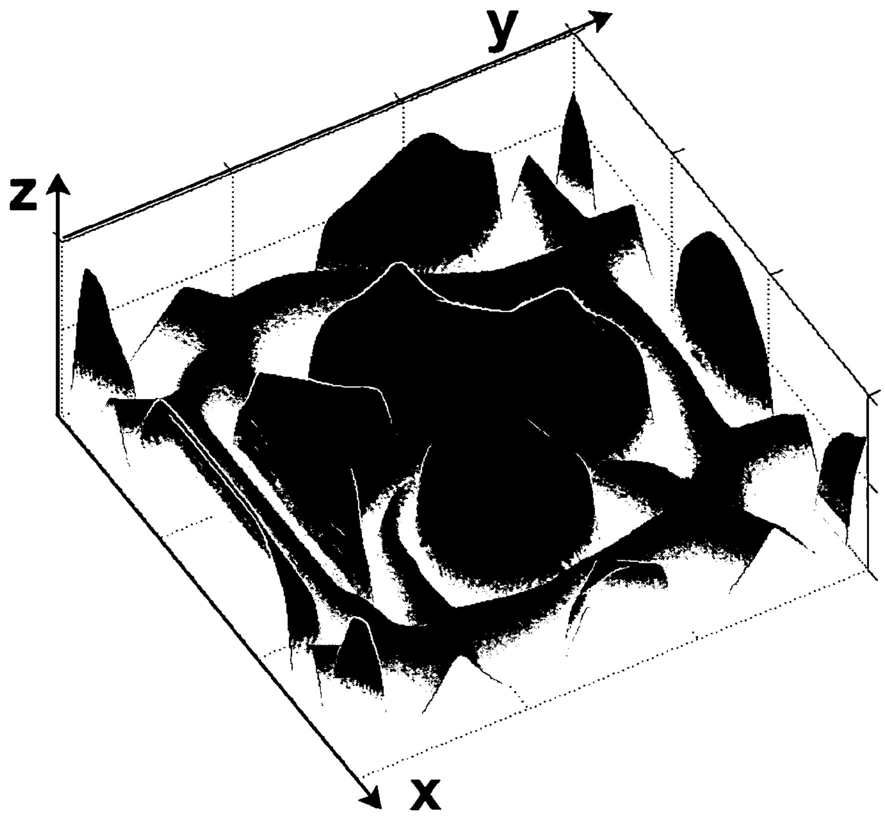
FIG. 14A shows the shape elevation profile (part of FIG. 13) as a 3D function and FIG. 14B as a set of shape level lines.
Figure 14B:
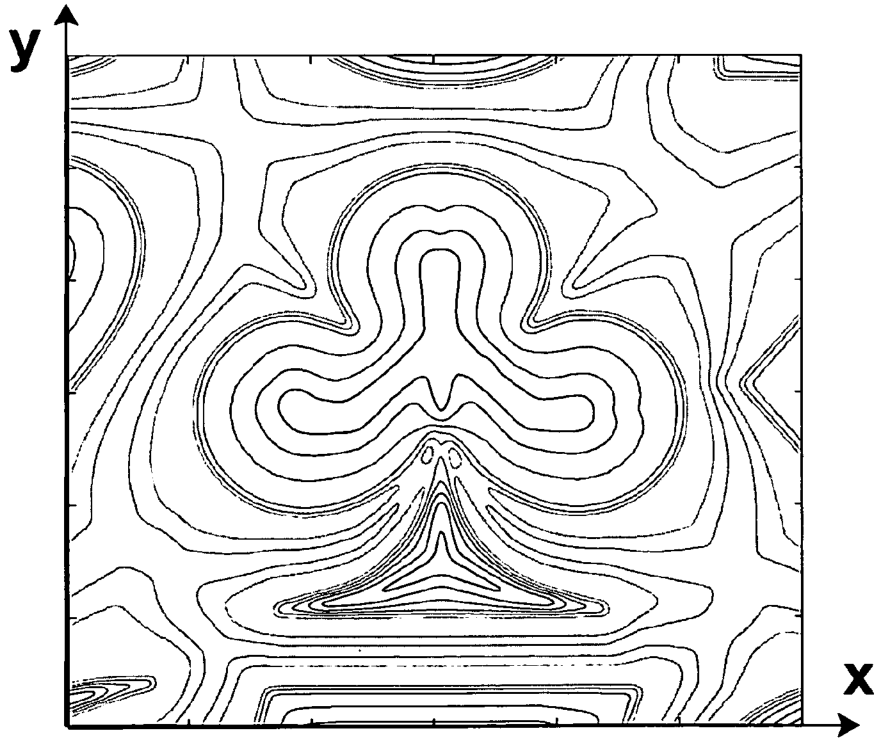
Figure 15:
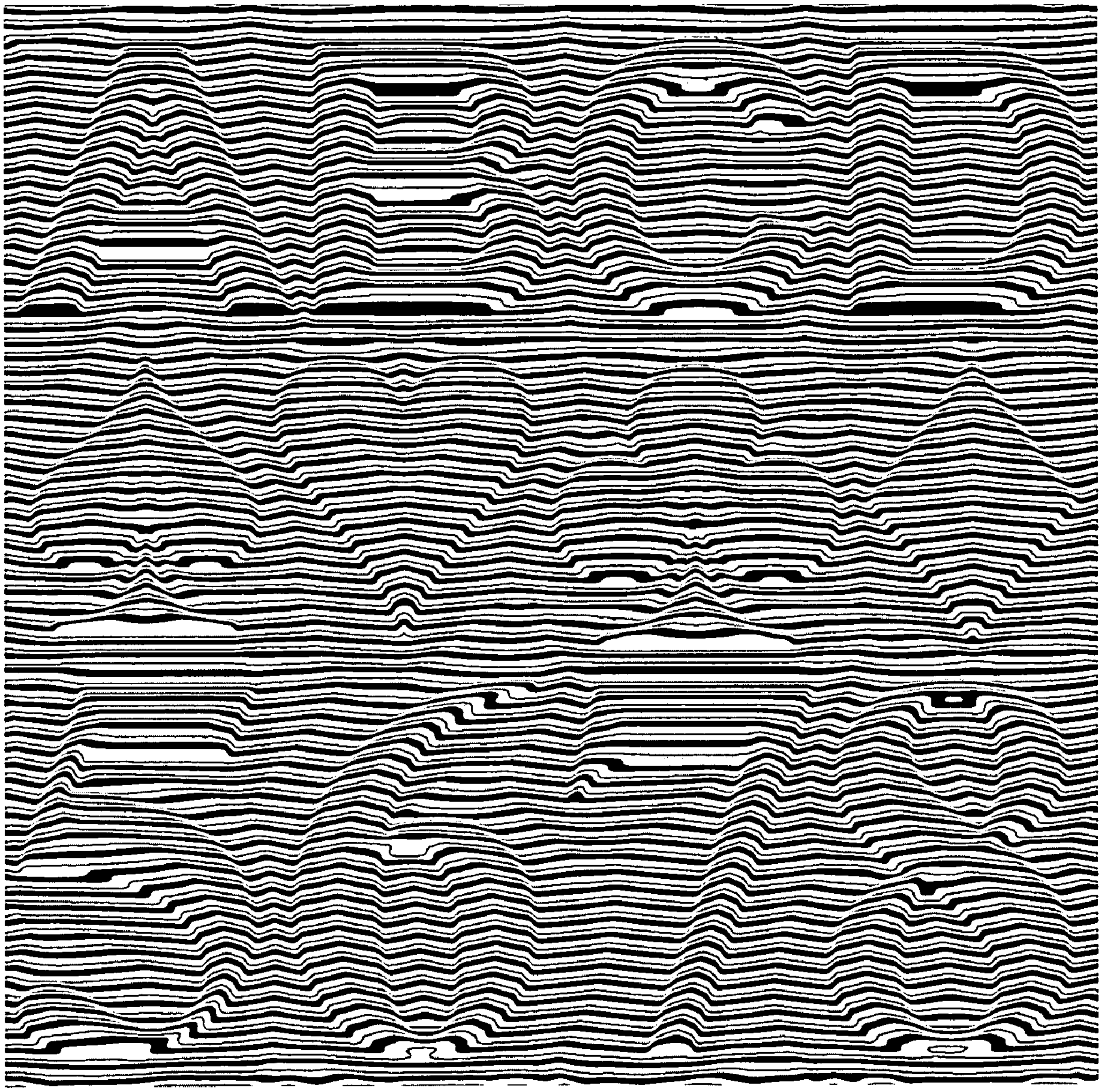
FIG. 15 shows the base layer of FIG. 2 modified according to the shape elevation profile of FIG. 13.
Figure 16:
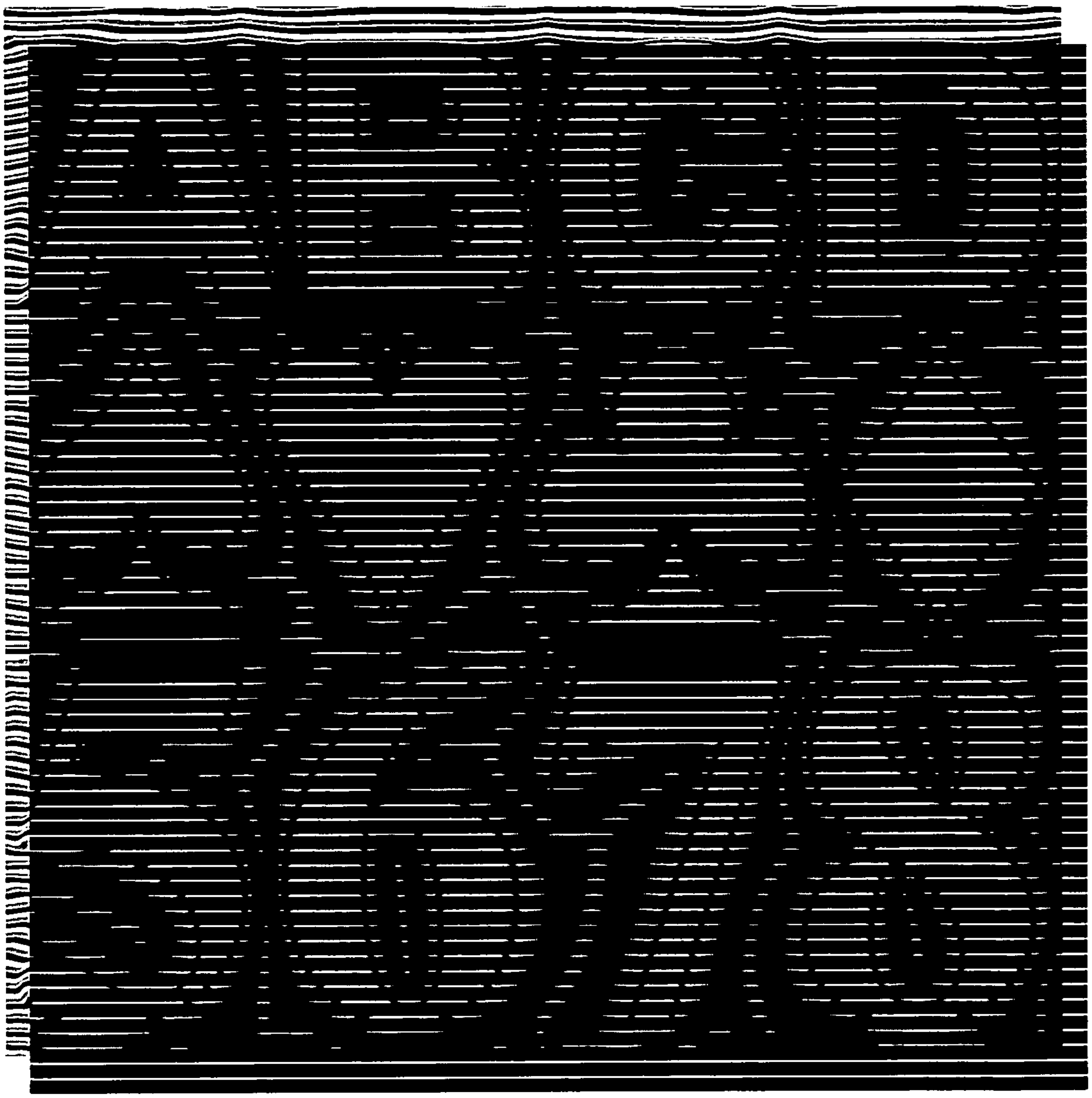
FIG. 16 shows the shape level lines obtained by the superposition of the modified base layer of FIG. 15 and of the revealing layer of FIG. 3.

FIG. 13 shows an example of a shape elevation profile created by applying steps (b) to (e) to the initial bilevel motif shape image shown in FIG. 11. The foreground shape elevation values range from half (0.5: represented by gray) at the boundary to maximal (1: represented by black) on the foreground skeleton. The background shape elevation values range from minimal (0: represented by white) at the boundary to half (0.5: represented by gray) on the background skeleton. A part of this elevation profile is shown in FIG. 14A as a 3D function and in FIG. 14B as a set of level lines which look similar to offset lines of the corresponding bilevel motif shape boundaries (FIG. 12: clover boundaries 124). FIG. 15 shows the base layer of FIG. 2 modified according to that elevation profile and FIG. 16 show the revealed shape level lines obtained by superposing the revealing layer FIG. 3 on top of the modified base layer shown in FIG. 16. When displacing the revealing layer towards a new position, the shape elevation level lines move between the centers of foreground respectively background shapes (i.e. foreground, respectively background skeletons) and the corresponding shape boundaries. The initial bilevel motif shapes from which the shape elevation profile is generated may have any orientation (vertical, oblique or horizontal), i.e. they do not need to be laid out horizontally as in the example of FIG. 11.

Hereinafter, shape level lines which look similar to offset lines of initial motif shape boundaries are called “visual offset lines” of these initial motif shape boundaries. They distinguish themselves from geometric offset lines by the fact that their points are not located at a constant distance from the corresponding motif shape boundaries. However, they share with geometric offset lines the property that successive shape level lines do not intersect each other, i.e. they are imbricated (nested) one into another.

A further embodiment is possible, where instead of starting from a bilevel motif shape image in order to generate the shape elevation profile, the initial motif shape image is simply a digital grayscale image, e.g. an image with intensity levels ranging between 0 and 255. Such a grayscale image may be obtained by digitization with a scanner or with a digital camera, and possibly by postprocessing operations, such as low-pass filtering or converting colors to grayscale intensity levels. A grayscale image may also be obtained by other means, such as for example image synthesis with computer graphics tools. Such an initial motif shape image may be converted into a shape elevation profile by applying filtering operations, e.g. noise removal by median filtering, high-pass filtering in order to enhance the shape boundaries, etc. Alternately the grayscale initial motif shape may directly be used as a shape elevation profile. In the case of a shape elevation profile derived from a grayscale motif shape image, the shape boundaries are formed by the locations of the grayscale motif shape which have high gradient values, i.e. locations representing motif shape edges or boundaries.

Geometric Transformations of Base and Revealing Layers

Geometric transformations are useful for creating matching pairs of transformed base and revealing layers from their original untransformed base and revealing layers. Thanks to different transformations, e.g. selected from a set of admissible transformations, and transformation parameters, e.g. selected from a set of admissible transformation parameters, many different matching pairs of base and revealing layers enable creating many different instances of a secure item. For example, a train ticket may incorporate every week a different base layer which can be authenticated only with its matching revealing layer. Potential counterfeiters will then not be able to keep track of constantly varying secure items. We propose two variants of generating transformed base and revealing layers.

Admissible transformations and their corresponding admissible parameters or parameter ranges are selected, e.g. by trial and error, so as to ensure that both the resulting curvilinear base layer sets of lines and the resulting curvilinear revealing line grating are still reproducible on the target secure item (i.e. printable or imageable).

Figure 17:
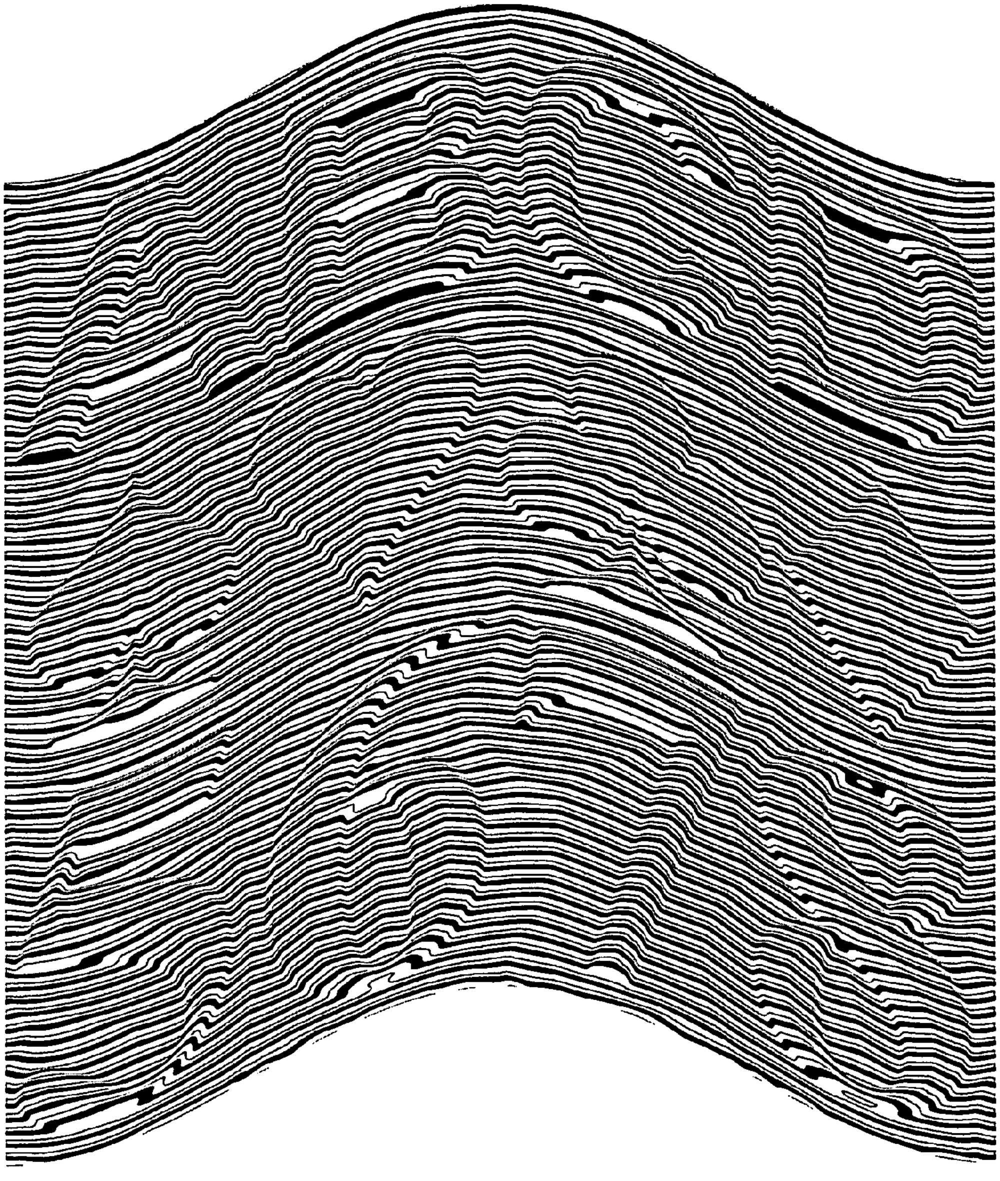
FIG. 17 shows the geometrically transformed modified base layer shown in FIG. 15.
Figure 18:
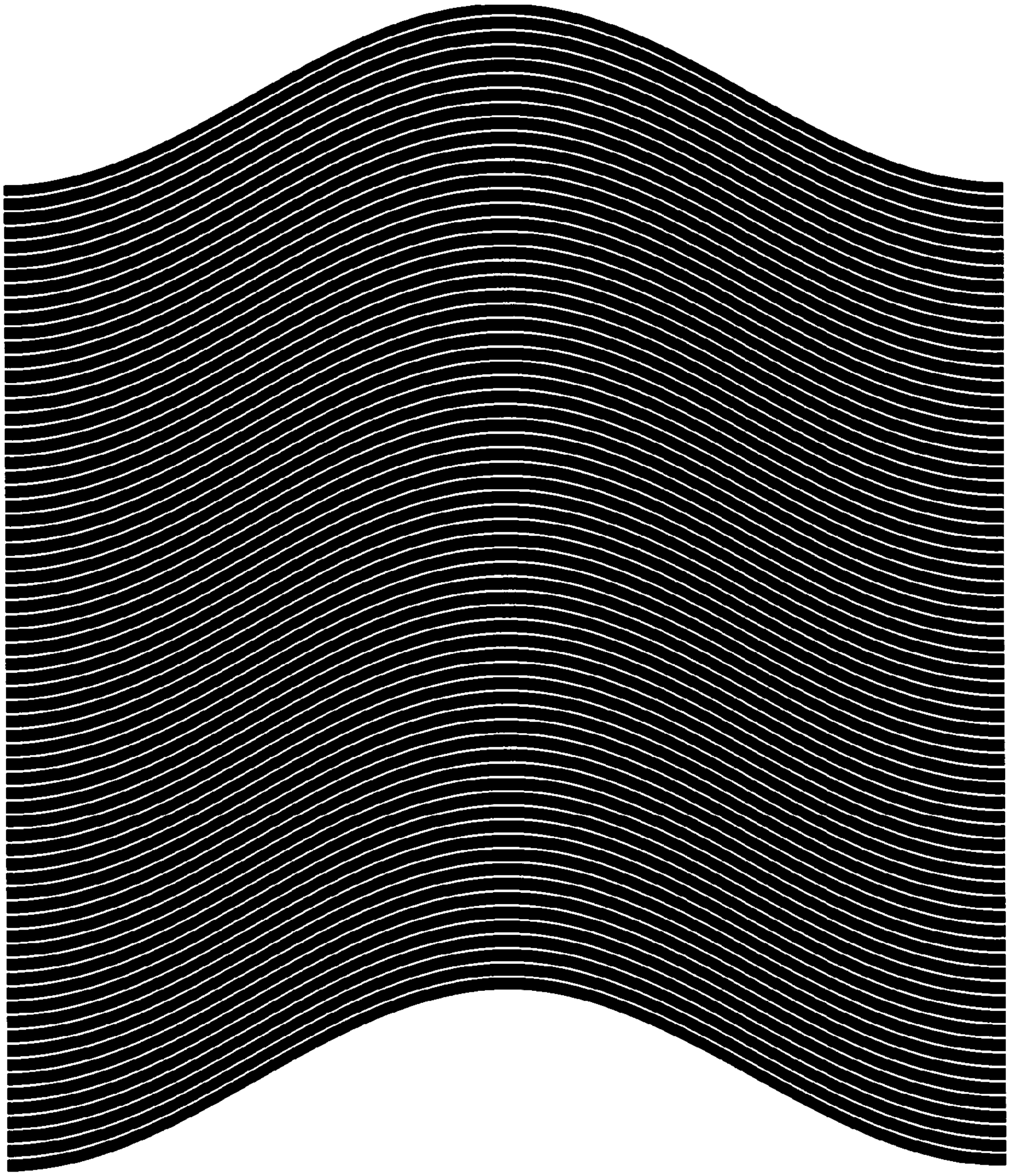
FIG. 18. shows the geometrically transformed revealing layer shown in FIG. 3.

A) Applying a Geometric Transformation to the Base and Revealing Layers After Having Embedded the Shape Elevation Profile into One of these Layers The shape elevation profile is first embedded into the base or revealing layer and then the same geometric transformation is applied to both the base and the revealing layers. When superposing the base layer and the revealing layer we obtain the transformed shape level lines. These level lines are transformed according to the same geometric transformation that has been applied to the base and revealing layers. As an example, FIG. 13 shows a shape elevation profile, FIG. 15 the modified base layer, FIG. 16 the shape level lines of the superposition of the original, i.e. untransformed, base and revealing layers, FIG. 17 the transformed modified base layer, FIG. 18 the transformed revealing layer, and FIG. 19 the transformed shape level lines obtained by superposing the transformed revealing layer (FIG. 18) on top of the transformed modified base layer (FIG. 17). In the present example, the geometric transformation applied to the base and revealing layers is a cosinusoidal transformation mapping from transformed space (x,y) back to the original space (x',y')

$$y'=h_y(x,y)=y+c_1\cos(2\pi(x+c_3)/c_2) \quad (6)$$

where $c_1$, $c_2$, and $C_3$ are parameters of the cosinusoidal transformation. Since the original unmodified and untransformed base and revealing layer lines are horizontal, the transformation is completely defined by the function $y'=h_y(x,y)$. However, in other cases, one needs to also give the part of the transformation yielding the x-coordinate, i.e. $x'=h_x(x,y)$.

Figure 19:
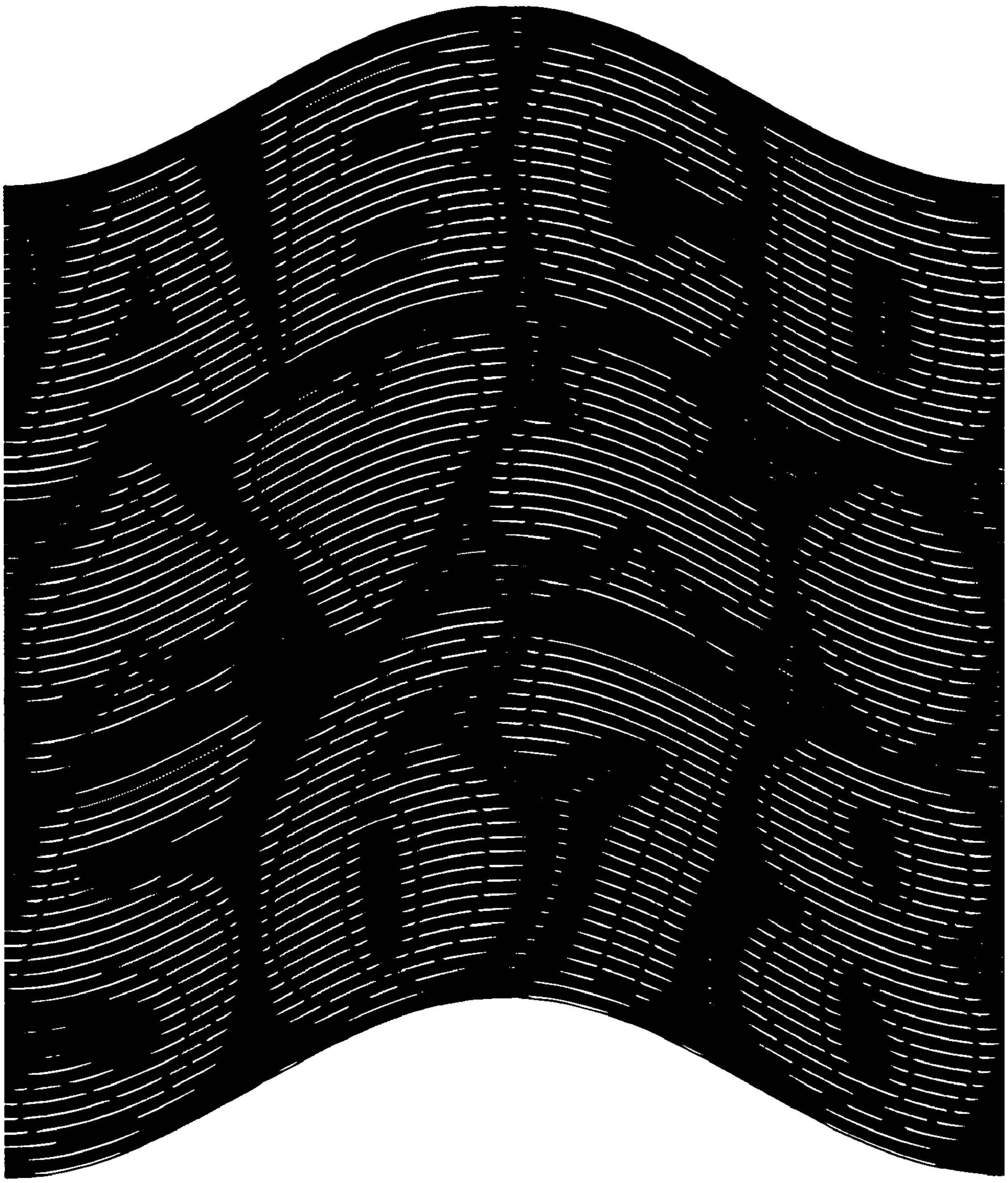
FIG. 19 shows the level lines obtained by the superposition of the geometrically transformed modified base layer shown in FIG. 17 and of the geometrically transformed revealing layer shown in FIG. 18, at one relative phase of base and revealing layers.
Figure 20:
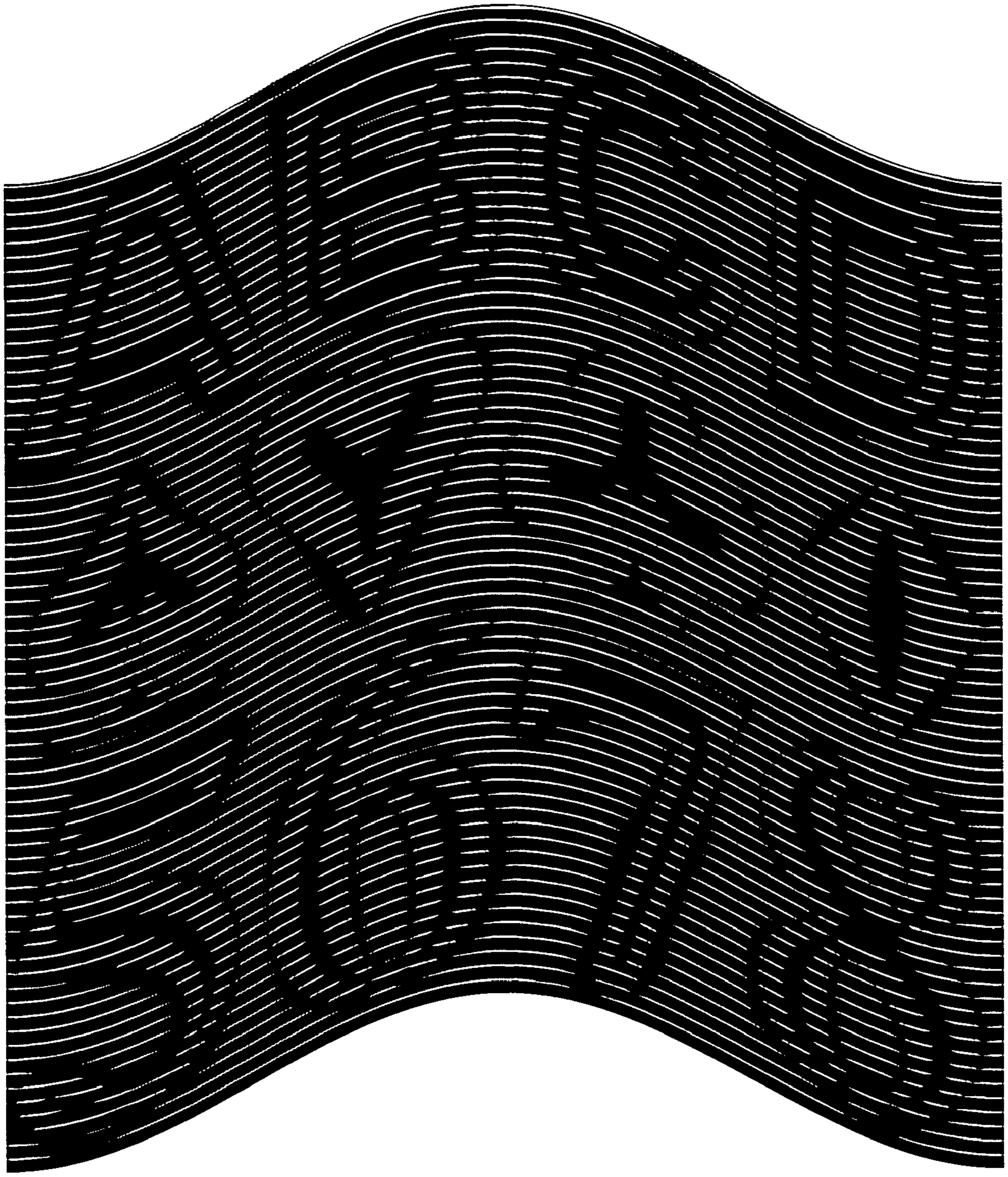
FIG. 20 shows the same superposition as in FIG. 19, but at a different relative superposition phase of base and revealing layers.

When the revealing layer (FIG. 18) is slightly vertically displaced on top of the base layer, the relative superposition phase of base and revealing layer changes and the shape level lines of the superposition image shown in FIG. 19 move either towards the foreground, respectively the background skeletons (i.e. shape foreground centers, respectively background centers) or towards the boundaries of the initial motif shape image from which the elevation profile is generated (FIG. 20).

B) Embedding the Shape Elevation Profile into the Geometrically Transformed Base or Revealing Layer By embedding the original elevation profile either into the geometrically transformed base layer or into the geometrically transformed revealing layer, one may obtain, when superposing the two layers substantially the same shape level lines as the shape level lines obtained when superposing the corresponding original untransformed base and revealing layers. In the following explanation, the spatial elevation profile is embedded into the base layer. However, it may according to the same procedure be equally well embedded into the revealing layer. The selected geometric transformation is applied to both the base and revealing layers before embedding the spatial elevation profile. Then, the spatial elevation profile is embedded into the base layer as follows. At each position (x,y) of the transformed modified base layer, the corresponding position $(x',y')=(h_x(x,y), h_y(,x,y))$ in the original untransformed base layer (x',y') is found, where $h_x$ and $h_y$ express the transformation from the transformed base layer space back to the original base layer space. Then, the shifted position (x',y'-z) within the original base layer is found according to the current elevation profile value $z=f(x,y)$ at the position (x,y) of the modified transformed base layer. The intensity, respectively color c at position (x',y'-z) of the original untransformed base layer is read and copied (written) into the modified transformed base layer at position (x,y).

Figure 21:
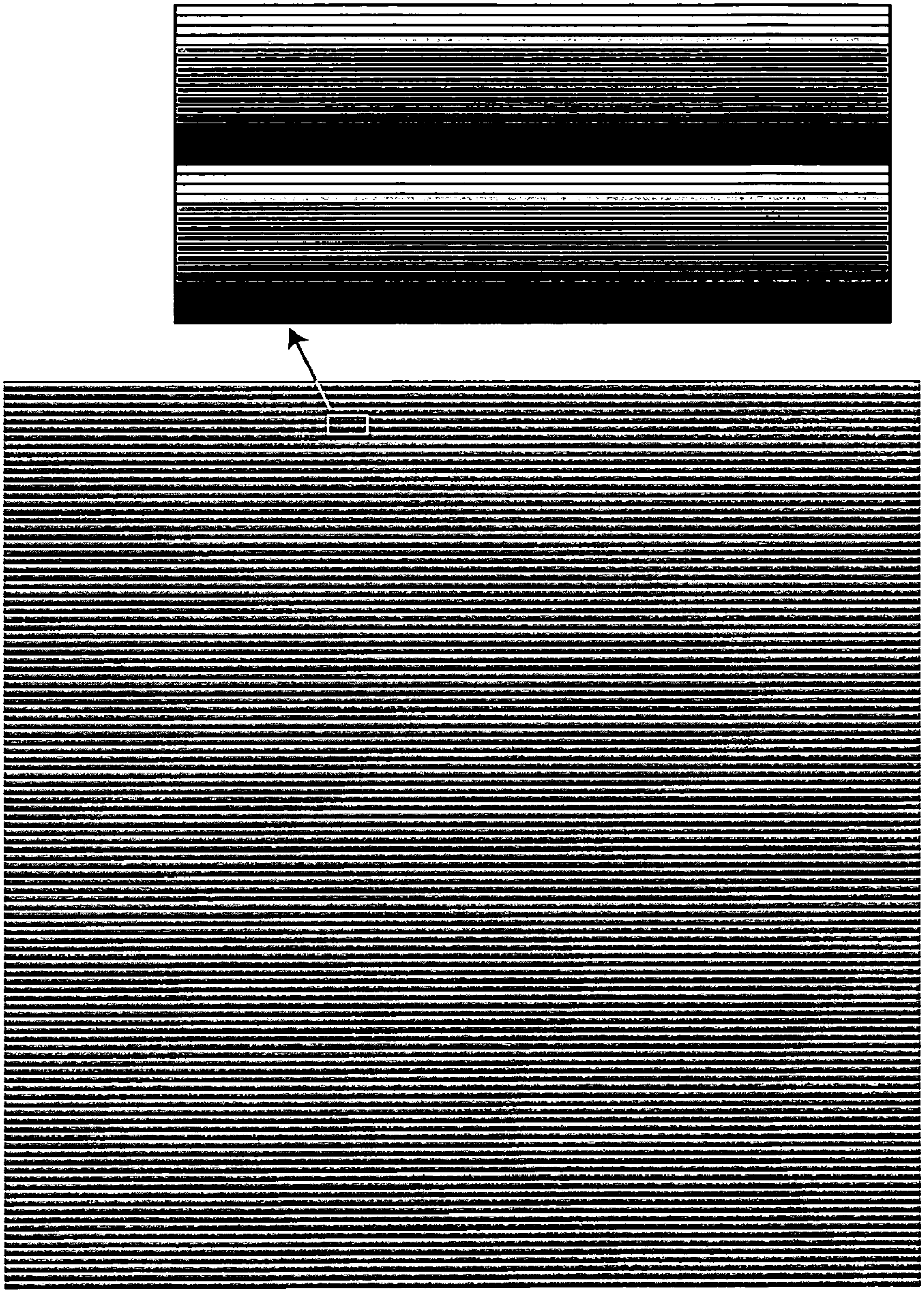
FIG. 21 shows an original, untransformed, base layer where each set of lines of the replicated sets of lines incorporates lines of increasing intensity.
Figure 22:
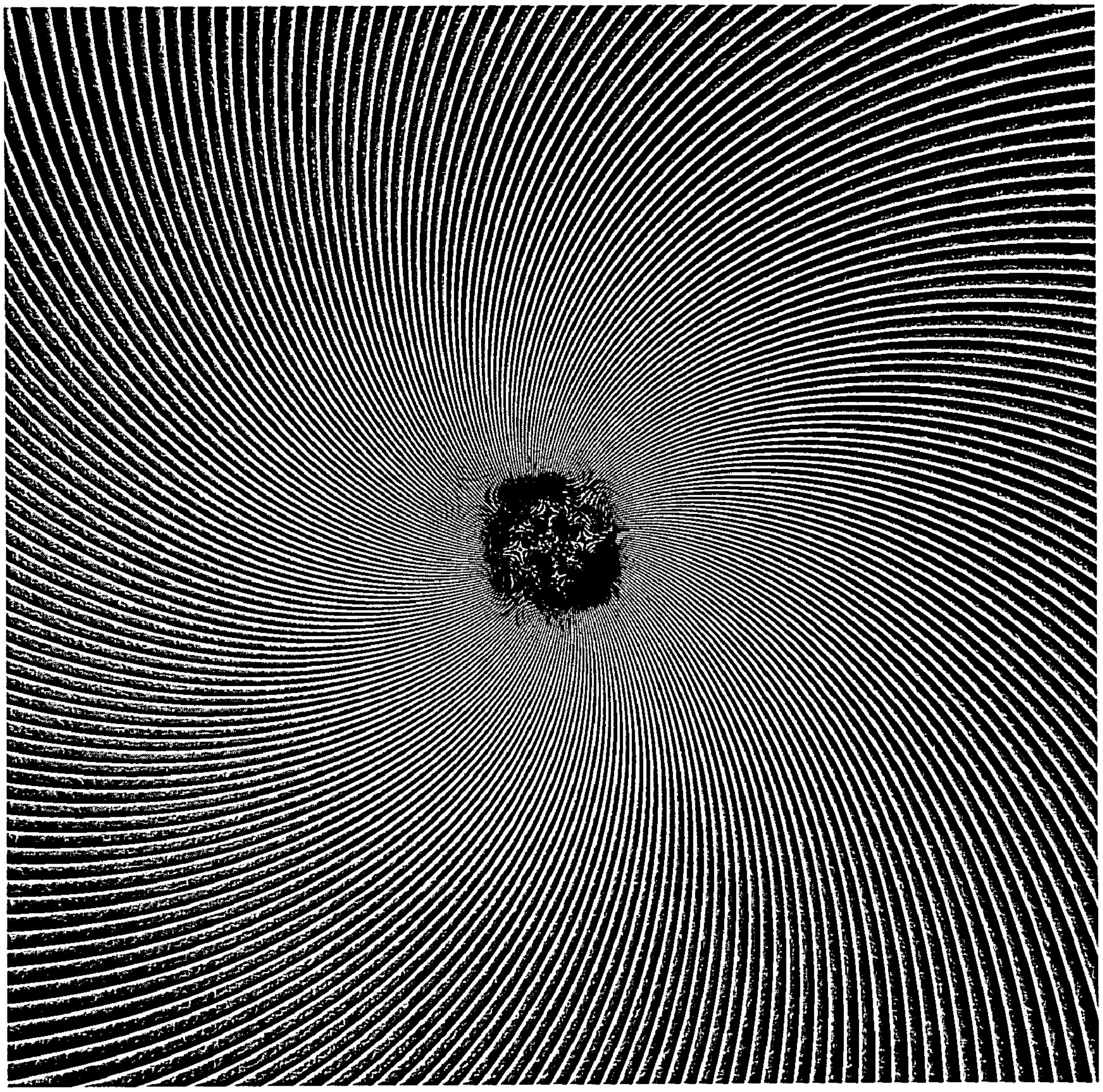
FIG. 22 shows an example of transformed base layer sets of lines, obtained from the original untransformed set of lines shown in FIG. 21 by applying a "spiral transformation"

As an example, FIG. 21 shows an original, untransformed, base layer where each set of lines of the replicated sets of lines incorporates juxtaposed thin lines, with intensities of successive lines varying from the lowest (0: black) to the highest intensity (1: white). One can also conceive such a set of thin lines as one thick line having a transversal intensity profile ranging from lowest intensity (0: black) to highest intensity (1: white). FIG. 22 shows the corresponding transformed base layer, where the geometric transformation from transformed base layer space (x,y) to original base layer space (x',y') is a "spiral transformation" given by $$\begin{aligned} y' &= h_y(x, y) \\ &= c_m\sqrt{(x-c_x)^2+(y-c_y)^2} + \frac{a\tan2(y-c_y,\, x-c_x)\mathrm{mod}(2\pi)}{2\cdot\pi}T_b\cdot n_s \end{aligned} \tag{7}$$

where $c_x$ and $c_y$ are constants giving the center of the spiral line grating, $c_m$ is a scaling factor, $T_b$ is the base layer sets of line period in the original space, $n_s$ is the number of spirals leaving the center of the spiral line grating and atan2 is the four-quadrant inverse tangent (arctangent) yielding values between $-\pi$ and $\pi$. In the present case, since the original untransformed base layer lines and revealing layer lines are horizontal, the transformation is completely defined by the function $y'=h_y(x,y)$.

Figure 23:
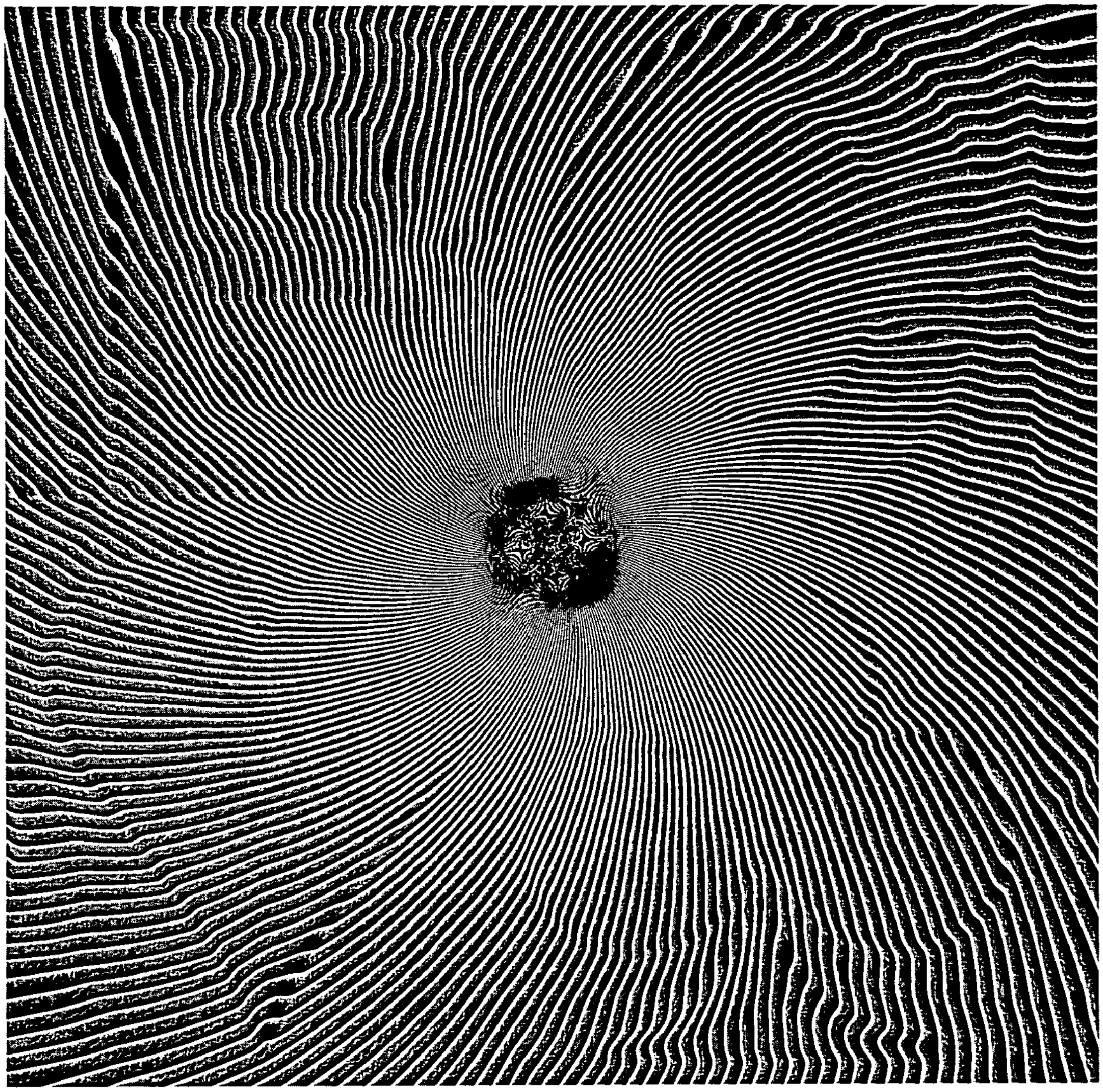
FIG. 23 shows the modified transformed base layer sets of lines, obtained by embedding into the transformed base layer sets of lines shown in FIG. 22 the shape elevation profile shown in the top middle part of FIG. 16 ("B", "C", heart, and clover motif shapes)
Figure 24:
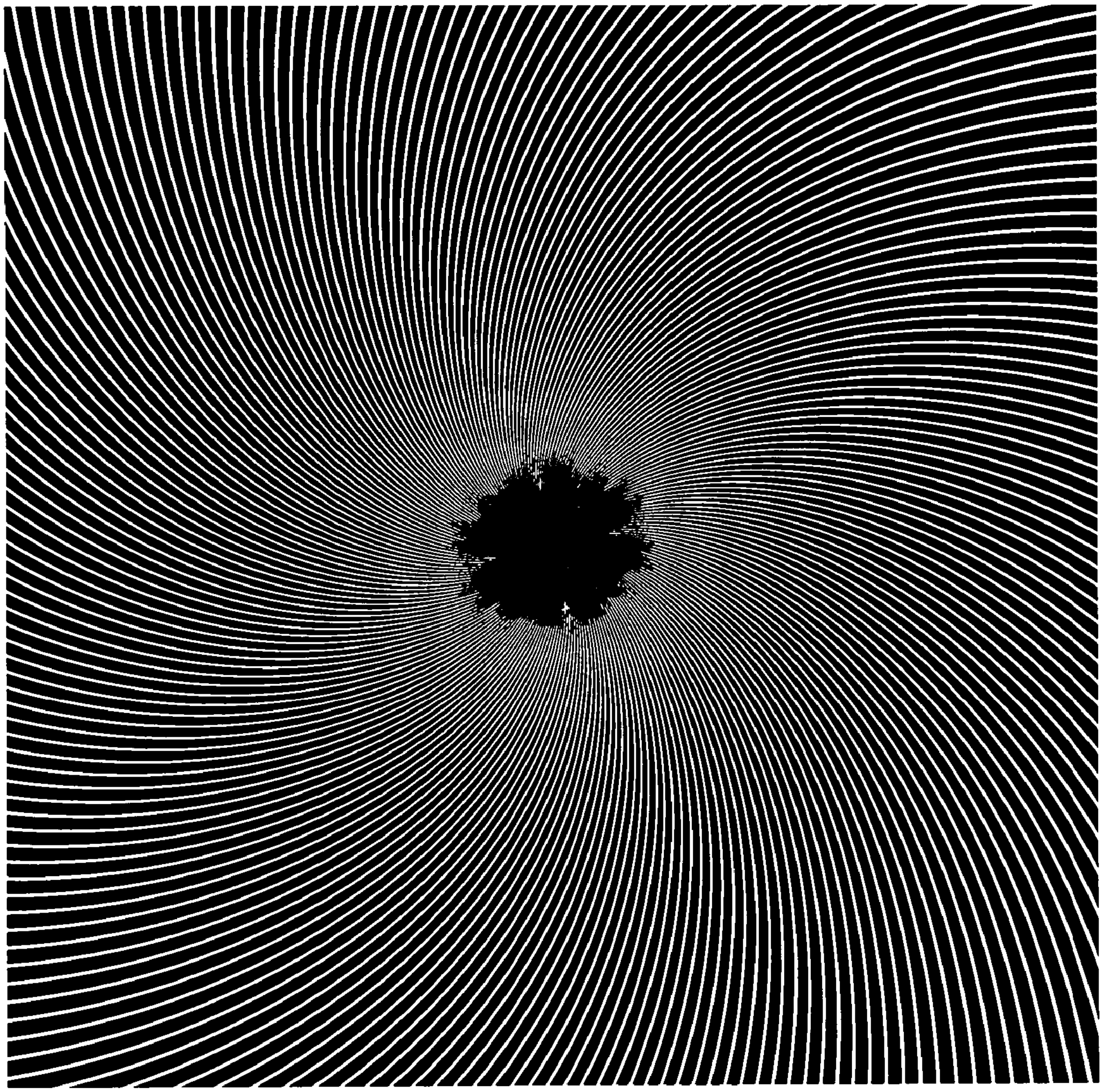
FIG. 24 shows the transformed revealing layer line grating, obtained from the original untransformed revealing layer line grating shown in FIG. 3 by applying the same transformation, that was applied to the base layer sets of lines (in the present case the spiral transformation)
Figure 25:
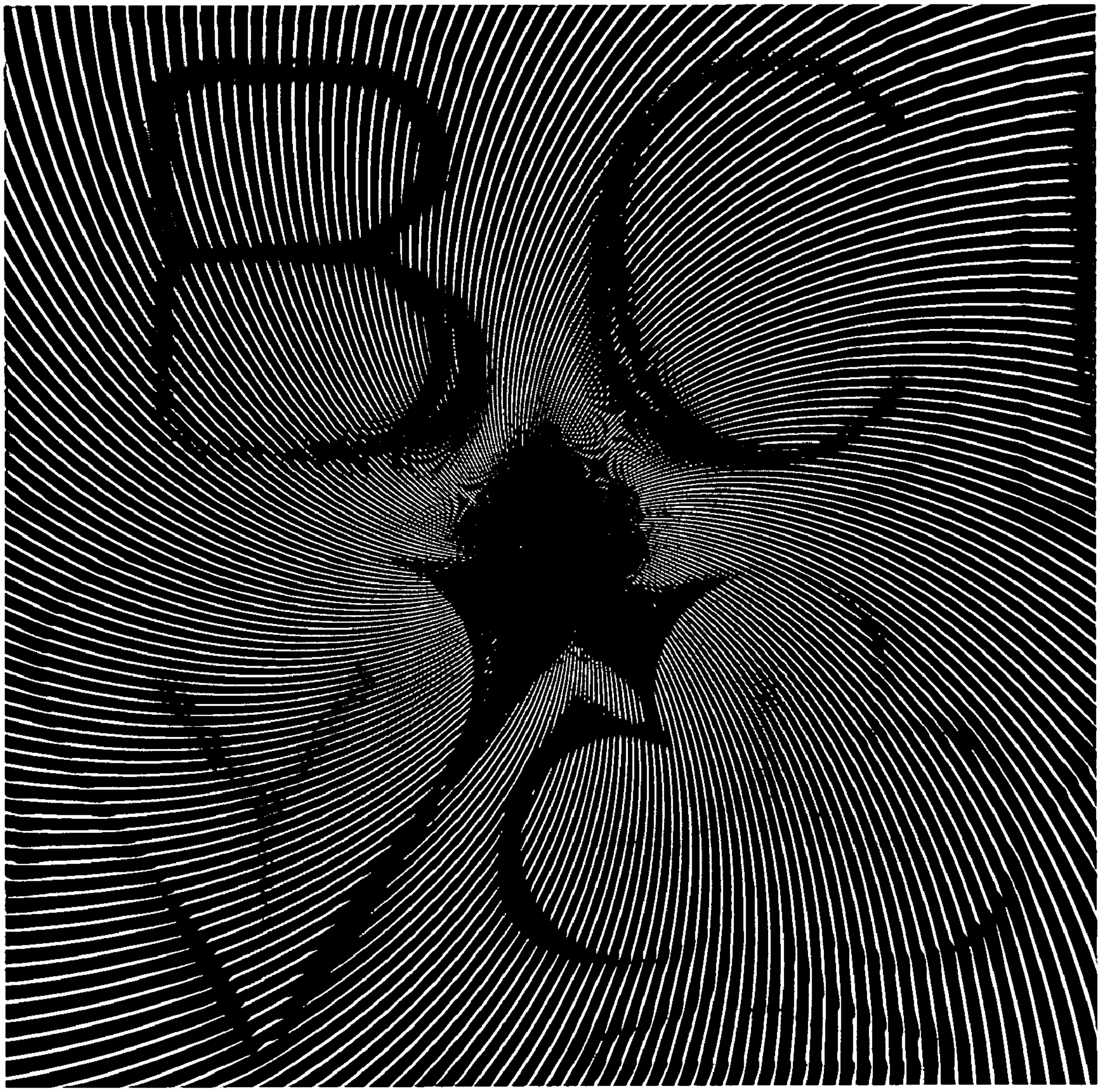
FIG. 25 shows the level lines produced by the superposition of the transformed revealing line grating shown in FIG. 24 and of the modified transformed base layer sets of lines shown in FIG. 23.
Figure 26:
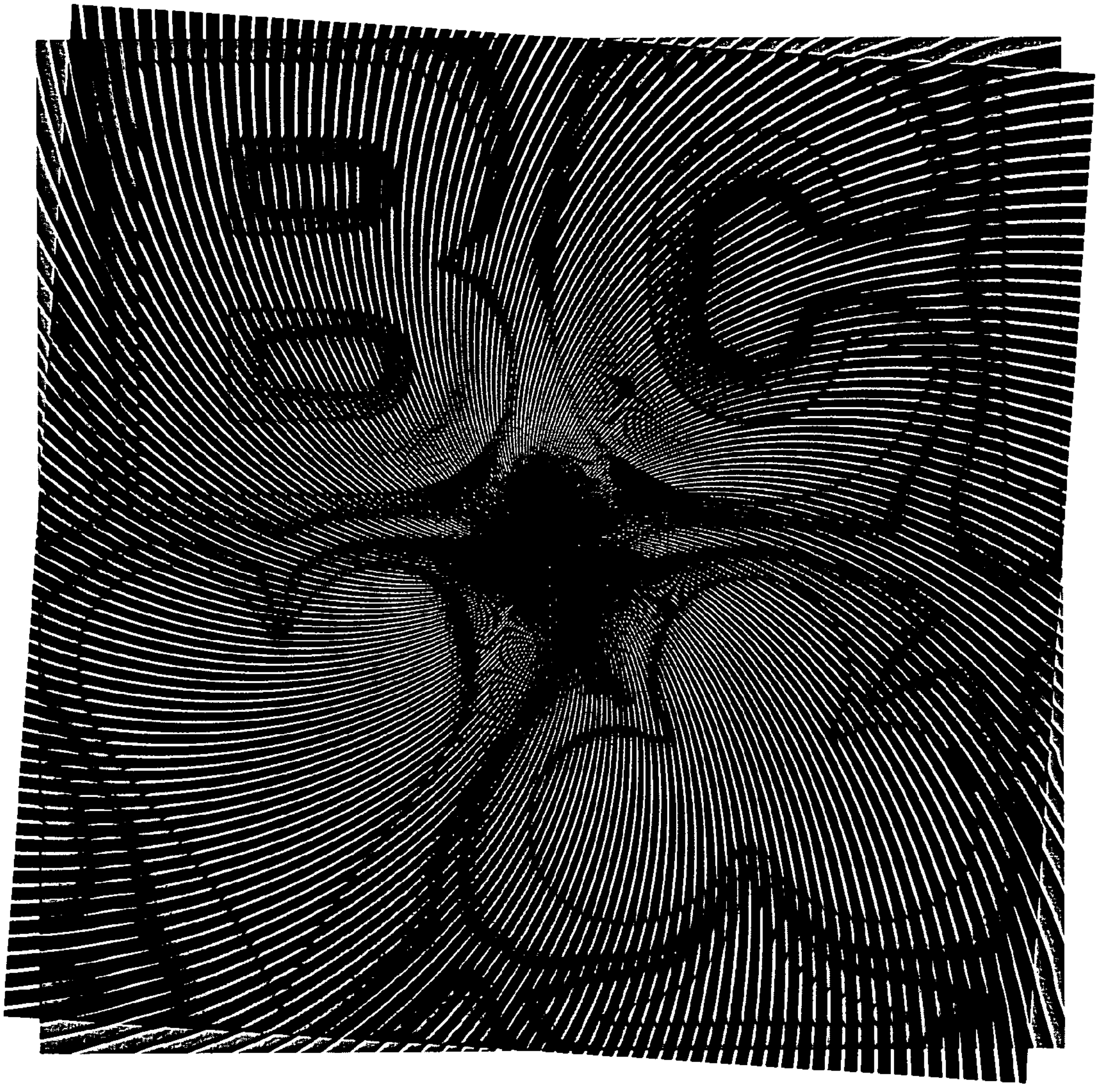
FIG. 26 shows the level lines produced by the superposition of the transformed revealing line grating shown in FIG. 24 and of the modified transformed base layer sets of lines shown in FIG. 23, after having modified the relative superposition phase of base and revealing layers, in the present case, after having rotated the revealing layer.

FIG. 23 shows the modified and transformed base layer embedding the elevation profile, computed according to the explanations given above. FIG. 24 shows the revealing layer, transformed according to the same transformation (7) as the one that was applied to the original base layer. FIG. 25 shows the shape level lines produced by the superposition of the transformed revealing layer and of the modified transformed base layer. FIG. 26 shows the shape level lines of the superposition of the transformed revealing layer and of the modified transformed base layer at a different relative superposition phase $\tau_r$ of base and revealing layers, where $\tau_r$ refers to the relative superposition phase of the original untransformed base and revealing layers. In the present example, a different relative superposition phase $\tau_r$ is achieved by rotating the transformed revealing layer on top of the modified transformed base layer, around the center locations of the revealing and base layer spirals. Despite the fact that geometric transformations were applied to both the base and revealing layer, the resulting level lines are very similar to the ones that are shown in the superposition of the untransformed layers (FIG. 16).

Embedding the Elevation Profile into a Halftone Image

One may create as base layer a halftone black-white or color image embedding a shape elevation profile. When looking at the base layer, one simply observes the halftone image, e.g. the face of the holder of an identity document (e.g. FIG. 27). When one superposes the revealing layer (e.g. FIG. 24) corresponding to that base layer on top of it, the shape level lines of the shape elevation profile embedded into the base layer halftone image are revealed and are clearly recognizable (e.g. FIG. 28).

We use the terms halftoning and dithering interchangeably. One simple way of creating such a halftone image consists in taking as a dither matrix a modified possibly transformed intermediate layer (initially a base layer, now called intermediate base layer) comprising sets of lines. Each line within each of these sets of lines has its specific intensity and line intensities within each of these sets of lines are distributed across the full intensity range. The modified possibly transformed intermediate base layer embeds a shape elevation profile. For example, the modified transformed base layer with sets of lines having lines of increasing intensity shown in FIG. 23 is taken as the dither matrix. By halftoning (dithering) an input grayscale or color image with that dither matrix, one obtains as final base layer a halftone image embedding the shape elevation profile (e.g. FIG. 27) that is present in the modified transformed intermediate base layer, used as a dither matrix. Note that the final base layer halftone image embedding the shape elevation profile also comprises sets of lines, with line intensities, respectively colors, which depend on the intensity, respectively color, of the input grayscale image, respectively color image.

Figure 27:
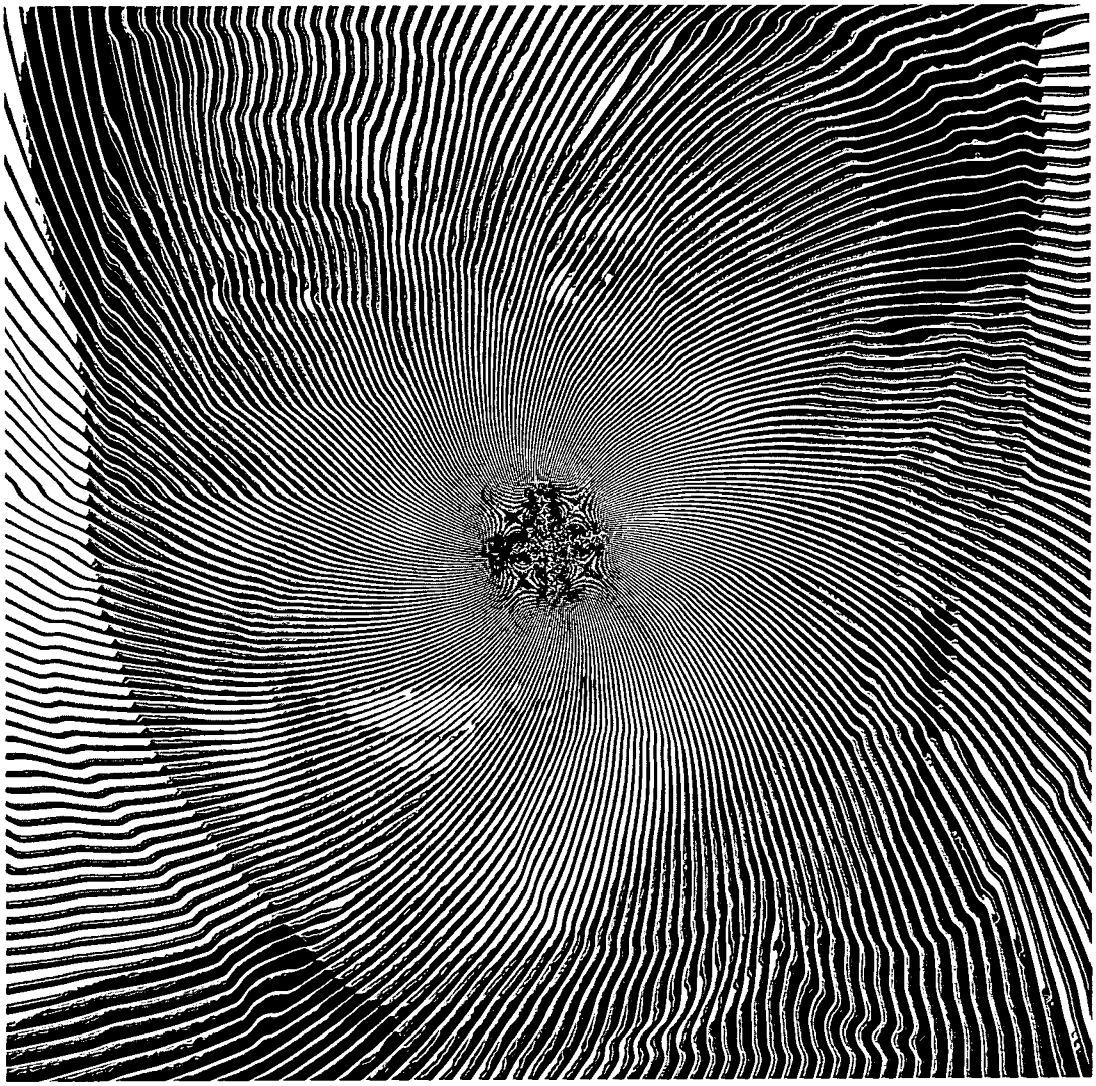
FIG. 27 shows the halftone image of a face, dithered by taking the modified transformed sets of lines shown in FIG. 23 as dither matrix.
Figure 28:
FIG. 28 shows the level lines produced by the superposition of the halftone image shown in FIG. 27 and of the transformed revealing line grating shown in FIG. 24.
Figure 29:
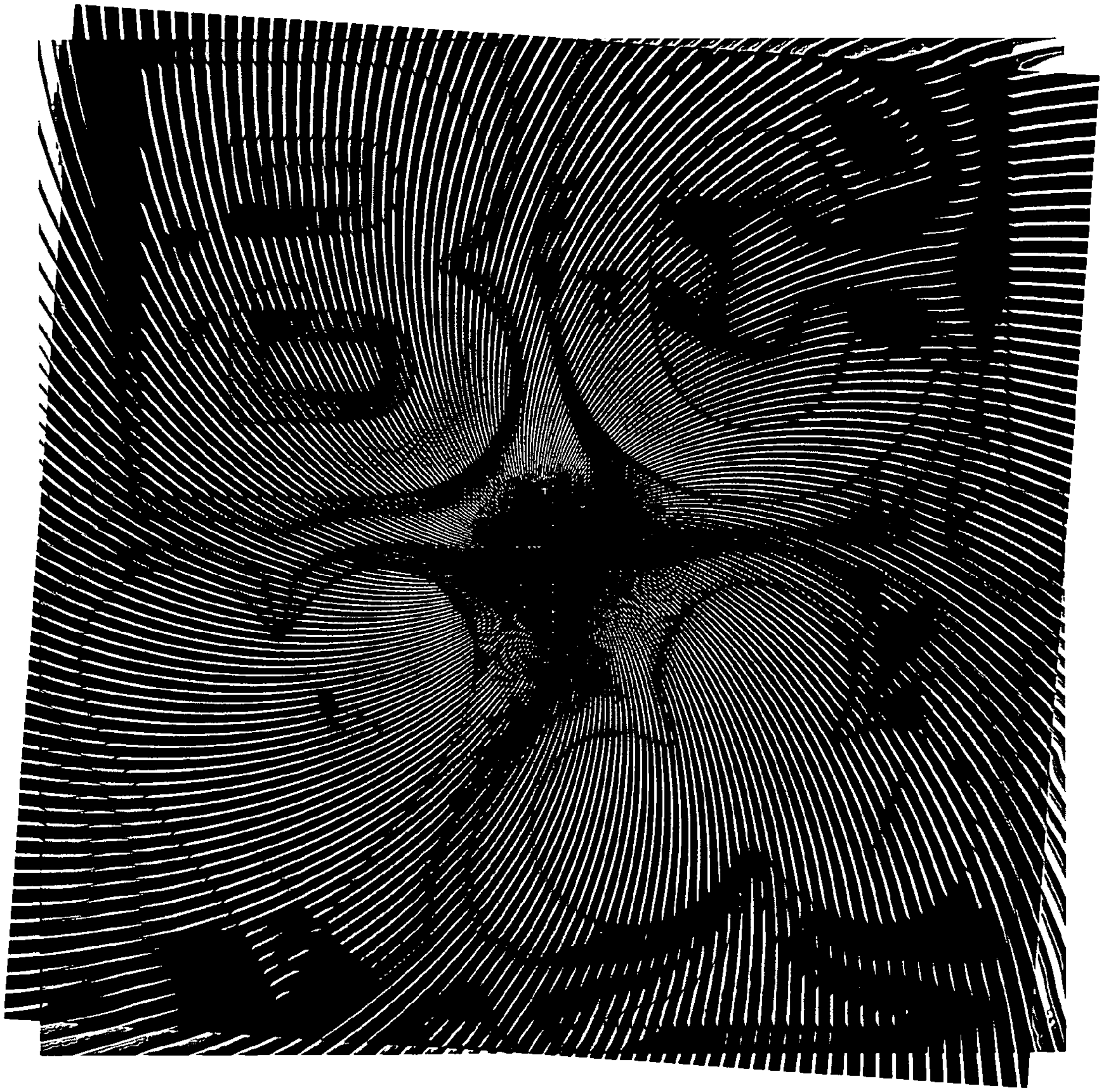
FIG. 29 shows the level lines produced by the superposition of the halftone image shown in FIG. 27 and of the transformed revealing line grating shown in FIG. 24, after having rotated the revealing layer on top of the base layer.

By superposing the revealing layer having undergone the same transformation as the transformed base layer sets of lines on top of the halftone image embedding the shape elevation profile, its shape level lines are revealed. FIG. 28 shows the shape level lines obtained by superposing the transformed revealing layer (FIG. 24) and the halftoned image incorporating the shape elevation profile (FIG. 27). FIG. 29 shows the same superposition, but at a slightly different relative superposition phase of base layer and revealing layer. In both cases, the shape level lines are clearly recognizable. They are visual offset lines of the initial motif shape boundaries and move between these initial motif shape boundaries and the foreground and background shape centers (i.e. the foreground and background skeletons).

By halftoning (dithering) an input color image with a dither matrix embedding the shape elevation profile, one may obtain color shape level lines. For halftoning a color image, one may simply halftone (dither) each of the color layers (e.g. cyan, magenta, yellow) separately and print them in phase. Or one may apply the multicolor dithering method described in U.S. patent application Ser. No. 09/477,544 filed Jan. 4, 2000 to Ostromoukhov, Hersch and in the paper "Multi-color and artistic dithering" by V. Ostromoukhov and R. D. Hersch, SIGGRAPH Annual Conference, July 1999, pp. 425-432.

Composed Base Layer Incorporating Mutually Rotated Base Layer Elements

Incorporating several independent base layer sets of lines (hereinafter called "base layer elements") laid out at different angles (i.e. mutually rotated) into the same composed base layer adds a further obstacle to counterfeiting attempts since the fine structure of the composed base layer becomes very complex. The individual base layer elements may be successively incorporated into the composed base layer according to any layer combination operation. Examples of layer combination operations are bitmap "OR" operation, bitmap "AND" operation, blending the layers according to their intensity, respectively colors (see Adobe Photoshop help "Selecting a blending mode"), spatial merging operation between different layers by allocating to each layer small subspaces juxtaposed with the other layer subspaces, etc.). Despite the complexity of the fine structure, the superposition of corresponding authentic base and revealing layers still reveals recognizable shape level lines.

Figure 30:
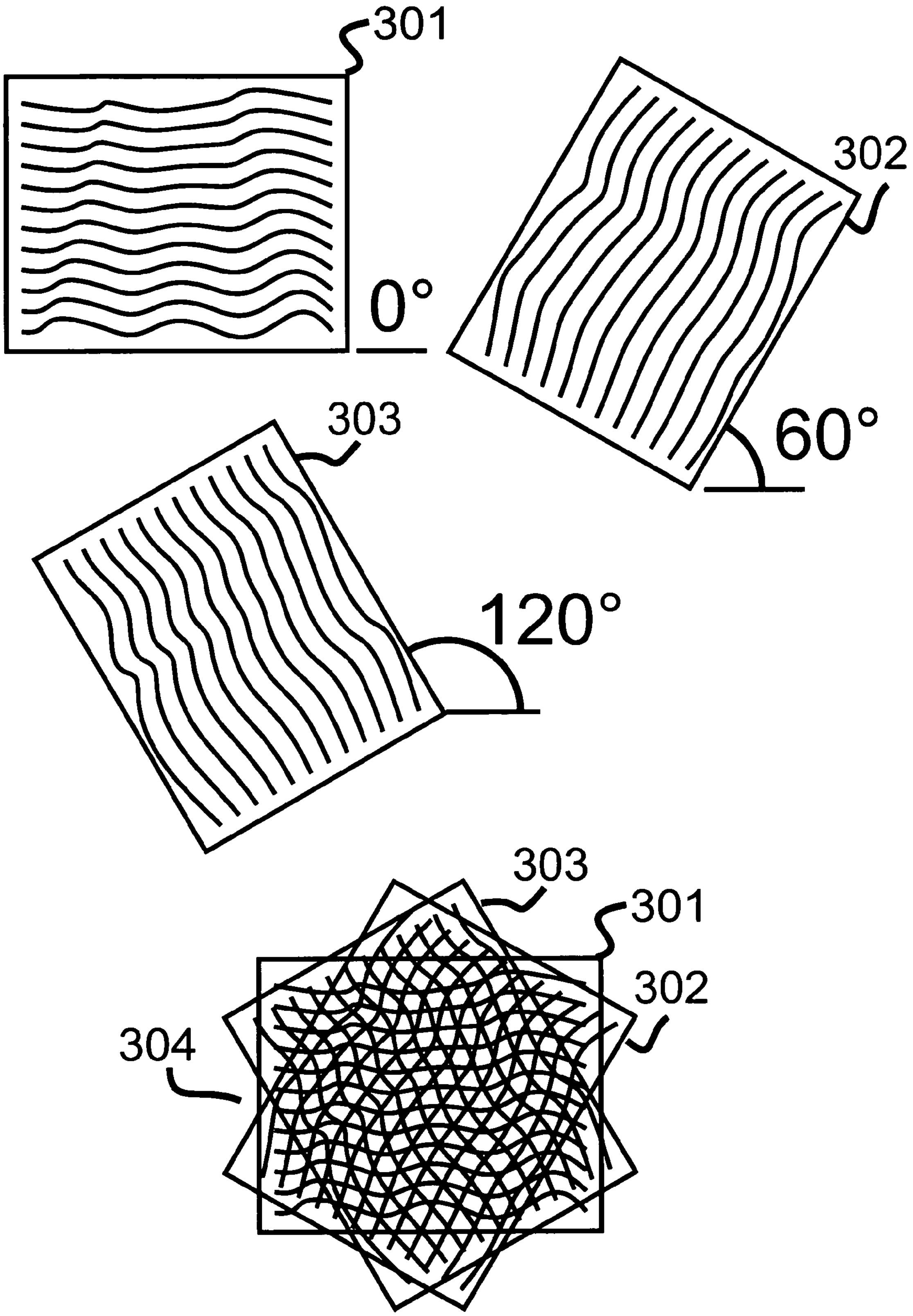
FIG. 30 shows schematically a composed base layer incorporating several mutually rotated modified sets of lines.

Each modified base layer element (modified repeated sets of lines) forming the composed base layer embeds its specific shape elevation profile. It is possible to have two, three or more base layer elements within a composed base layer. FIG. 30 shows a composite base layer 304 incorporating three mutually rotated base element elements 301, 302, and 303, embedding each one its specific elevation profile.

By superposing the revealing layer and the composed base layer at different relative angles, one reveals the different shape level lines associated to the different shape elevation profiles embedded into the individual base layer elements.

Different periods $T_{b1}$, $T_{b2}$, . . . may be used for different subsets of base layer elements, which then require corresponding revealing layer line gratings to have also different periods $T_{r1}$, $T_{r2}$, . . . with $T_{r1}=T_{b1}$, $T_{r2}=T_{b2}$, . . . Such variations in periods between individual base layer elements allow to have a subset of base layer elements and their corresponding shape level lines as first level authentication features (i.e. open to the general public) and the complementary subset of base layer elements and their corresponding shape level lines as second level authentication features (i.e. accessible only to specialists).

As described in the section "Geometric transformation of base and revealing layers", geometric transformations may be applied to the base layer elements and to the corresponding revealing layers, preferably before embedding the shape elevation profile. In the case of different revealing layers, one may introduce different transformations for different subsets of base layer elements and their corresponding revealing layers.

Figure 33A:
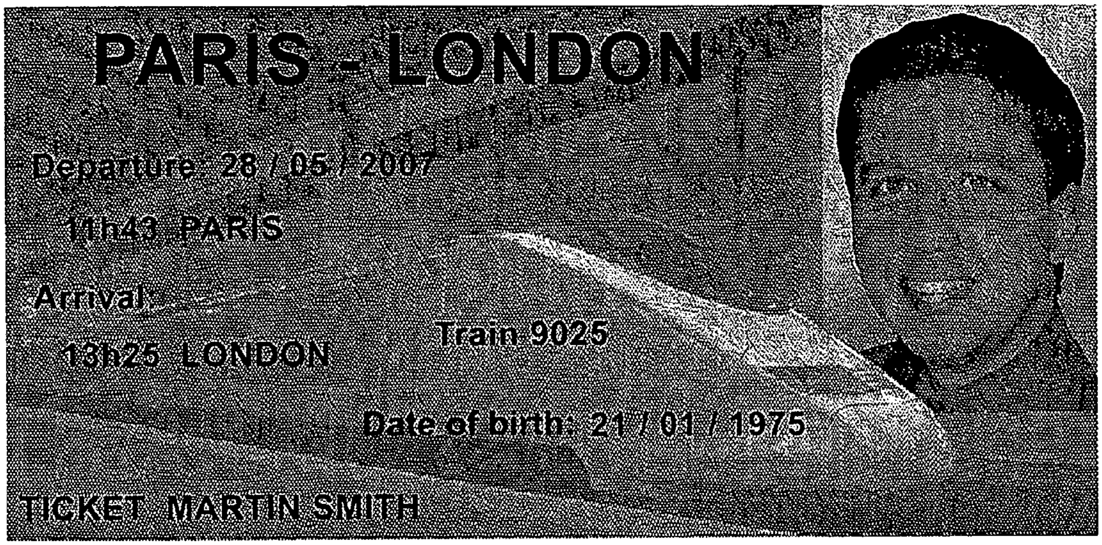
FIG. 33A shows a train ticket whose background image is a base layer forming a halftone image embedding several shape elevation profiles.
Figure 34A:
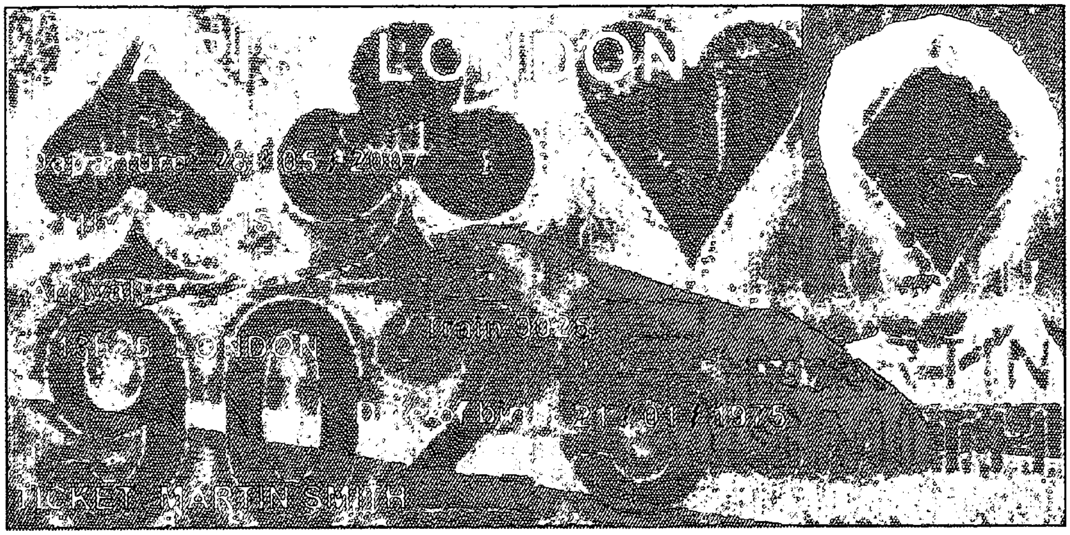
FIG. 34A shows shape level lines obtained by the superposition of the base layer shown in FIG. 33A and of a non-scaled instance of the revealing layer shown in FIG. 33B.
Figure 34B:
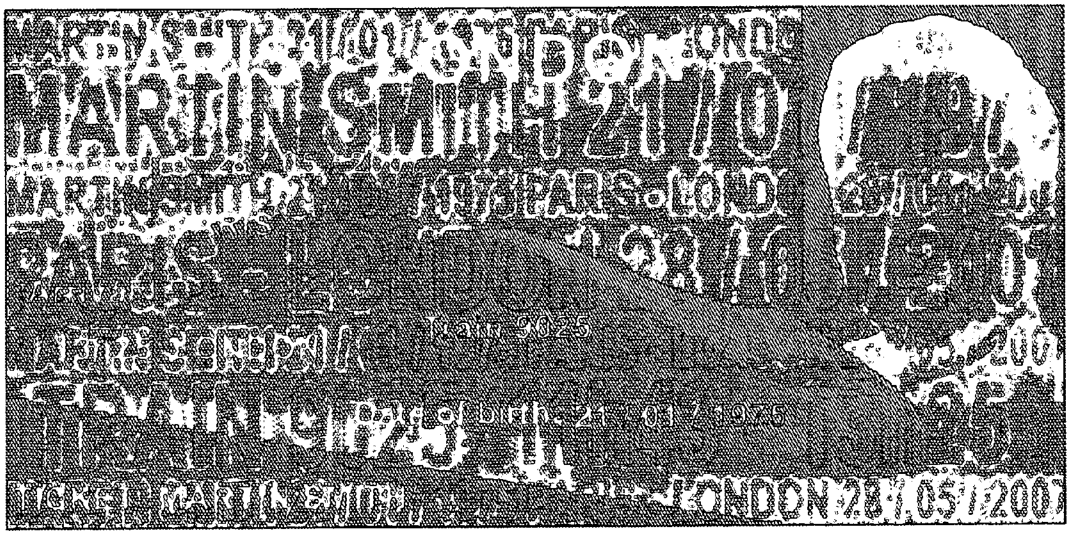
FIG. 34B shows other shape level lines obtained by the same superposition as in FIG. 34A, but with the revealing layer turned on its back face, with revealing lines having an orientation of 120 degrees.

We may also produce as base layer a halftone image with shape elevation profiles embedded into the base layer elements forming its composed base layer. This composed base layer is used as dither matrix for creating the halftone image by dithering an original grayscale or color image. As described in the section "Embedding the elevation profile into a halftone image", we produce for the mutually rotated base layer elements sets of lines composed of lines having increasing intensities covering the full intensity range. Each base layer element may also embed its own specific shape elevation profile. The shape elevation profiles need not be oriented perpendicularly to the corresponding base layer element sets of lines. They may have any orientation. The composed base layer then serves as a dither matrix for dithering an input grayscale or color image. Without superposition of the revealing layer line grating, the halftone image appears (e.g. FIG. 33A) and with superposition of the revealing layer at different orientations, different shape level lines appear (e.g. FIG. 34A at one orientation of the revealing layer and FIG. 34B at another orientation of the revealing layer). Again, by modifying the relative superposition phase of base layer and revealing layer, shape level lines move between initial motif shape boundaries and shape foreground and background centers.

Geometric transformations may be applied to both the base layer elements and to the corresponding revealing layer(s) before embedding the shape elevation profile. Such geometric transformations yield curvilinear sets of lines, i.e. curvilinear dither threshold profiles (e.g. FIG. 22). Such curvilinear dither threshold profiles yield more pleasant halftoned images and at the same time make unauthorized reproduction more difficult for most digital devices.

Embodiments of Base and Revealing Layers

The term "printing" is not limited to a traditional printing process, such as the deposition of ink on a substrate. It has a broader signification and encompasses any process allowing to create a pattern or to transfer a latent image onto a substrate, for example engraving, photolithography, light exposition of photo-sensitive media, etching, perforating, embossing, thermoplastic recording, foil transfer, ink-jet, dye-sublimation, foil stamping etc. The term "imaging", when referring to a substrate, means transferring an image onto that substrate, e.g. by printing, by electrophotographic means, etc. and when referring to an electronic display means generating the corresponding image on that display. The base layer sets of lines or the revealing layer line grating may also be obtained by removal of matter, for example by laser etching, chemical etching or by laser perforation.

The base layer may be printed with standard inks (cyan, magenta, yellow and black) or with non-standard inks (i.e. inks whose colors differ from standard colors), for example Pantone inks, fluorescent inks, inks visible only under UV light (UV inks) as well as any other special inks such as metallic or iridescent inks.

A revealing layer line grating may be embodied by a set of transparent lines (e.g. FIG. 3, 33) within a light absorbing surface 32, by a set of transparent lines within a light absorbing transmissive support (e.g. imaged on a black film), by a set of transparent lines within an opaque or partially opaque support, by lenticular lenses or by diffractive devices (Fresnel zone plates) acting as lenticular lenses. The base layer and revealing layer lines need not be made of continuous lines. A revealing line grating may be made of interrupted lines and still produce level lines. In the present invention, the term "line grating" is used in a generic sense: besides its original meaning, it encompasses also geometrically transformed line gratings, gratings made of interrupted lines and gratings of lines embedding a spatial elevation profile.

In the case that the base layer is incorporated into an optically variable surface pattern, such as a diffractive device, the base layer sets of lines needs to be further processed to yield for each of its different lines a relief structure made for example of periodic function profiles having an orientation, a period, a relief and a surface ratio according to the desired incident and diffracted light angles, according to the desired diffracted light intensity and possibly according to the desired variation in color of the diffracted light in respect to the diffracted color of neighbouring areas (see U.S. Pat. No. 5,032,003 inventor Antes and U.S. Pat. No. 4,984,824 Antes and Saxer). This relief structure is reproduced on a master structure used for creating an embossing die. The embossing die is then used to emboss the relief structure incorporating the base layer sets of lines on the optical device substrate. Further information can be found in U.S. Pat. No. 4,761,253 inventor Antes, as well as in the article by J. F. Moser, Document Protection by Optically Variable Graphics (Kinegram), in Optical Document Security, Ed. R. L. Van Renesse, Artech House, London, 1998, pp. 247-266.

Figure 31:
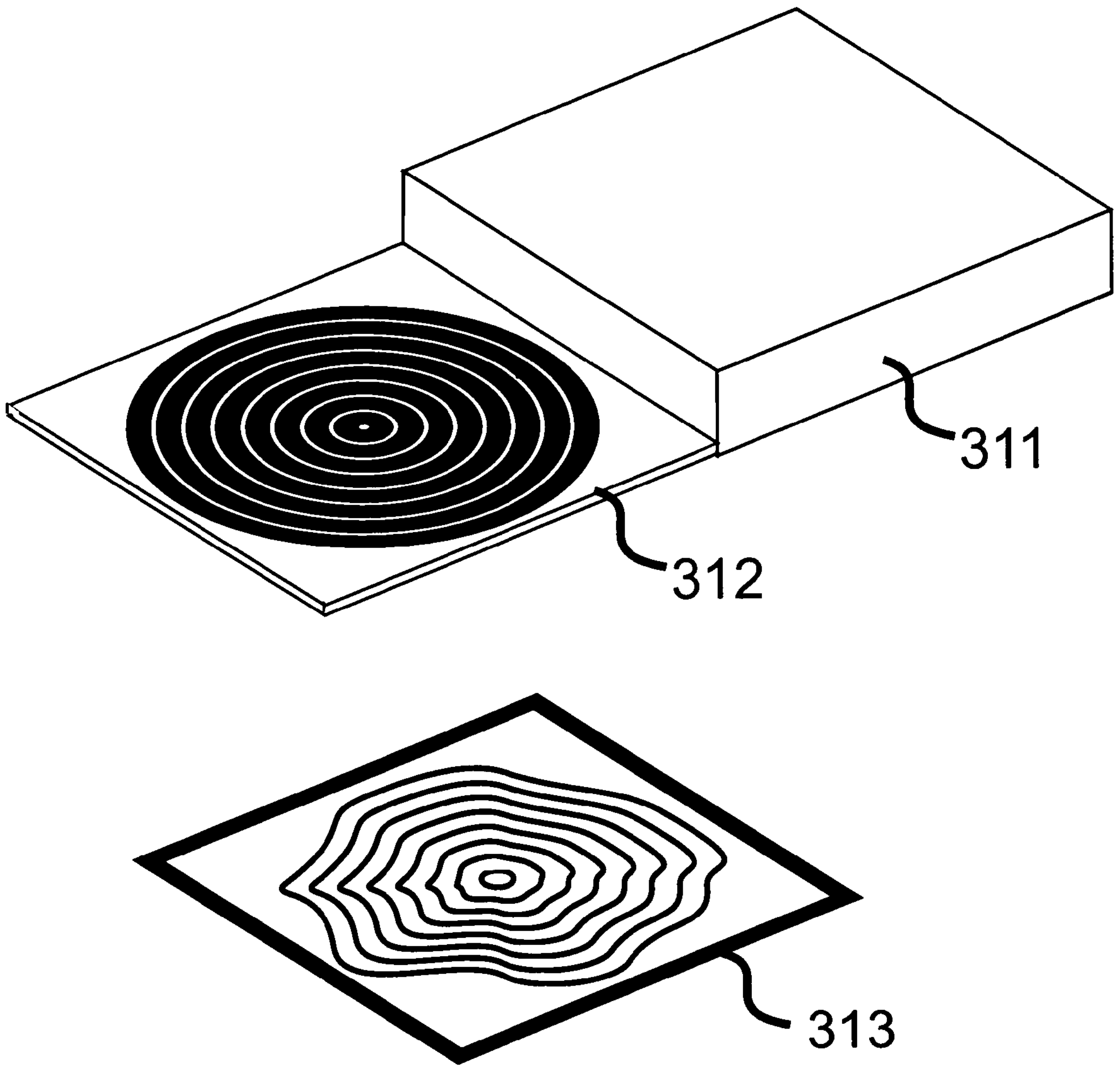
FIG. 31 shows a base layer and on top of it a revealing layer embodied by an electronic display working in transmission mode attached to a computing device.

Embodiment of the Revealing Layer as an Electronic Display Working in Transparent Mode An authentication device may comprise as revealing layer an electronic display working in transmissive mode, e.g. a liquid crystal display (e.g. FIG. 31, 312). The revealing layer's transformed line grating is displayed by a revealing layer display software module running on a computing device 311. When superposing the transmissive electronic display 312 on top of a modified transformed base layer sets of lines 313, the shape level lines of the shape elevation profile present in the modified transformed base layer are revealed. In order to create level lines moving between foreground and background shape centers (skeletons) and shape boundaries, the revealing layer display software module generates successive instances of the transformed revealing layer line grating corresponding to increasing or decreasing relative superposition phases between original untransformed base and revealing layers. In the general case, these successive instances are computed by transforming the original untransformed revealing layer positioned at successively increasing relative superposition phases in respect to the untransformed base layer. For example, in the case of the spiral transformation described previously, successive relative superposition phases of the original revealing layer in respect to the original base layer correspond to successively rotated instances of the transformed revealing layer by a small rotation angle. Hereinafter, we call "relative superposition phase transformation" the special transformation which needs to be applied to the transformed revealing layer in order to bring it into a different relative superposition phase in respect to the transformed base layer (relative superposition phases are specified in the original space). In the previous example, the relative superposition phase transformation applied to the spiral transformed revealing layer is simply a rotation.

Since an electronic display is capable of generating any kind of transformed revealing layer, different relative superposition phases of the untransformed base and revealing layers may correspond, after applying the transformation to the base and revealing layers, to revealing layer instances which cannot be brought into congruence by a simple translation and rotation, i.e the transformation from one revealing layer superposition phase to the next revealing layer superposition phase in the transformed revealing layer space may be non-rigid. This opens the way to more sophisticated layer transformations $x'=h_x(x,y)$, $y'=h_y(x,y)$, for example a circular transformation of the type $$x' = h_x(x, y) = \frac{\operatorname{atan2}(x - c_x, y - c_y)\operatorname{mod}(2\pi)}{2\cdot\pi}\cdot w_x \quad (8)$$

$$y' = h_y(x, y) = c_1\cdot\sqrt{(x - c_x)^2 + (y - c_y)^2}$$

where $(c_x,c_y)$ gives the center point in the transformed coordinate space (x,y), $w_x$ gives the width of the original base layer, $c_1$ is a constant radial scaling factor, and atan2 is the fourquadrant inverse tangent (arctangent) yielding values between $-\pi$ and $\pi$. The radial coordinate $\rho$ in the transformed space is $$\rho = \sqrt{(x - c_x)^2 + (y - c_y)^2} \quad (9)$$

In such circular transformations, the original untransformed base layer sets of lines are transformed into sets of circular lines and the revealing layer's original untransformed revealing lines are also transformed into circular lines (circular grating). The revealing layer display software module may generate the circularly transformed revealing line grating moving concentrically in and out at different relative phases, thereby yielding level lines moving between foreground, respectively background shape centers (skeletons) and shape boundaries. The relative superposition phase transformation brings a circular revealing layer grating positioned at one relative phase into a circular revealing layer grating at a second relative phase by a simple increase of the radial coordinate of the revealing circular line grating, i.e. $\bar{\rho}=\rho+\Delta\rho$, where $\bar{\rho}$ expresses the new radial coordinate, $\rho$ the old radial coordinate and where $\Delta\rho$ is a relative circular superposition phase shift. The relative circular superposition phase shift $\Delta\rho$ corresponds to an original untransformed superposition phase shift of $\Delta\tau_r$, i.e. $\Delta\rho=(1/c_1)\cdot\Delta\tau_r$, where $c_1$ is the constant radial scaling factor of Eq. (8).

Anti-Counterfeiting Features

A) Individualized Pairs of Matching Base and Revealing Layers

The very large number of possible geometric transformations which can be applied to the base layer and to the revealing layer allows to synthesize individualized pairs of matching base and revealing layers, i.e. pairs of base and revealing layers to which an identical geometric transformation is applied. Only such individualized pairs are able to produce, when superposed, shape level lines of the shape elevation profile embedded within either the base or the revealing layer. One of the layers, for example the base layer may be incorporated or attached to the item to be protected and the other matching layer, in the present example the revealing layer, may be made available on the Web to authorized authentication persons (e.g. through an access secured by a password). The security of widely disseminated documents such as bank notes, diploma, entry tickets, travel documents and valuable products can be strengthen by often modifying the parameters which define the geometric layout of the base layer and of its corresponding revealing layer. One may for example have geometric transformations and their associated parameters which depend on a security document's issue date or production series number.

B) Making a use of the Protection Offered by High-Resolution High-Registration Accuracy Printing Devices The present invention can make the best use of the highest levels of resolution and registration accuracy offered by original secure item printing devices. For devices having a high resolution and registration accuracy, each of the base layer sets of lines will incorporate many different lines, each one with its specific color. Even if scanned at high resolution, an unauthorized copy of the base layer will not be reproducible on standard equipment, since a standard reproduction device needs to halftone the scanned base layer, thereby partly or fully destroying the original combination of lines within the sets of lines. For example, sets of lines comprising distinct white, red, green and blue lines, printed with original red, green and blue inks will possibly be reproduced as a white and a brown-gray line. On the corresponding superposition of base layer and revealing layer, the absence of clearly recognizable red, green and blue level lines then indicates a counterfeited secure item.

Figure 32A:
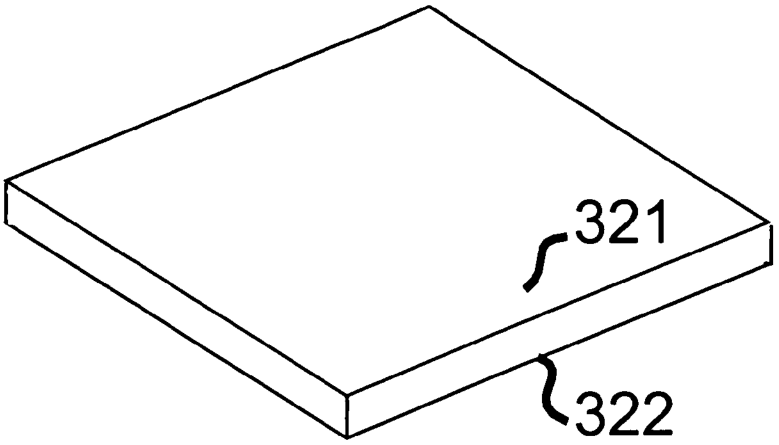
FIG. 32A shows a secure item printed on two sides.
Figure 32B:
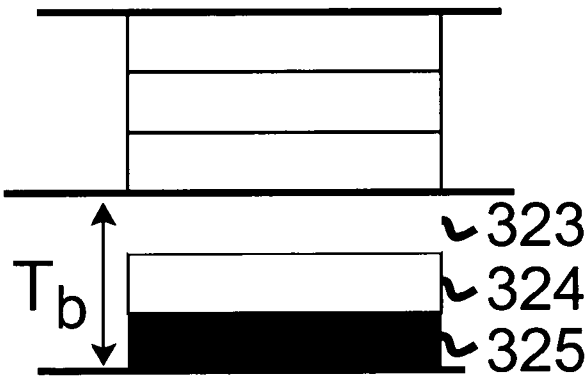
FIG. 32B shows two lines (323, 325) of the base layer sets of lines printed on its front side.
Figure 32C:
FIG. 32C shows a third line (327) of the base layer sets of lines printed on its back side, side by side in respect to the lines printed on the front side
Figure 32D:
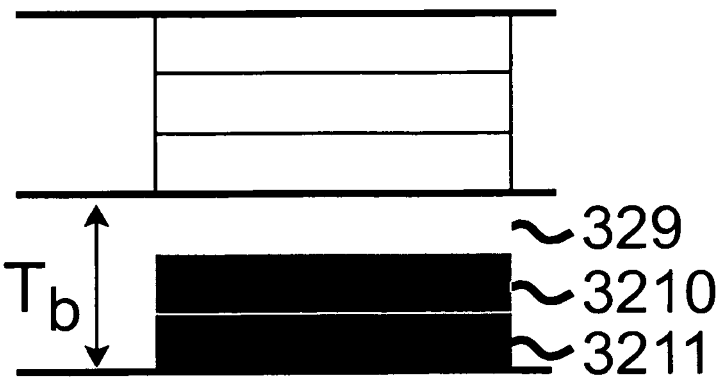
FIG. 32D shows the layout of the corresponding printed lines when the secure item is viewed in transmissive mode.

With printing machines printing at a high registration accuracy on both sides (FIG. 32A, 321 and 322) of a partly of fully transparent secure item (e.g. a security document or a flat security element), one may separate each set of lines $S_b$ into two interlaced parts, one part $S_{bf}$containing lines being printed on one side (in front) of the secure item (e.g. FIG. 32B, 323 and 325) and the other part $S_{bb}$ being printed with lines being printed on the other side (back side) of the secure item (e.g. FIG. 32C, 327). Every time a line is printed on one side of the secure item, the corresponding other side remains unprinted (e.g. in FIG. 32B 324 and in FIG. 32C 326 and 327). The parts being printed in front of the secure item may have lines of one set of colors, e.g. green 323 and red 325, and the parts being printed on the back side may have lines of a different set of colors, e.g. blue 327. Viewed in transmissive mode with an enlarging glass, the secure item will show side by side the lines printed on both sides of the document, in the present example, in FIG. 32D, lines 329, 3210, 3211 of e.g. respective colors green, blue and red. When superposed with a revealing layer line grating and viewed in transmissive mode, i.e. by looking through the superposition of the secure item and of its revealing layer, the valid secure item reveals as shape elevation level line colors the base layer line colors printed on both sides of the document (FIG. 32D, lines 329, 3210, 3211), i.e. in the present example, colors green, blue and red. Potential counterfeiters which do not have the printing equipment capable of printing at high accuracy on both sides of a document are not able to print different color lines juxtaposed (i.e. printed side by side) on both sides of a document. Therefore, a counterfeited document, when superposed in transmissive mode with its revealing layer, will not reveal shape level line colors identical to the original base layer line colors.

C) Printing Sets of Lines with Metallic or Iridescent Inks

One may print the base layer sets of lines with special inks such as non-standard color inks, inks visible under UV light, metallic inks, fluorescent or iridescent inks. In the case that sets of lines comprise lines printed with a metallic ink, the corresponding revealed shape level lines become highly visible under certain viewing and illumination conditions, i.e. at specular observation angles and either invisible or very dark under normal viewing and illumination conditions, i.e. at non-specular observation angles. A similar variation of the appearance of the shape level lines can be attained with iridescent inks. Under certain viewing and illumination conditions, e.g. at certain illumination and observation angles, the shape level lines become clearly visible and are of a specific color and under normal viewing and illumination conditions, i.e. at other illumination and observation angles, either the color of the shape level lines changes or the shape level lines disappear. Such variations in the appearance of the shape level lines are not present when the original document is scanned and reproduced or photocopied.

D) Printing Sets of Lines with Inks Visible Under Special Illumination

One may use special inks visible under special illumination, e.g special inks visible under ultraviolet (UV) light or special inks visible under infrared (IR) light for printing the base layer sets of lines (e.g. pairs of successive unprinted/printed lines). By superposing such a base layer with a corresponding revealing layer, the shape level lines are revealed under certain viewing and illumination conditions, such as ultraviolet illumination or respectively infrared illumination but may either be completely or partially hidden under normal viewing and illumination conditions, i.e. under normal illumination (day light or indoor illumination). In the case that the inks are invisible under normal illumination, photocopiers or scanners cannot extract the region where the invisible ink is applied and therefore potential counterfeiters will not be able to reproduce the base layer, even with expensive printing equipment (e.g. offset).

Authentication of Secure Items

Secure items are secured by incorporating into them, associating with them or printing on them a base layer comprising repeated sets of lines with individual lines of a set having each one a specific intensity, respectively color, and a revealing layer comprising a line grating made of transparent lines. Such items are authenticated by placing the revealing layer on top of the base layer and by verifying the presence of characteristic features on the superposition: (a) the resulting shape level lines look like offset lines, i.e. the shape level lines' outlines are visual offset lines of the boundaries of a known motif shape image such as typographic characters, a word of text, a symbol, a logo, an ornament, any other graphic shape or a combination thereof and (b) successive shape level lines have characteristic intensities, respectively colors, which correspond to the intensities, respectively colors of successive lines of the base layer sets of lines. By modifying the relative superposition phase of the revealing layer on top of the base layer or vice-versa (e.g. by a translation, a rotation or another relative superposition phase transformation which depends on the geometric transformation that was applied to the base and revealing layers), one may verify a further characteristic feature: the resulting dynamically moving shape level lines move between the motif shape boundaries and foreground and background shape centers (foreground and background skeletons) and vice versa. In the case that these characteristic features are present, the item is accepted as authentic. If one or several of these characteristic features are absent, the item is rejected as suspect of being a counterfeit.

Authentication of valuable products may be performed by conceiving packages that include a transparent part or a transparent window on which the revealing layer line grating may be imaged. The base layer may then be imaged on a different part of the package or directly on the valuable article. By opening and closing the package or by pulling the valuable article in and out of its package, dynamically moving shape level lines appear.

The base layer and the revealing layer can be also printed on separate labels that are attached to the product itself or into its package. Possible means of associating base and revealing layer to packages of valuable goods have been described in U.S. Pat. No. 6,819,775 (Amidror and Hersch) in FIGS. 17-22. therein. However, since in the present invention, the shape level lines yield clearly recognizable shapes in reflective mode and since the dynamicity of the level lines moving from the centers of the shapes to their boundaries and vice versa creates a strong visual impact, the embedding of an elevation profile into base layer sets of lines (or into the revealing layer line grating) and the use of a line grating as the revealing layer makes the protection of valuable products more effective than with the method described in U.S. Pat. No. 6,819,775 (Amidror and Hersch). It also represents a valuable alternative to the methods disclosed in U.S. patent application Ser. No. 10/270,546 and U.S. Ser. No. 10/879,218 by Hersch and Chosson.

Further Embodiments and Security Features

Let us enumerate further embodiments of particular interest. In one embodiment, the level lines can be visualized by superposing the base layer and the revealing layer which both appear in two different areas of the same secure item (bank note, check, identification document, certification document, label attached to a valuable product, valuable product and its package, medical article, prescription drug, electronic product, foodstuff, cosmetics, clothes, fashion articles, furniture, vehicles, watches with armbands, glasses, pieces of art, etc.). Secure items specially well adapted for this embodiment are secure items comprising two parts enabling the superposition and the displacement of one part over the second part. In addition, the secure item may incorporate, for comparison purposes, in a third area of the document, a reference motif element such as the initial motif shape image (e.g. FIG. 11), the corresponding reference shape elevation profile (e.g. in FIG. 13) or reference shape level lines (e.g. FIG. 14B). In the case of an authentic security item, the revealed shape level lines are in accordance with the reference motif element, i.e. they are, respectively, visual offset lines of the initial motif shape boundaries, shape level lines of the reference shape elevation profile or they look similar to the reference shape level lines.

In a second embodiment, only the base layer appears on the secure item itself, and the revealing layer is superposed on it by a person or by an apparatus which visually, optically or electronically validates its authenticity. For comparison purposes, the reference shape level lines may be represented as an image on the secure item or on a separate device, for example on the revealing device on which the revealing layer is imaged.

In a further embodiment, document authentication is carried out by observing the dynamic shape level line displacements (e.g. shape level line growing and shrinking) produced when moving, rotating or electronically varying the relative superposition phase between the revealing layer and the base layer. Examples of dynamic shape level lines moving between the foreground, respectively the background shape centers and the shape boundaries have been described in the preceding sections.

In a further embodiment, one may use the well known parallax effect (see background of invention, in U.S. Pat. No. 5,901,484 to R. B. Seder and R. L. Van Renesse, Optical Document Security, 2nd ed., 1998, Artech House, Sections 9.3.1 Parallax Images and 9.3.2 Embossed Lens Patterns, pp. 207-210, hereby incorporated by reference) to visualize the moving shape level lines. The base layer and the revealing layer are incorporated on two sides of a transparent layer embedded within a secure item (e.g a plastic card), by first placing the base layer, then a partly or fully transparent layer of a thickness of typically 1/6 of a millimeter and then the revealing layer. Depending on the resolution and period of the base and revealing layers, the thickness may vary between 1/40 of a millimeter and several millimeters. Let us formulate the relationship between the revealing layer line grating period $T_r$, and the minimal transparent layer thickness h. A full range shape level line displacement (e.g. between initial motif shape skeletons and initial motif shape boundaries) occurs during a relative superposition phase increment of one period or less. In a general setup, the secure item can be observed at angles varying between −45 degrees and +45 degree in respect to the secure item's normal vector. The corresponding part d of the base layer viewed through the revealing layer transparent lines or sampled by the revealing layer lenticular lenses when varying the observation angle is therefore twice the thickness h of the transparent layer, i.e. d=2*h. In order to see at least a minimal proportion p (e.g. p=1/5) of the shape level lines displacement range, the part d of the base layer viewed under the considered range of observation angles (−45°to 45°) should be larger than the corresponding minimal proportion p of the level lines displacement range multiplied by the revealing layer line grating period $T_r$, i.e.

$$d >= p * T_r \tag{10}$$

Therefore the secure item thickness should be larger than the minimal proportion of the level lines displacement range multiplied by half the revealing layer line grating line period, i.e.

$$h >= p * T_r / 2 \tag{11}$$

For example, with a revealing layer line grating period of 1/3 of a millimeter and a minimal proportion of the level lines displacement range of p=1/5, the secure item thickness is at least 1/30 of a millimeter. Such a minimal thickness is significantly smaller than the thicknesses of parallax-based devices used for displaying two different images or for displaying a latent image hidden thanks to phase shift methods (see section "Background of the invention") and allows therefore to create more compact security elements. The transparent layer may be made of any transparent matter such as plastic, translucent paper, etc, or simply consist of a separation (air) enforcing a constant distance between base and revealing layers. Due to the parallax effect, when moving the eyes across the revealing layer line grating, the transparent lines of the revealing line grating sample different lines within the base layer's modified sets of lines, yielding shape level lines moving between shape borders and shape foreground and background centers. A simple and cheap assembly of base layer, transparent layer and revealing layer consists in taking lenticular lenses located on a support having the desired thickness (e.g. a sheet of plastic with the lenticules on top of it, forming the transparent layer and the revealing layer), and of fixing (e.g. by lamination) the base layer on the back face of the lenticular lense support.

Figure 33B:
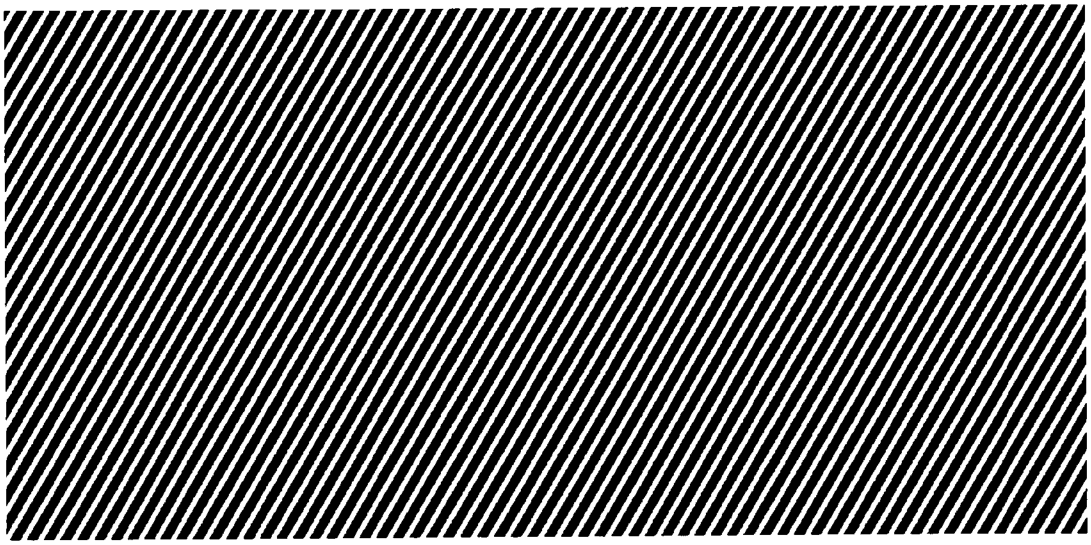
FIG. 33B shows an instance of a revealing layer line grating, scaled up by a factor of 5, with lines oriented at 60 degrees.

In a further embodiment, the base layer comprises a halftone image embedding a plurality of shape elevation profiles. First, an intermediate composed base layer is created, with each base layer element being modified according to the elevation profile that it embeds. Then, an input grayscale, respectively color, image is dithered with the intermediate composed base layer acting as the dither matrix. In the example shown in FIG. 33A, the base layer halftone image forms the background of a train ticket. The train ticket comprises relevant information such as the departure date, location and time, the arrival location and time as well as the train number and the name and date of birth of the document holder. This same information is used to create two distinct shape elevation profiles. The first shape elevation profile is created from an initial motif shape image comprising the shapes "9025" for the train number, "MARTIN SMITH" for the document holder name as well as a spade, a clover, a heart and a diamonds motif shape. The second shape elevation profile is created from an initial motif shape image comprising the shapes "MARTIN SMITH" for the document holder name, "28/5/2007" for the departure date, "21/01/1975" for the birth date, "PARIS-LONDON" for the departure and arrival towns and "TRAIN 9025" for the train number. The shape level lines of the first elevation profile (FIG. 34A) are revealed by superposing the base layer halftone image (FIG. 33A) and the revealing layer oriented at 60 degrees (shown enlarged 5 times in FIG. 33B). The shape level lines of the second elevation profile (FIG. 34B) are revealed by superposing the base layer halftone image (FIG. 33A) and the revealing layer turned on its back face, yielding revealing lines having an orientation of 120 degrees. As can be seen from these examples, the revealed shape level lines (and therefore also the corresponding initial motif shapes) need not be repetitive. In addition, they can be conceived at any desired size, large or small depending on the secure item to be protected. And finally, they are easily recognizable and readable.

Attempts to falsify a secure item produced in accordance with the present invention by photocopying, by means of a desktop publishing system, by a photographic process, or by any other digital or analog counterfeiting method will influence the fine structure of its base layer sets of lines. Factors which may be responsible for an inaccurate reproduction of the base layer and possibly of the revealing layer are the following:

(a) resampling and aliasing effects when scanning the geometrically transformed curvilinear base layer sets of lines with lines of varying intensity or colors printed at high resolution and at a high ink layer registration accuracy;
(b) halftoning and dithering effects occurring when reproducing the geometrically transformed curvilinear base layer sets of lines with lines of varying intensity or colors printed at high resolution and at high ink layer registration accuracy, especially when the base layer is a composed base layer incorporating several mutually rotated base layer elements, since re-halftoning creates a new halftone pattern which destroys the original fine structure of the base layer sets of lines; and
(c) dot gain, ink spreading and misregistration effects occurring when printing the base layer sets of lines, especially when the base layer sets of lines are printed with different inks of different colors or when the base layer sets of lines are printed side by side (i.e. lines are juxtaposed) on the two sides of the same secure item (front and back of a printed document).

Since shape level line intensities or colors are very sensitive to any variation of the fine structure of the base layer sets of lines, any secure item (security document or valuable article) protected according to the present invention becomes very difficult to counterfeit, and serves as a means to distinguish between an original secure item and a falsified one.

Since printing the base layer sets of lines and possibly the revealing layer line grating may be integrated into a security element or a secure item production process, high security is offered without requiring additional production costs. For example, incorporating into a print the base layer sets of lines and/or possibly the revealing layer line grating does not necessarily induce higher production costs. Even if the base layer sets of lines is imaged into the document by other means, for example by generating the base layer sets of line on an optically variable device (e.g. a kinegram) and by embedding this optically variable device into the secure item (document, valuable article) to be protected, no significant additional production costs incur due to the incorporation of the base layer into the optically variable device. Therefore, the present invention makes existing security features more secure without significant additional costs.

Computing System for the Synthesis of Base and Revealing Layers

The computing system disclosed here is similar to the one disclosed by the same inventors in U.S. patent application Ser. No. 10/879,218, to Hersch and Chosson, but is operable for synthesizing secure items (security elements, security documents, secure packages and secure goods) with shape level lines as authentication feature.

The large number of existing geometric transformations as well as the many different transformation parameters can be used to automatically generate pairs of matching (corresponding) base and revealing layers, each pair comprising its modified and transformed base layer sets of lines and its transformed revealing layer line grating or its transformed base layer sets of lines and its modified and transformed revealing layer line grating. The large number of possible modified transformed base layers (or respectively modified transformed revealing layers) which can be automatically generated provides the means to create individualized secure items and corresponding authentication means. Different classes or instances of secure items may have individualized matching pairs of base and revealing layers.

A correspondence can be established between secure item content information and base and revealing layer synthesizing information. Base and revealing layer synthesizing information comprises the geometric transformation applied to the base and revealing layers, the transformation parameters and the motif shape image to be embedded into one of the layers as a shape elevation profile. For example, on a travel ticket, the secure item content information may be formed by a ticket number, the name of the ticket holder, the travel date, and the departure and arrival locations. On a business contract, the information may incorporate the title of the document, the names of the contracting parties, the signature date, and reference numbers. On a diploma, the information may comprise the issuing institution, the name of the document holder and the document delivery date. On a bank check, the information may comprise the number printed on the check, the name of the company which emits the check and possibly the name of the person or company authorized to cash the check. On a customs document, the information may comprise the identification of the corresponding goods. On a bank note, the information may comprise the number printed on the bank note. A correspondence function maps the secure item content information into base and revealing layer synthesizing information comprising the definition of the transformation to be applied to the base and revealing layers, properties of the lines forming the base layer set of lines, the initial motif shape image to be embedded within one of the layers, and in case of a halftone image as final base layer, the input image to be halftoned.

Figure 35:
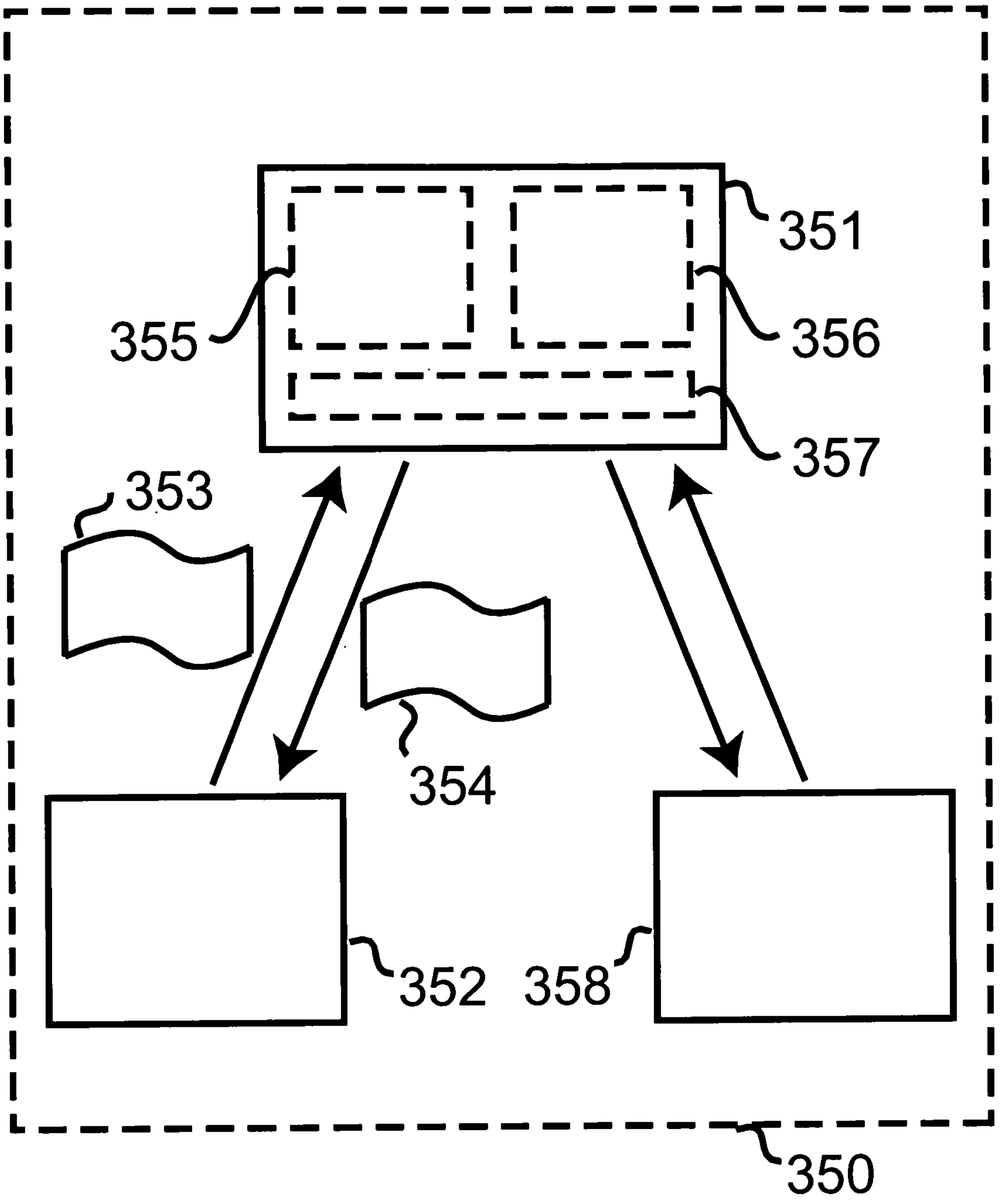
FIG. 35 shows a block diagram of a computing system operable for delivering base layer sets of lines and revealing layer line gratings.

Individualized secure items comprising individualized base layers and corresponding revealing layers as authentication means may be created and distributed via a security item computing and delivery system (see FIG. 35, 350). The secure items computing and delivery system operable for the synthesis and delivery of secure item base layers and of secure item authentication means (revealing layers) comprises a server system 351 and client systems 352, 358. The server system comprises a base layer and revealing layer synthesizing module 355, a repository module 356 creating the correspondence between secure item content information and corresponding base and revealing layer synthesizing information and an interface 357 operable for receiving requests for registering a secure item, requests for generating a secure item base layer, and requests for generating a revealing layer able to reveal the shape level lines of a secure item base layer. Client systems 352, 358 emit requests 353 to the server system and get the replies 354 delivered by the interface 357 of the server system.

Within the server system, the repository module 356, i.e. the module creating correspondences between secure item content information and corresponding base and revealing layer synthesizing information is operable for computing from a secure item identifier a key to access the corresponding secure item entry in the repository. The base layer and revealing layer synthesizing module 355 is operable, when given base and revealing layer synthesizing information, for synthesizing the transformed base layer sets of lines and the transformed revealing layer line grating, one of the layers embedding the shape elevation profile. In a preferred embodiment, base and revealing layer synthesizing information comprises (a) base layer sets of lines properties such as the base layer sets of lines period $T_b$ in the original space, the number of lines and the intensity or respectively color of each individual line forming a set of lines in the original space, (b) the geometric transformation mapping both the revealing layer and the base layer from transformed space back to the original space (e.g. $h_x(x,y)$, $h_y(x,y)$), and the transformation parameters of this transformation;

(c) an initial motif shape image to be embedded into one of the geometrically transformed layers (base or revealing layers); and in case of a final base layer made of a halftone image, (d) an original grayscale or color image to be halftoned with a dither matrix embedding a shape elevation profile derived from an initial motif shape image.

The base layer and revealing layer line grating synthesizing module is operable for synthesizing the base layer and the revealing layer from base and revealing layer synthesizing information either provided within the request from the client system or provided by the repository module. According to the base and revealing layer synthesizing information, it computes a shape elevation profile from the initial motif shape image, it transforms the base and revealing layers according to the geometric transformation $h_x(x,y)$, $h_y(x,y)$ and then modifies either the base layer or the revealing layer so as to embed into it the elevation profile. In the case that the final base layer is a halftone image, it dithers the input grayscale or color image with the dither matrix formed by an intermediate modified transformed base layer sets of lines, each set comprising lines of increasing intensity.

The server system's interface module 357 may receive from client systems (a) a request comprising secure item content information for creating a new document entry;

(b) a request to register in a secure item entry the base and the revealing layer synthesis information delivered within the request message;

(c) a request to generate the base and revealing layer synthesis information associated to a given secure item and to register it into the corresponding secure item entry;

(d) a request to issue a base layer for a given secure item;

(e) a request to issue a revealing layer for a given secure item or (f) a request comprising as subrequests a plurality of requests mentioned in points (a) to (e).

Upon receiving a request 353, the server system's interface module interacts with the repository module in order to execute the corresponding request. In case of a request to issue a base or a revealing layer, the server system's interface module 357 transmits the request first to the repository module 356 which reads from the secure item entry the corresponding base and revealing layer synthesis information and forwards it to the base and revealing layer synthesizing module 355 for synthesizing the requested base or revealing layer. The interface module 357 delivers the requested base or revealing layer to the client system. The client system may print the corresponding layer or display it on a computer display. Generally, for creating a new secure item, the interface module will deliver the printable base layer which may comprise the modified transformed sets of lines. For authenticating a secure item, the interface module will deliver the revealing layer which comprises the revealing line grating, possibly modified to embed the shape elevation profile.

Thanks to the secure item computing and delivery system, one may create sophisticated secure items delivery services, for example the delivery of remotely printed (or issued) security documents, the delivery of remotely printed (or issued) authenticating devices (i.e. revealing layers), and the delivery of reference motif elements (i.e. initial motif shape images, reference shape elevation profiles or reference shape level lines), being possibly personalized according to information related to the secure item to be issued or authenticated.

Advantages of the Present Invention

The advantages of the new authentication and anti-counterfeiting methods disclosed in the present invention are numerous.

1. The presented method of embedding a shape elevation profile into a base layer by shifting repeated sets of lines by an amount proportional to the current elevation and of revealing the corresponding shape level lines by superposing on top of it a revealing layer line grating offers new means of authenticating secure items. By modifying the relative superposition phase of the revealing layer and the base layer (e.g. by a translation), the shape level lines move between foreground shape centers and the shape boundaries and between the background shape centers and the shape boundaries.
2. Since a large number of geometric transformations are available, a large number of matching pairs of base layers and revealing layers can be created which make it very difficult for potential counterfeiters to forger documents whose layouts may vary according to information located within the document and/or according to time.
3. Since the revealed shape level lines have the intensity, respectively color of the individual lines of the base layer sets of lines, small reproduction inaccuracies due (a) to halftoning of a scanned image, (b) to lacking color registration accuracy and/or (c) to lacking printing (imaging) resolution modify the intensity, respectively color, and possibly the outline of the revealed shape level lines and therefore serve as a means to distinguish between an original secure item and a falsified one.

4. Authenticating secure items by revealing the shape level lines of shape elevation profiles embedded into the base layer or into the revealing layer is adapted to high-end printing presses capable of printing at a high registration accuracy both on the front and on the back side of a sheet of paper or of plastic. With a partly or fully transparent paper or plastic sheet, one may print side by side (i.e. juxtaposed) a subset of the base layer set of lines on the front side and the complementary subset on the back side of the sheet. By superposing the revealing layer line grating on top of this sheet, one observes in transmissive mode the revealed shape level lines, which should have the same colors as the original lines printed side by side on both sides of the sheet. The sequence of colors of successive level lines should be the same as the sequence of colors of the corresponding base layer lines, printed on alternate sides of the sheet.
5. A further advantage of revealing the shape level lines of the superposition of a transformed base layer and of a transformed revealing layer, where one of the layers is modified to embed the shape elevation profile, lies in the fact that modifying the relative superposition phase of the revealing layer in respect to the base layer may require a non-rigid relative superposition phase transformation of the revealing layer, i.e. a transformation different from a translation and/or a rotation. Such a non-rigid relative superposition phase transformation can be performed with a revealing layer embodied by an electronic transmissive display driven by a revealing layer display software module. Since its functionalities, i.e. mainly the geometric transformation and the relative superposition phase transformation that are carried out by the display software module in order to generate on the display a transformed revealing layer line grating whose relative superposition phase varies dynamically, are not known to potential counterfeiters, they will not be able to create the corresponding matching base layer (or base layers, in case the geometric transformation varies for different classes of secure items or according to time).
6. The base layer sets of lines and the revealing layer line grating may be laid out in a fixed manner on two sides of a substantially transparent security element having a given thickness. Thanks to the parallax effect, when moving the eyes across the revealing layer line grating, shape level lines appear to move between motif shape boundaries and motif shape foreground and background centers. In the case that the transparent security element has a thickness which is lower than half the revealing layer line grating period, the shape level lines move, but possibly only partially between motif shape boundaries and motif shape foreground and background centers.
7. A further advantage lies in the fact that both the base layer and the revealing layer can be automatically generated by a computer program, i.e. by a base layer and revealing layer synthesizing software module. Such a software module generating automatically the base and revealing layers needs as input (a) the initial motif shape image to be embedded as a shape elevation profile into either the base layer or the revealing layer, (b) the geometric transformation and the related transformation parameters allowing the program to create the base layer sets of lines and the revealing layer line grating in the transformed space. It is therefore possible to create a computer server operable for delivering both the base layer and revealing layer. The computer server may be located within the computer of the authenticating personal or at a remote site. The delivery of the base and revealing layers may occur either locally, or remotely over a computer network.
8. Based on the computer server described in the section "Computing server for the synthesis of base and revealing layers" one may create sophisticated secure item delivery services, for example the delivery of remotely printed (or issued) security documents and the delivery of remotely printed (or issued) authenticating devices, being possibly personalized according to information related to the security document to be issued or authenticated.
9. The present invention distinguishes itself from many other security devices by its visual attractiveness: shape level lines of various intensities or colors moving between motif shape boundaries and shape foreground and background centers capture the attention of the observer which is of primordial importance for authentication purposes.

REFERENCES CITED

U.S. Patent Documents

U.S. Pat. No. 5,995,638 (Amidror, Hersch), granted November 1999. Methods and apparatus for authentication of documents by using the intensity profile of moiré patterns, due assignee EPFL.

U.S. Pat. No. 6,249,588 (Amidror, Hersch), granted June 2001. Method and apparatus for authentication of documents by using the intensity profile of moiré patterns, due assignee EPFL.

U.S. Pat. No. 6,819,775, (Amidror and Hersch), granted Nov. 16, 2004, Authentication of documents and valuable articles by using the moiré intensity profile, filed 11th of Jun. 2001, due assignee EPFL.

U.S. Pat. No. 5,018,767 (Wicker), May 28, 1991. Counterfeit protected document.

U.S. Pat. No. 5,396,559 (McGrew), Mar. 7, 1995. Anticounterfeiting method and device utilizing holograms and pseudorandom dot patterns.

U.S. Pat. No. 5,708,717 (Alasia), Jan. 13, 1998. Digital anti-counterfeiting software method and apparatus U.S. Pat. No 5,999,280 (Huang), Dec. 7, 1999, Holographic anti-imitation method and device for preventing unauthorized reproduction, U.S. Pat. No. 5,790,703 (Shen-ge Wang), Aug. 4, 1998, Digital watermarking using conjugate halftone screens U.S. Pat. No. 5,694,229, (Drinkwater, B. W. Holmes), Dec. 2, 1997, Holographic Security Device U.S. Pat. No. 5,712,731 (Drinkwater et. al.), Jan. 27, 1998, Security device for security documents such as bank notes and credit cards.

U.S. Pat. No. 5,032,003, (Antes), Jul. 16, 1991, Optically variable surface pattern.

U.S. Pat. No. 4,984,824 (Antes and Saxer), Jan. 15, 1991, Document with an optical diffraction safety element.

U.S. Pat. No. 4,761,253 (Antes), Aug. 2, 1988, Method and apparatus for producing a relief pattern with a microscopic structure, in particular having an optical diffraction effect, U.S. Pat. No. 6,273,473, (Taylor, Hardwick, Jackson, Zientek, Hibbert), Aug. 14, 2001, Self-verifying security documents, U.S. Pat. No. 6,494,491 B1 (Zeiter, Lüthi, Lohwasser), Dec. 17, 2002, Object with an optical effect, U.S. patent application Ser. No. 09/477,544 (Ostromoukhov, Hersch), Method and apparatus for generating digital halftone images by multi color dithering, filed 4, th Jan. 2000, due assignee EPFL.

U.S. patent application Ser. No. 10/270,546, (Hersch, Chosson), "Authentication of documents and articles by moiré patterns", filed 16, th Oct. 2002, due assignee EPFL U.S. patent application Ser. No. 10/879,218, (Hersch, Chosson), "Model-based synthesis of band moiré images for authenticating security documents and valuable articles", filed 30, th Jun. 2004, due assignee EPFL U.S. patent application Ser. No. 10/440,355, (Hersch, Emmel, Collaud), Reproduction of security documents and color images with metallic inks, filed 19, th May 2003, due assignee EPFL.

U.S. patent application Ser. No. 10/284,551, (Z. Fan, S Wang), Anti-counterfeiting see-through security feature using line patterns, filed 30, th Oct. 2002

OTHER PUBLICATIONS

I. Amidror, The Theory of the Moiré Phenomenon, Kluwer Academic Publishers, 2000, Chapter 10, Moiré between repetitive non-periodic layer, pp. 249-352 and Chapter 11, Other possible approaches for moiré analysis, pp. 353-374.

W. Hospel, Application of laser technology to introduce security features on security documents in order to reduce counterfeiting, SPIE Vol. 3314, 1998, pp. 254-259.

J. Huck, Mastering Moirés. Investigating Some of the Fascinating Properties of Interference Patterns, 2003, paper available by contacting the author, see http://pages.sbcglobal.net/joe-huck/Pages/kit.html A. K. Jain, Fundamentals of Digital Image Processing, Prentice Hall, 1989, sections "Skeleton algorithms" and "thinning algorithms", pp. 382-383 and section "Morphological Processing", pp. 384-389

J. S. Marsh, Contour Plots using a Moiré Technique, American Journal of Physics, Vol. 48, January 1980, 39-40

J. F. Moser, Document Protection by Optically Variable Graphics (Kinemagram), in Optical Document Security, Ed. R. L. Van Renesse, Artech House, London, 1998, pp. 247-266

R. L. van Renesse, in Optical Document Security, 2nd ed., 1998, Artech House, Sections 9.3.1 Parallax Images and 9.3.2 Embossed Lens Patterns, pp. 207-210 (part of Chapter 9: Noniridescent Optically Variable Devices)

V. Ostromoukhov and R. D. Hersch, Multi-color and artistic dithering, SIGGRAPH Annual Conference, 1999, pp. 425-432.

K. Patorski, The moiré Fringe Technique, Elsevier 1993, pp. 14-16.

A. Rosenfeld and J. Pfaltz, "Sequential operations in digital picture processing," Journal of the Association for Computing Machinery, vol. 13, No. 4, 1966, pp. 471-494

B. Saleh, M.C. Teich, Fundamentals of Photonics, John Wiley, 1991, p. 116

We claim:

1. A method for authenticating a secure item by shape level lines, the secure item being selected from the group of security documents and valuable products, the method comprising the steps of:

a) superposing a base layer and a revealing layer, thereby producing shape level lines and b) observing said shape level lines and, depending on characterististic features of said shape level lines, accepting the secure item as authentic or rejecting it;

where the base layer comprises sets of lines, each line of a set of line being characterized by its intensity, respectively color, where the revealing layer comprises a line grating and where one of the two layers is a modified layer which embeds a shape elevation profile generated from an initial motif shape image.

2. The method of claim 1, where the initial motif shape image is a bilevel image and where the characteristic features of the shape level lines comprise (a) their outlines which for an authentic secure item are visual offset lines of the boundaries of the initial motif shape image and (b) their intensities, respectively colors, which for an authentic secure item should be the same as base layer sets of lines intensities, respectively colors.

3. The method of claim 1, where the initial motif shape image is a bilevel image and where an additional step of applying a relative superposition phase transformation to the revealing layer creates as characteristic feature level lines moving dynamically between the initial motif shape boundaries and shape foreground centers, respectively background centers, thereby growing and shrinking.

4. The method of claim 3, where the relative superposition phase transformation is a translation.

5. The method of claim 1, where the shape elevation profile is embedded into said modified layer by obtaining from the shape elevation profile an elevation value at a current position of the modified layer, by reading in a corresponding unmodified layer an intensity, respectively, color at a position corresponding to the current position shifted according to the elevation value and by writing said intensity, respectively, color into the current position of the modified layer.

6. The method of claim 1, where the base and revealing layers are curvilinear layers obtained by applying a same geometric transformation to original untransformed base and revealing layers.

7. The method of claim 6, where the curvilinear base and revealing layers are individualized according to a geometric transformation selected from a set of geometric transformations and according to geometric transformation parameters selected from a range of admissible parameters.

8. The method of claim 7, where the curvilinear base and revealing layers are further individualized by creating the initial motif shape image according to secure item content information.

9. The method of claim 1, where the base layer is a halftone image generated by dithering an input image with a dither matrix made of sets of lines embedding said shape elevation profile, and where without superposition of the revealing layer, the halftone image appears and with superposition of the revealing layer, the shape level lines appear.

10. The method of claim 1, where the base layer is a composed base layer of at least two base layer elements having different angular orientations, each base layer element embedding its own shape elevation profile, and where superposing the composed base layer and the revealing layer at one of the base layer elements angular orientation yields the shape level lines of that base layer element's embedded shape elevation profile.

11. The method of claim 1, where the secure item is a security document, where lines of the base layer sets of lines are printed side by side on front and back faces of said security document, and where the characteristic features of the shape level lines comprise their colors which for an authentic security document should be the same as the colors of said lines of the base layer sets of lines printed side by side on front and back faces of said security document.

12. The method of claim 1, where the base layer sets of lines comprise lines printed with a special ink selected from the group of inks visible only under ultraviolet light, inks visible under infrared light, metallic inks, and iridescent inks and where a characteristic feature of shape level lines consists in having shape level lines appearing only under a certain viewing and illumination conditions, said viewing and illumination conditions being selected from the group of ultraviolet illumination, infrared illumination and observation angle.

13. The method of claim 1, where at least one of the two layers comprises lines selected from the group of continuous lines, dotted lines, interrupted lines and partially perforated lines.

14. The method of claim 1, where the base layer and the revealing layer are located on two different parts of the same secure item, thereby enabling the shape level lines to be revealed by the superposition of the base layer and the revealing layer of said secure item.

15. The method of claim 1, where the base layer and the revealing layer are fixed on two sides of said secure item, said base layer and said revealing layer being separated by a substantially transparent layer, where when moving the eyes across the revealing layer line grating, due to a parallax effect, shape level lines appear which move between shape borders and shape foreground and background centers.

16. The method of claim 1, where the base layer is created by a process for transferring an image onto a support, said process being selected from the set comprising lithographic, photolithographic, photographic, electrophotographic, engraving, etching, perforating, embossing, ink jet and dye sublimation processes.

17. The method of claim 1, where the base layer is embodied by an element selected from the set of transmissive devices, opaque devices, diffusely reflecting devices, paper, plastic, optically variable devices and diffractive devices.

18. The method of claim 1, where the revealing layer is embodied by an element selected from the group comprising: set of transparent lines within a light absorbing surface, set of transparent lines within a light absorbing transmissive support, set of transparent lines imaged on a film, set of transparent lines within an opaque support, lenticular lenses and Fresnel zone lenses emulating the behavior of lenticular lenses.

19. The method of claim 1, where the secure item is an item selected from the group of security document, valuable product, and security element associated to a valuable product, where a security document is a document selected from the group of bank notes, checks, securities, trust papers, certificates, customs documents, identification cards, passports, travel documents, tickets, valuable documents, business documents and contracts.

20. The method of claim 19 where a valuable product is a product selected from the group of optical disks, CDs, DVDs, software packages, electronic products, medical products, prescription drugs, beverages, foodstuff, cosmetics, clothes, fashion articles, furniture, vehicles, pieces of art, and watches.

21. The method of claim 19, where the security element associated to a valuable product is an element selected from the set of label attached to a valuable product, metallic foil incorporated into a valuable product, piece of plastics incorporated into a valuable product, diffractive substrate incorporated into a valuable product and where the valuable product possibly comprises its package.

22. The method of claim 1, where the initial motif shape image comprises at least one shape selected from the set of typographic character, word of text, symbol, logo, ornament.

23. The method of claim 1 where the base layer sets of lines comprises lines printed with at least one non-standard ink, thus making its faithful reproduction difficult using standard cyan, magenta, yellow and black prints available on photocopiers and desktop systems.

24. The method of claim 1, where an additional reference motif element selected from the group of motif shape image, shape elevation profile and reference shape level lines is imaged on one of the two layers, thereby facilitating the observation of a characteristic feature consisting in having shape level lines in accordance with said reference motif element.

25. The method of claim 1, where the revealing layer is an electronic display driven by a revealing layer display software module.

26. A secure item selected from the group of security documents, valuable products and security elements associated to valuable products, said secure item comprising a base layer, said base layer comprising sets of lines, each line of a set of line being characterized by its intensity, respectively color, where the superposition of said base layer and of a revealing layer comprising a line grating yields shape level lines, where the base layer is a modified layer which embeds a shape elevation profile generated from an initial motif shape image and where said secure item is authenticated by verifying on said shape level lines the presence of characteristic features.

27. The secure item of claim 26, where the initial motif shape image is a bilevel image and where characteristic features of the shape level lines comprise (a) their outlines which are visual offset lines of the initial motif shape boundaries and (b) their intensities, respectively colors, which are substantially identical to the intensities, respectively the colors of lines of the base layer sets of lines.

28. The secure item of claim 26, where the initial motif shape image is a bilevel image and where applying a relative superposition phase transformation to the revealing layer creates as characteristic feature level lines moving dynamically between the initial motif shape boundaries and shape foreground centers, respectively background centers, thereby shrinking and growing.

29. The secure item of claim 28, where the curvilinear base and revealing layers are individualized according to a geometric transformation selected from a set of geometric transformations and according to geometric transformation parameters selected from a range of admissible parameters.

30. The secure item of claim 29, where the curvilinear base and revealing layers are further individualized by creating the initial motif shape image according to secure item content information.

31. The secure item of claim 26, where the relative superposition phase transformation is a translation.

32. The secure item of claim 26, where the shape elevation profile is embedded into the modified layer by obtaining from the shape elevation profile an elevation value at a current position within the modified layer, by reading in a corresponding unmodified layer the intensity respectively color at a position corresponding to the current position shifted according to the elevation value and of writing that intensity, respectively color into the current position of the modified layer.

33. The secure item of claim 26, where the base and revealing layers are curvilinear layers obtained by applying a same transformation to original untransformed base and revealing layers.

34. The secure item of claim 26 where the base layer is a halftone image generated by dithering an input image with a dither matrix made of modified sets of lines embedding the shape elevation profile, and where without superposition of the revealing layer, the halftone image appears and with superposition of the revealing layer, the shape level lines appear.

35. The secure item of claim 26, where the base layer is a composed base layer of at least two base layer elements having different angular orientations, each base layer element embedding its own shape elevation profile, and where superposing the composed base layer and the revealing layer at one of the base layer element's angular orientation yields shape level lines of that base layer element's embedded shape elevation profile.

36. The secure item of claim 26, where the secure item is an item selected from the set of security document and security element associated with a valuable product, where lines of the base layer sets of lines are printed side by side on front and back faces of said secure item, and where the characteristic features of the shape level lines comprise their colors which for an authentic secure item should be the same as the colors of said lines of the base layer sets of lines printed side by side on front and back faces of said secure item.

37. The secure item of claim 26, where the base layer sets of lines comprise lines printed with a special ink selected from the group of inks visible only under ultraviolet light, inks visible under infrared light, metallic inks, and iridescent inks and where characteristic features of shape level lines comprise shape level lines appearing under certain viewing and illumination conditions, said viewing and illumination conditions being selected from the group of ultraviolet illumination, infrared illumination and observation angle.

38. The secure item of claim 26, where at least one of the two layers comprises lines selected from the group of continuous lines, dotted lines, interrupted lines and partially perforated lines.

39. The secure item of claim 26, where the base layer and the revealing layer are located on two different parts of the same secure item, thereby enabling the shape level lines to be revealed by the superposition of the base layer and the revealing layer of said secure item.

40. The secure item of claim 26, where the base layer is created by a process for transferring an image onto a support, said process being selected from the set comprising lithographic, photolithographic, photographic, electrophotographic, engraving, etching, perforating, embossing, ink jet and dye sublimation processes.

41. The method of claim 26, where the base layer is embodied by an element selected from the set of transmissive devices, opaque devices, diffusely reflecting devices, paper, plastic, optically variable devices and diffractive devices.

42. The method of claim 26, where the revealing layer is embodied by an element selected from the group comprising: set of transparent lines within a light absorbing surface, set of transparent lines within a light absorbing transmissive support, set of transparent lines imaged on a film, set of transparent lines within an opaque support, lenticular lenses, Fresnel zone lenses emulating the behavior of lenticular lenses and electronic display working in transmissive mode driven by a revealing layer display software module.

43. The secure item of claim 26, where security documents are documents selected from the group of bank notes, checks, securities, trust papers, certificates, customs documents, identification cards, passports, travel documents, tickets, valuable documents, business documents, and contracts and where valuable products are products selected from the group of optical disks, CDs, DVDs, software packages, electronic products, medical products, prescription drugs, beverages, foodstuff, cosmetics, clothes, fashion articles, furniture, vehicles, pieces of art and watches.

44. The secure item of claim 26, where the initial motif shape image comprises at least one shape selected from the set of typographic character, word of text, symbol, logo, ornament.

45. The secure item of claim 26, where the base layer sets of lines comprises lines printed with at least one non-standard ink, thus making its faithful reproduction difficult using standard cyan, magenta, yellow and black prints available on photocopiers and desktop systems.

46. The secure item of claim 26, where an additional reference motif element selected from the group of initial motif shape image, reference shape elevation profile and reference shape level lines is imaged on one of the two layers, thereby facilitating the observation of a characteristic feature consisting in having shape level lines according to said reference motif element.

47. A secure item computing and delivery system comprising a server system and client systems, said server system comprising a) a repository module operable for registering secure items and creating associations between secure item content information and corresponding base and revealing layer synthesizing information;

b) a base layer and revealing layer synthesizing module operable for synthesizing a transformed base layer comprising sets of lines and a transformed revealing layer line grating, one of the layers being a modified transformed layer embedding a shape elevation profile, said transformed base layer and said transformed revealing layer line grating being synthesized according to corresponding base and revealing layer synthesizing information;

c) an interface module operable for receiving requests from client systems, operable for interacting with the base layer and revealing layer synthesizing module and further operable for delivering to clients systems secure items, base layers as well as revealing layers;

where said secure items are items selected from the group of security documents, security elements associated to valuable products and valuable products;

where said base layer and revealing layer synthesizing module is operable for synthesizing base and revealing layers (i) by computing the shape elevation profile from an initial motif shape image, (ii) by transforming original base and revealing layers according to a geometric transformation and (iii) by embedding within said modified transformed layer said shape elevation profile; and where the superposition of said transformed base layer and said transformed revealing layer line grating yields shape level lines used for authentication purposes.

48. The secure item computing and delivery system of claim 47 where the base layer and revealing layer synthesizing module is also operable for creating as final base layer a halftone image by dithering an input grayscale respectively color image with a dither matrix formed by modified transformed sets of lines embedding a shape elevation profile, each set of lines comprising lines of increasing intensity.

49. The document security computing and delivery system of claim 47, where the base and revealing layer synthesizing information comprises (a) base layer sets of lines properties comprising (i) base layer sets of lines period $T_b$ in the original space, (ii) number of lines per set and (iii) intensity respectively color of each individual line within a set of lines in the original space, (b) the geometric transformation mapping both the base layer and the revealing layer from transformed space back to the original space and the transformation parameters of said geometric transformation;

(c) an initial motif shape image to be embedded into one of the layers.

50. The document security computing and delivery system of claim 49, where the base and revealing layer synthesizing information also comprises an original grayscale, respectively color image to be halftoned with a dither matrix formed by modified transformed sets of lines embedding a shape elevation profile, each set of lines comprising lines of increasing intensity.

51. The document security computing and delivery system of claim 47, where the client system is operable for emitting secure item registration requests, operable for emitting secure item synthesizing requests, operable for emitting base layer synthesizing requests and operable for emitting revealing layer line grating synthesizing requests.

* * * * *